United States Patent
Ranade et al.

(10) Patent No.: US 12,187,929 B2
(45) Date of Patent: Jan. 7, 2025

(54) FILM-INITIATED CURE OF STRUCTURAL ADHESIVE FILM

(71) Applicant: 3M INNOVATIVE PROPERTIES COMPANY, St. Paul, MN (US)

(72) Inventors: Shantanu R. Ranade, Woodbury, MN (US); Alexander J. Kugel, Woodbury, MN (US); Kai U. Claussen, Munich (DE); Rachna Khurana, Inver Grove Heights, MN (US); Dean M. Moren, North St. Paul, MN (US); William H. Sikorski, Jr., Birchwood Village, MN (US); Erik M. Townsend, South St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 968 days.

(21) Appl. No.: 15/733,471

(22) PCT Filed: Feb. 8, 2019

(86) PCT No.: PCT/US2019/017182
§ 371 (c)(1),
(2) Date: Aug. 4, 2020

(87) PCT Pub. No.: WO2019/157262
PCT Pub. Date: Aug. 15, 2019

(65) Prior Publication Data
US 2021/0102095 A1 Apr. 8, 2021

Related U.S. Application Data

(60) Provisional application No. 62/743,917, filed on Oct. 10, 2018, provisional application No. 62/628,702, filed on Feb. 9, 2018.

(51) Int. Cl.
*C09J 7/38* (2018.01)
*C09J 5/04* (2006.01)
(Continued)

(52) U.S. Cl.
CPC .............. *C09J 7/385* (2018.01); *C09J 5/04* (2013.01); *C09J 7/10* (2018.01); *C09J 11/04* (2013.01);
(Continued)

(58) Field of Classification Search
CPC .................... C09J 7/381; C09J 5/04
See application file for complete search history.

(56) References Cited

U.S. PATENT DOCUMENTS

| | | |
|---|---|---|
| 3,625,875 A | 12/1971 | Frauenglass |
| 3,639,500 A | 2/1972 | Muny |

(Continued)

FOREIGN PATENT DOCUMENTS

| | | |
|---|---|---|
| CA | 1301616 | 5/1992 |
| CN | 104497892 | 4/2015 |

(Continued)

OTHER PUBLICATIONS

Machine Translation of Japanese Patent 5-230284, Date Unknown.*
International Search Report for PCT International Application No. PCT/US2019/017182, mailed on Apr. 16, 2019, 5 pages.

*Primary Examiner* — Jeffry H Aftergut
(74) *Attorney, Agent, or Firm* — Kathleen B. Gross

(57) ABSTRACT

Curable adhesive free-standing films and adhesive systems comprising such films are provided. In some embodiments, a curable adhesive free-standing film comprises a blend of: a) a first film-forming polymer or oligomer; b) a first species comprising first unsaturated free-radically polymerizable groups, which may be a) or a species other than a); c) a first transition metal cation; d) a reducing agent; and no oxidizing
(Continued)

agent. In some embodiments, an adhesive system comprises: I) a first curable adhesive free-standing film as described preceding; and II) a second curable adhesive free-standing film comprising a blend of: e) a second film-forming polymer or oligomer; f) a second species comprising second unsaturated free-radically polymerizable groups, which may be e) or may be a species other than e); and g) an oxidizing agent. In some embodiments, the curable adhesive free-standing films may be pressure sensitive adhesives prior to cure. Methods of use are provided.

20 Claims, 3 Drawing Sheets

(51) Int. Cl.
*C09J 7/10* (2018.01)
*C09J 11/04* (2006.01)

(52) U.S. Cl.
CPC .... *C09J 2301/208* (2020.08); *C09J 2301/302* (2020.08); *C09J 2433/00* (2013.01)

(56) References Cited

U.S. PATENT DOCUMENTS

| | | | |
|---|---|---|---|
| 3,994,764 A | 11/1976 | Wolinski | |
| 3,996,308 A | 12/1976 | Douek | |
| 4,074,004 A | 2/1978 | Bateson | |
| 4,170,612 A | 10/1979 | Pastor | |
| 4,316,000 A | 2/1982 | Boeder | |
| 4,373,077 A | 2/1983 | Boeder | |
| 4,452,955 A | 6/1984 | Boeder | |
| 4,472,231 A | 9/1984 | Jenkins | |
| 4,569,976 A | 2/1986 | Zimmerman | |
| 4,945,006 A | 7/1990 | Muggee | |
| 4,946,529 A | 8/1990 | Huddleston | |
| 5,003,016 A | 3/1991 | Boeder | |
| 5,106,808 A | 4/1992 | Boeder | |
| 6,734,249 B1 | 5/2004 | Bulluck | |
| 10,617,607 B2 | 4/2020 | Moser | |
| 10,723,918 B2 | 7/2020 | Chien et al. | |
| 11,370,940 B2 | 6/2022 | Townsend | |
| 2004/0228998 A1 | 11/2004 | Haas | |
| 2005/0214497 A1 | 9/2005 | Bilodeau | |
| 2005/0230960 A1 | 10/2005 | Bilodeau | |
| 2008/0196822 A1 | 8/2008 | Satoh | |
| 2008/0242764 A1 | 10/2008 | Wallace | |
| 2009/0053449 A1 | 2/2009 | Hannington | |
| 2010/0061823 A1 | 3/2010 | Attarwala | |
| 2010/0255239 A1 | 10/2010 | Hammond | |
| 2013/0052460 A1 | 2/2013 | Iseki | |
| 2016/0108287 A1* | 4/2016 | Schümann | C09J 7/00 427/208.4 |
| 2016/0108292 A1 | 4/2016 | Yamakami | |
| 2016/0289513 A1 | 10/2016 | Behling | |
| 2017/0066947 A1 | 3/2017 | Dietze | |
| 2017/0246660 A1 | 8/2017 | Thompson | |
| 2018/0215955 A1* | 8/2018 | Claret | C09J 4/06 |
| 2018/0237585 A1 | 8/2018 | Liu | |
| 2019/0070589 A1* | 3/2019 | Zhou | B01J 23/14 |
| 2020/0062998 A1 | 2/2020 | Schümann | |
| 2020/0362204 A1 | 11/2020 | Ranade | |
| 2021/0102097 A1 | 4/2021 | Ranade | |
| 2023/0088278 A1 | 3/2023 | Kugel et al. | |

FOREIGN PATENT DOCUMENTS

| | | | |
|---|---|---|---|
| DE | 10259457 | | 12/2004 |
| DE | 102015009764 | | 2/2017 |
| EP | 0140006 | | 5/1985 |
| EP | 0232936 | | 8/1987 |
| EP | 0334378 | A2 * | 9/1989 |
| EP | 0889105 | | 1/1999 |
| EP | 1800865 | | 6/2007 |
| GB | 1448257 | | 9/1976 |
| GB | 2121811 | | 1/1984 |
| JP | 58171462 | | 10/1983 |
| JP | 6026079 | | 2/1985 |
| JP | 63-184744 | | 7/1988 |
| JP | 5-320284 | A * | 12/1993 |
| JP | 05320284 | | 12/1993 |
| JP | H07133467 | | 5/1995 |
| JP | 0911193 | | 1/1997 |
| JP | 2005028643 | | 2/2005 |
| WO | WO 2012-043664 | | 4/2012 |
| WO | WO 2013-013589 | | 1/2013 |
| WO | WO 2014-078115 | | 5/2014 |
| WO | WO 2017-052680 | | 3/2017 |
| WO | WO 2017-095704 | | 6/2017 |
| WO | WO-2017/095704 | A1 * | 6/2017 |
| WO | WO 2018-215889 | | 11/2018 |
| WO | WO 2019-157264 | | 8/2019 |

\* cited by examiner

FILM-INITIATED CURE OF STRUCTURAL ADHESIVE FILM

CROSS REFERENCE TO RELATED APPLICATIONS

This application is a national stage filing under 35 U.S.C. 371 of PCT/US2019/017182, filed Feb. 8, 2019, which claims the benefit of U.S. Provisional Patent Application Nos. 62/628,702, filed Feb. 9, 2018, and 62/743,917, filed Oct. 10, 2018, the disclosures of which are incorporated by reference in their entirety herein.

FIELD OF THE DISCLOSURE

This disclosure relates to curable adhesive films and tapes comprising such films and second films which initiate cure of the curable adhesive films upon contact resulting in structural adhesive bonds. In some embodiments the curable adhesive films are pressure sensitive adhesives before cure.

BACKGROUND OF THE DISCLOSURE

The following references may be relevant to the general field of technology of the present disclosure: US 2005/0214497; JPS 6026079; CA 1,301,616; DE 10259457; EP 0140006; EP 0232936; EP 0889105; EP 1800865; GB 1,448,257; JP 09/111193; US 2004/0228998; US 2005/0230960; US 2008/0242764; US 2010/0061823; US 2010/0255239; US 2013/0052460; US 2016/0289513; U.S. Pat. Nos. 3,625,875; 3,639,500; 3,994,764; 3,996,308; 4,170,612; 4,316,000; 4,373,077; 4,452,955; 4,472,231; 4,569,976; 4,945,006; 4,946,529; 5,003,016; 5,106,808; 6,734,249; and WO 2014/078115.

SUMMARY OF THE DISCLOSURE

Briefly, the present disclosure provides a curable adhesive free-standing film comprising a blend of: a) a first film-forming polymer or oligomer; b) a first species comprising first unsaturated free-radically polymerizable groups, which may be a) or a species other than a); c) a first transition metal cation; and d) a reducing agent which is not a), b), or c); wherein the curable adhesive free-standing film comprises no oxidizing agent which is not a), b), c), or d). In some embodiments, b) is a). In some embodiments, b) is a species other than a) and a) does not comprise unsaturated free-radically polymerizable groups. In some such embodiment a) is selected from acrylic polymers, rubber polymers, polyester polymers, polyurethane polymers, polyamide polymers, and combinations thereof. In some embodiments, the reducing agent does not comprise a transition metal, nitrogen or sulfur. In some embodiments, the reducing agent is selected from organic reducing agents. In some embodiments, the curable adhesive free-standing film is a pressure sensitive adhesive. Additional embodiments of this curable adhesive free-standing film of the present disclosure are described below under "Selected Embodiments" and demonstrated in the Examples.

In another aspect, the present disclosure provides an adhesive system comprising: I) a first curable adhesive free-standing film which is the curable adhesive free-standing film described above; and II) a second curable adhesive free-standing film comprising a blend of: e) a second film-forming polymer or oligomer; f) a second species comprising second unsaturated free-radically polymerizable groups, which may be e) or may be a species other than e); and g) an oxidizing agent which is not e) or f). In some embodiments, f) is e). In some embodiments, f) is a species other than e) and e) does not comprise unsaturated free-radically polymerizable groups. In some such embodiment e) is selected from acrylic polymers, rubber polymers, polyester polymers, polyurethane polymers, polyamide polymers, and combinations thereof. In some embodiments, the second curable adhesive free-standing film is a pressure sensitive adhesive. Additional embodiments of this adhesive system of the present disclosure are described below under "Selected Embodiments" and demonstrated in the Examples.

In another aspect, the present disclosure provides a method of binding two substrates comprising the steps of: 1) providing a first substrate bearing on a first surface the first curable adhesive free-standing film according to the present disclosure; 2) providing a second substrate bearing on a second surface the second curable free-standing adhesive film according to the present disclosure; and 3) bringing together the first and second surfaces of the first and second substrates such that the first and second curable adhesive films are in contact. Additional embodiments of this method of the present disclosure are described below under "Selected Embodiments" and demonstrated in the Examples.

In another aspect, the present disclosure provides a method of binding two substrates comprising the steps of: 1) providing the second curable adhesive free-standing film according to the present disclosure; 2) providing a first substrate bearing on a first surface a first portion of the first curable adhesive free-standing film according to the present disclosure; 3) providing a second substrate bearing on a second surface a second portion of the first curable free-standing adhesive film according to the present disclosure; where the first and second portions have compositions chosen independently of each other; and 4) bringing together 1), 2), and 3) such that the first portion of the first curable adhesive free-standing film and the second portion of the first curable adhesive free-standing film are in contact with opposite faces of the second curable adhesive free-standing film. Additional embodiments of this method of the present disclosure are described below under "Selected Embodiments" and demonstrated in the Examples.

In another aspect, the present disclosure provides a method of binding two substrates comprising the steps of: 1) providing the first curable adhesive free-standing film according to the present disclosure; 2) providing a first substrate bearing on a first surface a first portion of the second curable adhesive free-standing film according to the present disclosure; 3) providing a second substrate bearing on a second surface a second portion of the second curable free-standing adhesive film according to the present disclosure; wherein the first and second portions have compositions chosen independently of each other; and 4) bringing together 1), 2), and 3) such that the first portion of the second curable adhesive free-standing film and the second portion of the second curable adhesive free-standing film are in contact with opposite faces of the first curable adhesive free-standing film. Additional embodiments of this method of the present disclosure are described below under "Selected Embodiments" and demonstrated in the Examples.

The preceding summary of the present disclosure is not intended to describe each embodiment of the present invention. The details of one or more embodiments of the invention are also set forth in the description below. Other features, objects, and advantages of the invention will be apparent from the description and from the claims.

In this Application:

"directly bound" refers to two materials that are in direct contact with each other and bound together;

"film-forming" means capable of forming a continuous and coherent film, which in some embodiments may result from one or more of solidification, curing, drying, or solvent removal of a melt, solution, suspension, or the like;

"free-standing film" means a film that is solid at normal temperature and pressure and has mechanical integrity independent of contact with any supporting material (which excludes, inter alia, liquids, surface coatings dried or cured in situ such as paints or primers, and surface coatings without independent mechanical integrity);

"kDa" means kiloDaltons;

"(meth)acrylate" includes, separately and collectively, methacrylate and acrylate;

"monomer unit" of a polymer or oligomer is a segment of a polymer or oligomer derived from a single monomer;

"normal temperature and pressure" or "NTP" means a temperature of 20° C. (293.15 K, 68° F.) and an absolute pressure of 1 atm (14.696 psi, 101.325 kPa);

"pendent" functional groups of a polymer or oligomer are functional groups that do not form a part of the backbone of the polymer or oligomer and are not terminal groups of the polymer;

"room temperature" is 21° C. (70° F.); and

"structural adhesive" means an adhesive that binds by irreversible cure, typically with a strength when bound to its intended substrates, measured as stress at break (peak stress) using the overlap shear test described in the Examples herein, of at least 69 kPa (10 psi), more typically at least 276 kPa (40 psi), in some embodiments at least 689 kPa (100 psi), and in some embodiments at least 1379 kPa (200 psi).

All scientific and technical terms used herein have meanings commonly used in the art unless otherwise specified.

As used in this specification and the appended claims, terms such as "coated" and "embossed" are intended to represent structure, and not to limit the process used to obtain the recited structure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

Figure 1:
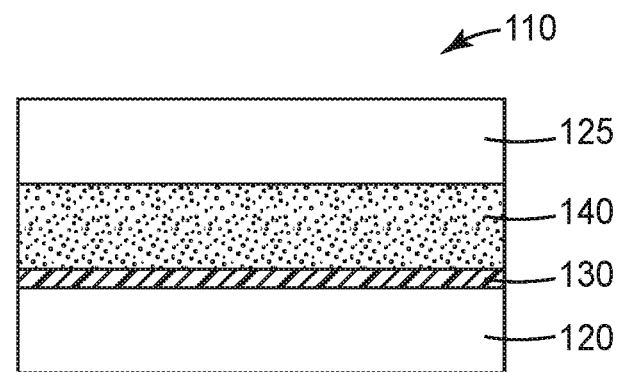
FIG. 1 is a cross section of one embodiment of a construction according to the present disclosure.

The present disclosure provides curable adhesive films, and tapes comprising such films. The present disclosure also provides primers capable of initiating cure of the curable adhesive films. The present disclosure also provides second curable films capable of initiating cure of the curable adhesive films. In some embodiments, the curable adhesive films are pressure sensitive adhesives before cure, capable of maintaining substrates in position even prior to cure, under shop or factory conditions, without clamps or other supports. The present adhesive system does not require mixing of liquid components for use. Upon contact with a primer-coated substrate, the curable adhesive films of the present disclosure begin to cure, resulting in structural adhesive bonds. In some embodiments of the present adhesive system, cure can be achieved at normal temperature and pressure, without heat or autoclave. Likewise, in some embodiments of the present adhesive system, cure can be achieved without UV or other radiation treatment, and cure propagates well to areas inaccessible to radiation cure. In some embodiments of the present adhesive system, components of the present adhesive system need not be refrigerated or kept in dark storage. In some embodiments of the present adhesive system, a curable adhesive film may be attached to its substrate at the point of manufacture and bonded at a different time and/or place. In some embodiments of the present adhesive system, a curable adhesive film may be attached to its substrate at the point of manufacture, a second curable film capable of initiating cure of the curable adhesive film may be attached to a second substrate at a second point of manufacture, and the two may be bonded at a third time and/or place. In some embodiments of the present adhesive system, a second curable film capable of initiating cure of the curable adhesive film may be attached to its substrate at the point of manufacture, another second curable film capable of initiating cure of the curable adhesive film may be attached to a second substrate at a second point of manufacture, and the two may be bonded at a third time and/or place by sandwiching a curable adhesive film between the two second curable films pre-mounted on the substrates.

The present disclosure provides curable adhesive films. The curable adhesive films are room temperature solids. In some embodiments, the films comprise a blend of a reactive oligomer comprising unsaturated free-radically polymerizable groups, and a reducing agent. In some embodiments, the films comprise a blend of a reactive oligomer, comprising pendent, unsaturated free-radically polymerizable groups, and a reducing agent. In some embodiments, the films comprise a blend of a film-forming oligomer, a reactive species comprising unsaturated free-radically polymerizable groups, and a reducing agent. In some embodiments, the unsaturated free-radically polymerizable groups are selected from vinyl-containing groups such as (meth)acrylate groups. In some embodiments, the oligomer is a poly(meth)acrylate oligomer. In some embodiments the curable adhesive film additionally comprises a crosslinker comprising two or more or three or more unsaturated free-radically polymerizable groups, such as vinyl-containing groups, such as (meth)acrylate groups. In some embodiments, the crosslinker is a crosslinking monomer. In some embodiments, the crosslinker is an oligomer. In some embodiments the curable adhesive film additionally comprises a transition metal cation. In some embodiments the curable adhesive film additionally comprises a redox accelerator, such as a quaternary amine. In other embodiments the redox accelerator may be chosen from organic or inorganic chloride ion containing compounds such as amine hydrochlorides or sodium chloride. In some embodiments the curable adhesive film may additionally comprise fillers, such as solid or hollow particles comprising polymer, glass, ceramic, metal or metal oxide materials. Additional embodiments of the curable adhesive films of the present disclosure, tapes comprising same, and their use are provided in the figures and accompanying description, the Selected Embodiments, and the Examples.

Any suitable reducing agent may be used, including organic and inorganic components and mixtures thereof. Suitable reducing agents may include ascorbic acid components, tertiary amine components, sulfinate components, sulphite components, borane components, (thio)urea components, (thio)barbituric acid components, saccharin, reducing sugars such as dextrose, glucose, and fructose, and metal salts of any of the preceding. In some embodiments, the reducing agent comprises an ascorbic acid moiety. Such reducing agents may include salts or esters of ascorbic acid, or may be linked to an ascorbic acid moiety by an ether linkage. Ketals or acetals may additionally be useful. Suitable salts may include alkali metal and earth alkali metal salts like Na, K, Ca and mixtures thereof. Esters of ascorbic acid may include those formed by reacting one or more of the hydroxyl functions of ascorbic acid with a carboxylic acid, in particular C2-C30 carboxylic acids or C12-C22 carboxylic acids. Suitable examples of C2 to C30 carboxylic acids include the fatty acids, like caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid and docosahexaenoic acid. In some embodiments, the reducing agent comprises an ascorbic acid moiety and can be easily dissolved in or mixed with the other components of the film, such as a reducing agent containing a hydrophobic moiety. In other embodiments, the reducing agent may be a tertiary amines such as N,N-dimethyl-p-toluidine, N,N-dimethyl-aminoethyl methacrylate, triethanolamine, methyl 4-dimethylaminobenzoate, ethyl 4-dimethylaminobenzoate, methyldiphenylamine and isoamyl 4-dimethylaminobenzoate. In other embodiments, the reducing agent may be a sodium sulfinate derivative or an organometallic compound.

In some embodiments, the curable adhesive film has an outer surface, i.e., a substrate-facing surface, which includes embossed air bleed channels capable of aiding in escape of air during application of the outer surface to a substrate. The channels, and methods of their production, may be as taught in EP 1800865. Such channels fulfil a unique purpose in the use of the articles of the present disclosure. By allowing escape of trapped air bubbles, air bleed channels may help to improve contact with a primer or second film which initiates cure of the curable adhesive film. Where an adhesive film or tape has one embossed face and one that is not embossed, the non-embossed face may be placed on a first substrate and the second substrate may then be brought into contact with the embossed face. This approach may be particularly useful where two stiff substrates are to be joined, since it allows air bleed and adaptability to uneven surfaces despite the inflexibility of the substrates.

The present disclosure provides primers capable of initiating cure of the curable adhesive films. In some embodiments, the primers comprise an oxidizing agent; and optionally a transition metal cation. In some embodiments, the primers comprise a reactive oligomer comprising unsaturated free-radically polymerizable groups, which may be the same or different from the reactive oligomer in the curable adhesive film; an oxidizing agent; and optionally a transition metal cation. In some embodiments, the primers comprise a reactive oligomer, comprising pendent, unsaturated free-radically polymerizable groups, which may be the same or different from the reactive oligomer in the curable adhesive film; an oxidizing agent; and optionally a transition metal cation. In some embodiments, the primers comprise a blend of a film-forming oligomer, a reactive species comprising unsaturated free-radically polymerizable groups, an oxidizing agent; and optionally a reducible transition metal cation. In some embodiments, the unsaturated free-radically polymerizable groups are selected from vinyl-containing groups such as (meth)acrylate groups. In some embodiments, the oxidizing agent comprises a peroxide group, such as a hydroperoxide group. In some embodiments, the transition metal cation is a cation of molybdenum, titanium, vanadium, chromium, manganese, iron, cobalt, nickel, copper or zinc. In some embodiments, the transition metal cation is a copper cation, such as Cu(II). In some embodiments, the transition metal cation is an iron cation, such as Fe(II) or Fe(III), such as may be found in Black 11 ($Fe_3O_4$ or $FeO \cdot Fe_2O_3$), Red 102 ($Fe_2O_3$), or Yellow 42 ($FeO(OH) \cdot H_2O$). In some embodiments, the primer additionally comprises a crosslinker comprising two or more or three or more unsaturated free-radically polymerizable groups, such as vinyl-containing groups, such as (meth)acrylate groups, which may be the same or different from the crosslinker in the curable adhesive film. In some embodiments, the crosslinker is a crosslinking monomer. In some embodiments, the crosslinker is an oligomer. In some embodiments, the primer may additionally contain excipients to facilitate transport of oxidizing agents. In some embodiments, common plasticizers may be used as excipients. In some embodiments, plasticizers such as low vapor pressure (at room temperature) plasticizers and/or high boiling point plasticizers may be used. In some embodiments the primer may additionally comprise fillers, such as solid or hollow particles comprising polymer, glass, ceramic, metal or metal oxide materials. The primer is typically applied as a solvent-borne liquid, by any suitable method, which may include brushing, spraying, dipping, and the like. Additional embodiments of the primers of the present disclosure and their use are provided in the figures and accompanying description, the Selected Embodiments, and the Examples.

The present disclosure provides second curable films capable of initiating cure of the curable adhesive films. In some embodiments, the second curable films comprise an oxidizing agent; and optionally a transition metal cation. In some embodiments, the second curable films comprise a reactive oligomer comprising unsaturated free-radically polymerizable groups, which may be the same or different from the reactive oligomer in the curable adhesive film; an oxidizing agent; and optionally a transition metal cation. In some embodiments, the second curable films comprise a reactive oligomer, comprising pendent, unsaturated free-radically polymerizable groups, which may be the same or different from the reactive oligomer in the curable adhesive film; an oxidizing agent; and optionally a transition metal cation. In some embodiments, the second curable films comprise a blend of a film-forming oligomer, a reactive species comprising unsaturated free-radically polymerizable groups, an oxidizing agent; and optionally a reducible transition metal cation. In some embodiments, the unsaturated free-radically polymerizable groups are selected from vinyl-containing groups such as (meth)acrylate groups. In some embodiments, the oxidizing agent comprises a peroxide group, such as a hydroperoxide group. In some embodiments, the transition metal cation is a cation of molybdenum, titanium, vanadium, chromium, manganese, iron, cobalt, nickel, copper or zinc. In some embodiments, the transition metal cation is a copper cation, such as Cu(II). In some embodiments, the transition metal cation is an iron cation, such as Fe(II) or Fe(III), such as may be found in Black 11 ($Fe_3O_4$ or $FeO \cdot Fe_2O_3$), Red 102 ($Fe_2O_3$), or Yellow 42 ($FeO(OH) \cdot H_2O$). In some embodiments, the second curable films additionally comprises a crosslinker comprising two or more or three or more unsaturated free-radically polymerizable groups, such as vinyl-containing groups, such as (meth)acrylate groups, which may be the same or different from the crosslinker in the curable adhesive film. In some embodiments, the crosslinker is a crosslinking monomer. In some embodiments, the crosslinker is an oligomer. In some embodiments, the second curable films may additionally contain excipients to facilitate transport of oxidizing agents. In some embodiments, common plasticizers may be used as excipients. In some embodiments, plasticizers such as low vapor pressure (at room temperature) plasticizers and/or high boiling point plasticizers may be used. In some embodiments the primer may additionally comprise fillers, such as solid or hollow particles comprising polymer, glass, ceramic, metal or metal oxide materials. Additional embodiments of the second curable films of the present disclosure and their use are provided in the figures and accompanying description, the Selected Embodiments, and the Examples.

Any suitable oxidizing agents may be used. Suitable oxidizing agents may include organic peroxides, inorganic peroxides or persulfates. Suitable organic peroxides may include hydroperoxides, ketone peroxides, diacyl peroxides, dialkyl peroxides, peroxyketals, peroxyesters and peroxydicarbonates. Suitable organic peroxides may include di-peroxides, which may include di-peroxides comprising the moiety R1—O—O—R2—O—O—R3, with R1 and R3 being independently selected from H, alkyl (e.g. C1 to C6), branched alkyl (e.g. C1 to C6), cycloalkyl (e.g. C5 to C10), alkylaryl (e.g. C7 to C12) or aryl (e.g. C6 to C10) and R2 being selected from alkyl (e.g. (C1 to C6) or branched alkyl (e.g. C1 to C6). Suitable ketone peroxides may include methyl ethyl ketone peroxide, methyl isobutyl ketone peroxide, methyl cyclohexanone peroxide, and cyclohexanone peroxide. Suitable peroxyesters may include alpha-cumylperoxyneodecanoate, t-butyl peroxypivarate, t-butyl peroxyneodecanoate, 2,2,4-trimethylpentylperoxy-2-ethyl hexanoate, t-amylperoxy-2-ethyl hexanoate, t-butylperoxy-2-ethyl hexanoate, di-t-butylperoxy isophthalate, di-t-butyl peroxy hexahydroterephthalate, t-butylperoxy-3,3,5-trimethylhexanoate, t-butylperoxy acetate, t-butylperoxy benzoate and t-butylperoxymaleic acid. Suitable peroxidicarbonates may include di-3-methoxy peroxidicarbonate, di-2-ethylhexyl peroxy-dicarbonate, bis(4-t-butylcyclohexyl)peroxidicarbonate, diisopropyl-1-peroxydicarbonate, di-n-propyl peroxidicarbonate, di-2-ethoxyethyl-peroxidicarbonate, and diallyl peroxidicarbonate. Suitable diacyl peroxides may include acetyl peroxide, benzoyl peroxide, decanoyl peroxide, 3,3,5-trimethylhexanoyl peroxide, 2,4-dichlorobenzoyl peroxide and lauroylperoxide. Suitable dialkyl peroxides may include di-t-butyl peroxide, dicumylperoxide, t-butylcumyl peroxide, 2,5-dimethyl-2,5-di(t-butylperpoxy)hexane, 1,3-bis(t-butylperoxyisopropyl)benzene and 2,5-dimethyl-2,5-di(t-butylperoxy)-3-hexane. Suitable peroxyketals may include 1,1-bis(t-butylperoxy)-3,3,5-trimethylcyclohexane, 1,1-bis(t-butylperoxy)cyclohexane, 2,2-bis(t-butylperoxy)butane, 2,2-bis(t-butylperoxy)octane and 4,4-bis(t-butylperoxy)valeric acid-n-butylester. In some embodiments, the organic peroxide is a hydroperoxide, in particular a hydroperoxide comprising the structural moiety R—O—O—H with R being (e.g. C1 to C20) alkyl, (e.g. C3 to C20) branched alkyl, (e.g. C6 to C12) cycloalkyl, (e.g. C7 to C20) alkylaryl or (e.g. C6 to C12) aryl. Suitable organic hydroperoxides may include t-butyl hydroperoxide, t-amyl hydroperoxide, p-diisopropylbenzene hydroperoxide, cumene hydroperoxide, pinane hydroperoxide, p-methane hydroperoxide and 1,1,3,3-tetramethylbutyl hydroperoxide. Suitable oxidizing agents may include peroxodisulfate components and/or peroxodiphosphate components. Suitable examples may include ammonium, sodium, and potassium peroxodisulfate components and/or peroxodiphosphate components Suitable organic peroxides may additionally include t-butyl peroxy ethylhexyl carbonate, t-butyl peroxy trimethylhexanoate, t-butyl peroxy ethylhexanoate, t-amyl peroxy ethylhexanoate, t-octyl peroxy ethylhexanoate, t-amyl peroxy ethylhexyl carbonate, t-butyl peroxy isopropyl carbonate, t-butyl peroxyneodecanoate, t-butyl peroxyisobutyrate, or t-butyl hydroperoxide.

With reference to FIG. 1, in one embodiment, construction 110 comprises first substrate 120. A primer according to the present disclosure is applied to first substrate 120 and allowed to dry to form primer layer 130 directly bound to first substrate 120. A tape according to one embodiment of the present disclosure comprising a single layer of a curable adhesive film according to the present disclosure is applied to primer layer 130 and second substrate 125 is brought into contact with the tape. In some embodiments the assembly is held by external forces, i.e., a clamp, until the curable adhesive film becomes cured, however, in other embodiments the tackiness of the tape alone holds the assembly until cure. The tape cures to form cured structural adhesive layer 140 which is directly bound to primer layer 130 and second substrate 125. Primer layer 130 becomes cured with cured structural adhesive layer 140.

Figure 2:
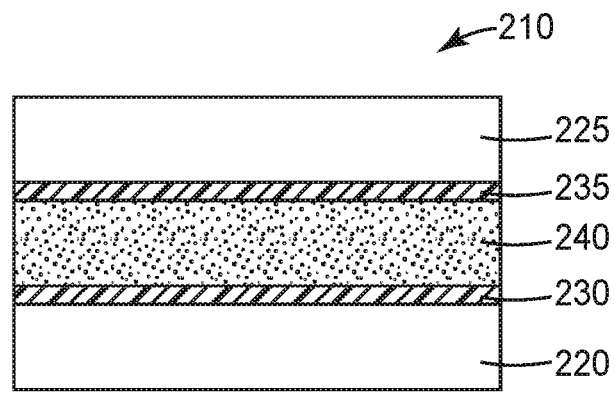
FIG. 2 is a cross section of one embodiment of a construction according to the present disclosure.

With reference to FIG. 2, in one embodiment, construction 210 comprises first substrate 220. A primer according to the present disclosure is applied to first substrate 220 and allowed to dry to form first primer layer 230 directly bound to first substrate 220. A primer according to the present disclosure is applied to second substrate 225 and allowed to dry to form second primer layer 235 directly bound to second substrate 225. A tape according to one embodiment of the present disclosure comprising a single layer of a curable adhesive film according to the present disclosure is applied to first primer layer 230 and second primer layer 235 borne on second substrate 225 is brought into contact with the tape. In some embodiments the assembly is held by external forces, i.e., a clamp, until the curable adhesive film becomes cured, however, in other embodiments the tackiness of the tape alone holds the assembly until cure. The tape cures to form cured structural adhesive layer 240 which is directly bound to first primer layer 230 and second primer layer 235. First and second primer layers 230, 235 become cured with cured structural adhesive layer 240.

Figure 3:
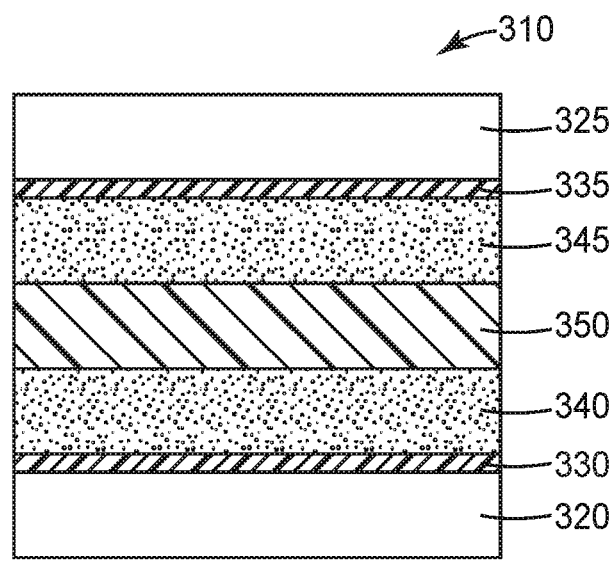
FIG. 3 is a cross section of one embodiment of a construction according to the present disclosure.

With reference to FIG. 3, in one embodiment, construction 310 comprises first substrate 320. A primer according to the present disclosure is applied to first substrate 320 and allowed to dry to form first primer layer 330 directly bound to first substrate 320. A primer according to the present disclosure is applied to second substrate 325 and allowed to dry to form second primer layer 335 directly bound to second substrate 325. This embodiment employs a tape according to one embodiment of the present disclosure, comprising two layers of a curable adhesive film according to the present disclosure borne on opposite faces of support layer 350. The tape is applied to first primer layer 330 and second primer layer 335 borne on second substrate 325 is brought into contact with the tape. In some embodiments the assembly is held by external forces, i.e., a clamp, until the curable adhesive film becomes cured, however, in other embodiments the tackiness of the tape alone holds the assembly until cure. The tape cures to form first and second cured structural adhesive layers 340, 345 which are directly bound to first primer layer 330 and second primer layer 335, respectively. First primer layer 330 becomes cured with first cured structural adhesive layer 340. Second primer layer 335 becomes cured with second cured structural adhesive layer 345. In some embodiments of such a tape, one or both layers of curable adhesive film are bound directly to support layer 350. In some embodiments of such a tape, one or both layers of curable adhesive film are bound to support layer 350 through secondary primer layers or other intervening layers (not shown). In this embodiment, structural adhesive layers 340, 345 cure independently of each other, and therefore in some embodiments attachment to first substrate 320 and attachment to second substrate 325 may be separated in time or place or performed in any order.

Figure 4:
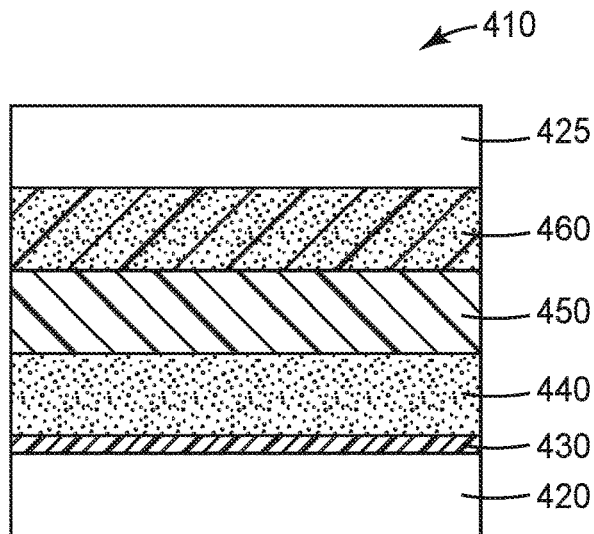
FIG. 4 is a cross section of one embodiment of a construction according to the present disclosure.

With reference to FIG. 4, in one embodiment, construction 410 comprises first substrate 420. A primer according to the present disclosure is applied to first substrate 420 and allowed to dry to form first primer layer 430 directly bound to first substrate 420. This embodiment employs a tape according to one embodiment of the present disclosure, comprising a layer of a curable adhesive film according to the present disclosure borne on support layer 450 and also comprising a secondary adhesive layer 460 borne on the opposite face of support layer 450. The tape is applied to first primer layer 430 with the layer of a curable adhesive film according to the present disclosure contacting first primer layer 430. Secondary adhesive layer 460 may be of any suitable type of adhesive, which may include a pressure sensitive adhesive, a heat-cure adhesive, a radiation cure adhesive, and the like. Second substrate 425 is brought into contact with secondary adhesive layer 460. In some embodiments the assembly is held by external forces, i.e., a clamp, until the curable adhesive film becomes cured, however, in other embodiments the tackiness of the tape alone holds the assembly until cure. Optionally, additional steps may be taken to cure secondary adhesive layer 460. The layer of curable adhesive film according to the present disclosure cures to form cured structural adhesive layer 440 which is directly bound to first primer layer 430. First primer layer 430 becomes cured with cured structural adhesive layer 440. In some embodiments of such a tape, one or both of the curable adhesive film and the secondary adhesive are bound directly to support layer 450. In some embodiments of such a tape, one or both of the curable adhesive film and the secondary adhesive are bound to support layer 450 through secondary primer layers or other intervening layers (not shown). In this embodiment, attachment of structural adhesive layer 440 and secondary adhesive layer 460 are independent of each other, and therefore in some embodiments attachment to first substrate 420 and attachment to second substrate 425 may be separated in time or place or performed in any order.

With reference to FIGS. 3 and 4, support layers 350, 450 may be of any suitable material. In some embodiments, support layers 350, 450 are foams, which may include closed cell, open cell, syntactic, or non-syntactic foams. In some embodiments, support layers 350, 450 are not foams. In some embodiments, support layers 350, 450 comprise materials such as metals, polyolefins, polyethylenes, polypropylenes, polystyrenes, poly(meth)acrylates, polyurethanes, natural or synthetic rubbers, polydienes, and the like. Support layers 350, 450 may comprise various fillers, including tougheners, core-shell particles, solid or hollow microspheres of polymer, glass, ceramic, or metal oxide, fibers, electrically or thermally conductive materials, dyes or colorants, plasticisers, tackifiers, UV stabilizers, and the like.

With reference to FIGS. 3 and 4, optional secondary primers (not shown) may be of any suitable material that aids adhesion to support layer 350, 450. Typically secondary primer materials do not include the primer according to the present disclosure. In some embodiments where a secondary primer layer is used, support layer 350, 450 is bound to an adhesive layer through the secondary primer layer; i.e., support layer 350, 450 is directly bound to the secondary primer layer (not shown) and the secondary primer layer is directly bound to the cured structural adhesive layer 340, 345, 440 or secondary adhesive layer 460.

Figure 5:
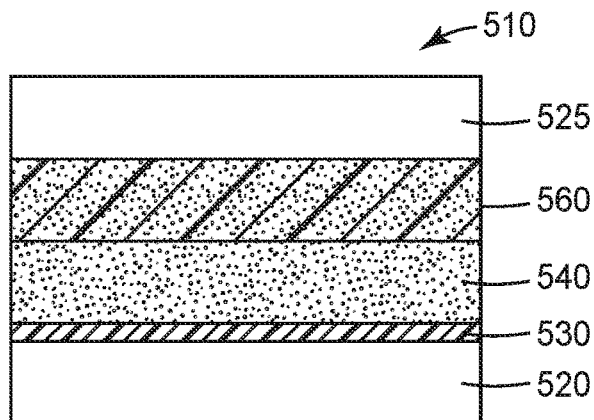
FIG. 5 is a cross section of one embodiment of a construction according to the present disclosure.

With reference to FIG. 5, in one embodiment, construction 510 comprises first substrate 520. A primer according to the present disclosure is applied to first substrate 520 and allowed to dry to form first primer layer 530 directly bound to first substrate 520. This embodiment employs a tape according to one embodiment of the present disclosure, comprising a layer of a curable adhesive film according to the present disclosure directly bound to a secondary adhesive layer 560. The tape is applied to first primer layer 530 with the layer of curable adhesive film according to the present disclosure contacting first primer layer 530. Secondary adhesive layer 560 may be of any suitable type of adhesive, which may include a pressure sensitive adhesive, a heat-cure adhesive, a radiation cure adhesive, and the like. Second substrate 525 is brought into contact with secondary adhesive layer 560. In some embodiments the assembly is held by external forces, i.e., a clamp, until the curable adhesive film becomes cured, however, in other embodiments the tackiness of the tape alone holds the assembly until cure. Optionally, additional steps may be taken to cure secondary adhesive layer 560. The layer of curable adhesive film according to the present disclosure cures to form cured structural adhesive layer 540 which is directly bound to first primer layer 530. First primer layer 530 becomes cured with cured structural adhesive layer 540. In this embodiment, attachment of structural adhesive layer 540 and secondary adhesive layer 560 are independent of each other, and therefore in some embodiments attachment to first substrate 520 and attachment to second substrate 525 may be separated in time or place or performed in any order.

Figure 6:
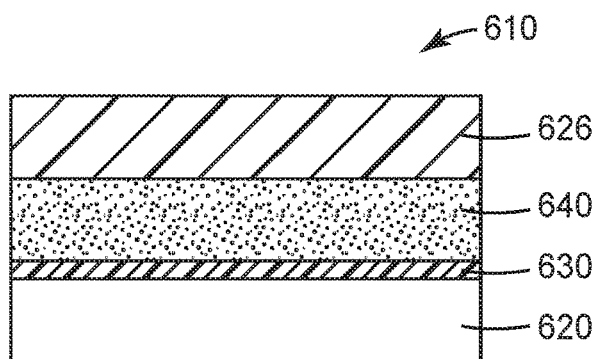
FIG. 6 is a cross section of one embodiment of a construction according to the present disclosure.

With reference to FIG. 6, in one embodiment, construction 610 comprises first substrate 620. A primer according to the present disclosure is applied to first substrate 620 and allowed to dry to form first primer layer 630 directly bound to first substrate 620. A tape according to one embodiment of the present disclosure, comprising a layer of a curable adhesive film according to the present disclosure borne on a surfacing layer 626, is applied to first primer layer 630 with the layer of curable adhesive film according to the present disclosure contacting first primer layer 630. Surfacing layer 626 may be of any suitable material, which may include polymers, foils, protective layers, graphic layers, and the like; and which may include materials that are clear, opaque, mirrored, white, black, colored, patterned, imaged and/or textured. In some embodiments of such a tape, the curable adhesive film and surfacing layer 626 are directly bound together, whereas in other embodiments they may be bound through a primer layer or other intervening layers (not shown). In some embodiments the assembly is held by external forces, i.e., a clamp, until the curable adhesive film becomes cured, however, in other embodiments the tackiness of the tape alone holds the assembly until cure. The layer of curable adhesive film according to the present disclosure cures to form cured structural adhesive layer 640 which is directly bound to first primer layer 630. First primer layer 630 becomes cured with cured structural adhesive layer 640.

Figure 7:
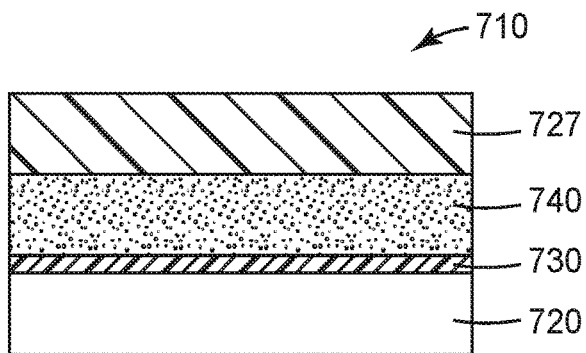
FIG. 7 is a cross section of one embodiment of a construction according to the present disclosure.
Figure 8:
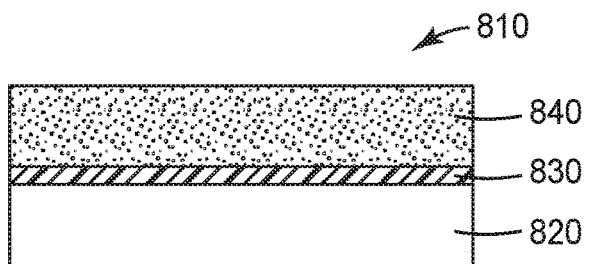
FIG. 8 is a cross section of one embodiment of a construction according to the present disclosure.

With reference to FIGS. 7 and 8, in one embodiment, construction 710, 810 comprises first substrate 720, 820. A primer according to the present disclosure is applied to first substrate 720, 820 and allowed to dry to form first primer layer 730, 830 directly bound to first substrate 720, 820. A tape according to one embodiment of the present disclosure, comprising a layer of a curable adhesive film according to the present disclosure borne on a removable release liner 727, is applied to first primer layer 730, 830 with the layer of curable adhesive film according to the present disclosure contacting first primer layer 730, 830. Removable release liner 727 may be of any suitable material that may be removed from the layer of a curable adhesive film according to the present disclosure after it cures to form cured structural adhesive layer 740, 840. The layer of curable adhesive film according to the present disclosure cures to form cured structural adhesive layer 740, 840 which is directly bound to first primer layer 730, 830. First primer layer 730, 830 becomes cured with cured structural adhesive layer 740, 840. Since cure of the layer of curable adhesive film according to the present disclosure is inhibited by oxygen, removable release liner 727 is preferably left in place until cure is complete. After cure, removable release liner 727 may be removed. In these embodiments, cured structural adhesive layer 740, 840 may be used as a protective layer covering part or all of first substrate 720, 820.

Figure 9:
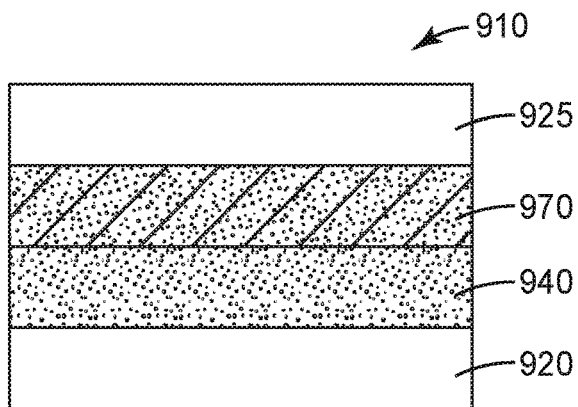
FIG. 9 is a cross section of one embodiment of a construction according to the present disclosure.

With reference to FIG. 9, in one embodiment, construction 910 comprises first substrate 920 and second substrate 925. A curable adhesive film according to the present disclosure is applied to first substrate 920, a second curable film capable of initiating cure of the curable adhesive film is applied to second substrate 925, and the two substrates are brought together so as to bring the films in contact. The curable adhesive film cures to form cured structural adhesive layer 940 which is directly bound to first substrate layer 920 and the second curable film capable of initiating cure of the curable adhesive film also cures, to form cured structural adhesive layer 970 which is directly bound to second substrate layer 925. Such embodiments may enable manufacturing ease and flexibility. In some such embodiments, the curable adhesive film may be attached to substrate 920 at the point of manufacture, the second curable film capable of initiating cure of the curable adhesive film may be attached to second substrate 925 at a second point of manufacture, and the two may be bonded at a third time and/or place. However, the layers may also be attached in any suitable order. The curable adhesive film and the second curable film capable of initiating cure of the curable adhesive film are typically pressure sensitive adhesives prior to cure. Typically, cure may occur without application of heat or pressure beyond normal temperature and pressure.

Figure 10:
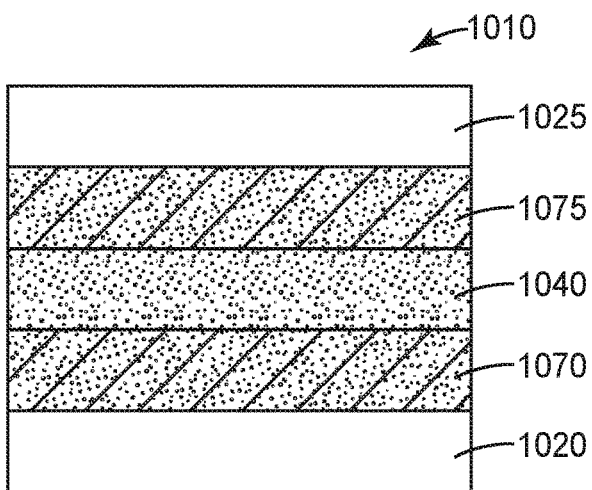
FIG. 10 is a cross section of one embodiment of a construction according to the present disclosure.

With reference to FIG. 10, in one embodiment, construction 1010 comprises first substrate 1020 and second substrate 1025. Second curable films capable of initiating cure of the curable adhesive film are applied to each of first substrate 1020 and second substrate 1025. The two substrates are brought together with a curable adhesive film according to the present disclosure so as to bring the second curable films capable of initiating cure in contact with opposite faces of the curable adhesive film. The curable adhesive film cures to form cured structural adhesive layer 1040 and the second curable films capable of initiating cure also cure, to form cured structural adhesive layers 1070, 1075 which are directly bound to first substrate layer 1020 and second substrate layer 1025. Adhesive layers 1070, 1075 are directly bound to opposite faces of adhesive layer 1040. Such embodiments may enable manufacturing ease and flexibility. In some such embodiments, the second curable adhesive films may be attached to substrates 1020, 1025 at their points of manufacture, and the two may be bonded with a curable adhesive film at a third time and/or place. However, the layers may also be attached in any suitable order. The curable adhesive film and the second curable film capable of initiating cure of the curable adhesive film are typically pressure sensitive adhesives prior to cure. Typically, cure may occur without application of heat or pressure beyond normal temperature and pressure.

With reference to FIGS. 1-10, substrate layers 120, 220, 320, 420, 520, 620, 720, 820, 920, 1020 and second substrates 125, 225, 325, 425, 525, 925, 1025 may be of any suitable material, each chosen independently. Suitable materials may include metals such as aluminum, titanium, steel, and the like. Suitable materials may include polymeric materials, such as polyolefins, polyethylenes, polypropylenes, polystyrenes, poly(meth)acrylates, polyurethanes, natural or synthetic rubbers, polydienes, and the like. Suitable materials may include natural materials, such as wood, stone, and the like; or derivatives such as composite board or concrete, and the like. Suitable materials may include glass or ceramic materials.

With reference to FIGS. 1-8, primer layers 130, 230, 235, 330, 335, 430, 530, 630, 730, 830 may be of any suitable thickness. In some embodiments, thickness is at least 5 micrometers, more typically at least 10 micrometers, more typically at least 20 micrometers, more typically at least 40 micrometers, more typically at least 60 micrometers, more typically at least 80 micrometers, and more typically at least 100 micrometers. In some embodiments, thickness is not more than 200 micrometers and more typically not more than 160 micrometers.

With reference to FIGS. 1-10, cured adhesive layers 140, 240, 340, 345, 440, 540, 640, 740, 840, 940, 970, 1040, 1070, 1075 may be of any suitable thickness. In some embodiments, thickness is at least 20 micrometers, more typically at least 45 micrometers, more typically at least 100 micrometers, more typically at least 200 micrometers, more typically at least 250 micrometers, more typically at least 300 micrometers, and more typically at least 350 micrometers. In some embodiments, thickness is not more than 2000 micrometers, more typically not more than 1000 micrometers, and more typically not more than 500 micrometers.

Additional embodiments are recited in the Selected Embodiments and Examples below.

Selected Embodiments

The following embodiments, designated by letter and number, are intended to further illustrate the present disclosure but should not be construed to unduly limit this disclosure.

1. An adhesive system comprising:
   I) a primer for adhesion of a curable adhesive film to a first substrate comprising:
      a) a first reactive oligomer comprising first unsaturated free-radically polymerizable groups which are pendent groups;
      b) an oxidizing agent; and
      c) a reducible transition metal cation; and
   II) a curable adhesive film which is a room temperature solid comprising a blend of:
      f) a second reactive oligomer comprising second unsaturated free-radically polymerizable groups which are pendent groups; and
      g) a reducing agent.
2. The adhesive system according to embodiment 1 wherein first and second first unsaturated free-radically polymerizable groups are selected from (meth)acrylate groups.
3. The adhesive system according any of the preceding embodiments wherein the first and second reactive oligomers are poly(meth)acrylate oligomers.
4. The adhesive system according any of the preceding embodiments wherein the primer additionally comprises:
   d) a first crosslinker comprising two or more third unsaturated free-radically polymerizable groups.
5. The adhesive system according any of the preceding embodiments wherein the curable adhesive film additionally comprises:
   h) a second crosslinker comprising two or more fourth unsaturated free-radically polymerizable groups.

F1. A curable adhesive film which is a room temperature solid comprising a blend of:
   f) a second reactive oligomer comprising second unsaturated free-radically polymerizable groups which are pendent groups; and
   g) a reducing agent.
F2. The curable adhesive film according to embodiment F1 wherein second unsaturated free-radically polymerizable groups are selected from vinyl-containing groups.
F3. The curable adhesive film according to embodiment F1 wherein second unsaturated free-radically polymerizable groups are selected from (meth)acrylate groups.
F4. The curable adhesive film according to embodiment F1 wherein second unsaturated free-radically polymerizable groups are selected from acrylate groups.
F5. The curable adhesive film according to embodiment F1 wherein second unsaturated free-radically polymerizable groups are selected from methacrylate groups.
F6. The curable adhesive film according to any of the preceding embodiments wherein second unsaturated free-radically polymerizable groups are bound to the second reactive oligomer through urethane linkages.
F7. The curable adhesive film according to any of the preceding embodiments wherein the second reactive oligomer is a poly(meth)acrylate oligomer.
F8. The curable adhesive film according to any of the preceding embodiments wherein the second reactive oligomer is a random copolymeric oligomer.
F9. The curable adhesive film according to any of the preceding embodiments wherein the second reactive oligomer is not a block copolymeric oligomer.
F10. The curable adhesive film according to any of the preceding embodiments wherein greater than 60% of monomer units comprising the second reactive oligomer are derived from (meth)acrylate monomers.
F11. The curable adhesive film according to any of the preceding embodiments wherein greater than 80% of monomer units comprising the second reactive oligomer are derived from (meth)acrylate monomers.
F12. The curable adhesive film according to any of the preceding embodiments wherein greater than 90% of monomer units comprising the second reactive oligomer are derived from (meth)acrylate monomers.
F13. The curable adhesive film according to any of the preceding embodiments wherein the second reactive oligomer has a weight average molecular weight of greater than 3 kDa.
F14. The curable adhesive film according to any of the preceding embodiments wherein the second reactive oligomer has a weight average molecular weight of greater than 30 kDa.
F15. The curable adhesive film according to any of the preceding embodiments wherein the second reactive oligomer has a weight average molecular weight of greater than 100 kDa.
F16. The curable adhesive film according to any of the preceding embodiments wherein the second reactive oligomer has a weight average molecular weight of greater than 200 kDa.
F17. The curable adhesive film according to any of the preceding embodiments wherein the second reactive oligomer has a weight average molecular weight of less than 1,000 kDa.
F18. The curable adhesive film according to any of the preceding embodiments wherein the second reactive oligomer has a weight average molecular weight of less than 600 kDa.
F19. The curable adhesive film according to any of the preceding embodiments wherein the second reactive oligomer has a weight average molecular weight of less than 400 kDa.
F20. The curable adhesive film according to any of the preceding embodiments wherein the second reactive oligomer comprises the second unsaturated free-radically polymerizable groups which are pendent groups in an amount of 10 or more per molecule.
F21. The curable adhesive film according to any of the preceding embodiments wherein the second reactive oligomer comprises the second unsaturated free-radically polymerizable groups which are pendent groups in an amount of 20 or more per molecule.
F22. The curable adhesive film according to any of the preceding embodiments wherein the second reactive oligomer comprises the second unsaturated free-radically polymerizable groups which are pendent groups in an amount of 40 or more per molecule.
F23. The curable adhesive film according to any of the preceding embodiments wherein the second reactive oligomer additionally comprises pendent amide groups.

F24. The curable adhesive film according to any of the preceding embodiments wherein the curable adhesive film comprises at least 50 weight percent of the second reactive oligomer.

F25. The curable adhesive film according to any of the preceding embodiments wherein the curable adhesive film comprises at least 60 weight percent of the second reactive oligomer.

F26. The curable adhesive film according to any of the preceding embodiments wherein the curable adhesive film comprises at least 65 weight percent of the second reactive oligomer.

F27. The curable adhesive film according to any of the preceding embodiments wherein the curable adhesive film comprises at least 70 weight percent of the second reactive oligomer.

F28. The curable adhesive film according to any of the preceding embodiments wherein the curable adhesive film comprises not more than 90 weight percent of the second reactive oligomer.

F29. The curable adhesive film according to any of the preceding embodiments wherein the curable adhesive film comprises not more than 80 weight percent of the second reactive oligomer.

FA1. The curable adhesive film according to any of the preceding embodiments wherein the reducing agent is selected from organic reducing agents.

FA2. The curable adhesive film according to any of the preceding embodiments wherein the reducing agent is selected from the group consisting of ascorbic acid and derivatives thereof.

FA3. The curable adhesive film according to any of the preceding embodiments wherein the reducing agent is selected from the group consisting of ascorbyl esters.

FA4. The curable adhesive film according to any of the preceding embodiments wherein the reducing agent is selected from the group consisting of ascorbyl esters of fatty acids.

FA5. The curable adhesive film according to any of the preceding embodiments wherein the reducing agent is selected from the group consisting of ascorbyl esters of C12-C22 fatty acids.

FA6. The curable adhesive film according to any of the preceding embodiments wherein the reducing agent is ascorbyl palmitate.

FB1. The curable adhesive film according to any of the preceding embodiments additionally comprising:
   h) a second crosslinker comprising two or more fourth unsaturated free-radically polymerizable groups.

FB2. The curable adhesive film according to embodiment FB1 wherein the second crosslinker comprises three or more fourth unsaturated free-radically polymerizable groups.

FB3. The curable adhesive film according to any of embodiments FB1-FB2 wherein the fourth unsaturated free-radically polymerizable groups are selected from vinyl-containing groups.

FB4. The curable adhesive film according to any of embodiments FB1-FB2 wherein the fourth unsaturated free-radically polymerizable groups are selected from (meth)acrylate groups.

FB5. The curable adhesive film according to any of embodiments FB1-FB2 wherein the fourth unsaturated free-radically polymerizable groups are selected from acrylate groups.

FB6. The curable adhesive film according to any of embodiments FB1-FB2 wherein the fourth unsaturated free-radically polymerizable groups are selected from methacrylate groups.

FB7. The curable adhesive film according to any of embodiments FB1-FB6 wherein the curable adhesive film comprises at least 5 weight percent of the second crosslinker.

FB8. The curable adhesive film according to any of embodiments FB1-FB6 wherein the curable adhesive film comprises at least 10 weight percent of the second crosslinker.

FB9. The curable adhesive film according to any of embodiments FB1-FB6 wherein the curable adhesive film comprises at least 15 weight percent of the second crosslinker.

FB10. The curable adhesive film according to any of embodiments FB1-FB9 wherein the curable adhesive film comprises not more than 30 weight percent of the second crosslinker.

FB11. The curable adhesive film according to any of embodiments FB1-FB9 wherein the curable adhesive film comprises not more than 25 weight percent of the second crosslinker.

FB12. The curable adhesive film according to any of embodiments FB1-FB9 wherein the curable adhesive film comprises not more than 20 weight percent of the second crosslinker.

FC1. The curable adhesive film according to any of the preceding embodiments additionally comprising:
   j) a redox accelerator.

FC2. The curable adhesive film according to embodiment FC1 wherein the redox accelerator comprises a quaternary amine.

FC3. The curable adhesive film according to any of the preceding embodiments which is a pressure sensitive adhesive.

FC4. The curable adhesive film according to any of the preceding embodiments having a tacky surface.

FC5. The curable adhesive film according to any of the preceding embodiments additionally comprising solid or hollow particles comprising polymer, glass, ceramic, metal or metal oxide materials.

FC6. The curable adhesive film according to any of the preceding embodiments comprising an outer surface bearing embossed air bleed channels capable of aiding in escape of air during application of the outer surface to a substrate.

P1. A primer for adhesion of a curable adhesive film to a first substrate comprising:
   a) a first reactive oligomer comprising first unsaturated free-radically polymerizable groups which are pendent groups;
   b) an oxidizing agent; and
   c) a reducible transition metal cation.

P2. The primer according to embodiment P1 wherein first unsaturated free-radically polymerizable groups are selected from vinyl-containing groups.

P3. The primer according to embodiment P1 wherein first unsaturated free-radically polymerizable groups are selected from (meth)acrylate groups.

P4. The primer according to embodiment P1 wherein first unsaturated free-radically polymerizable groups are selected from acrylate groups.

P5. The primer according to embodiment P1 wherein first unsaturated free-radically polymerizable groups are selected from methacrylate groups.

P6. The primer according to any of embodiments P1-P5 wherein first unsaturated free-radically polymerizable groups are bound to the first reactive oligomer through urethane linkages.

P7. The primer according to any of embodiments P1-P6 wherein the first reactive oligomer is a poly(meth)acrylate oligomer.

P8. The primer according to any of embodiments P1-P7 wherein the first reactive oligomer is a random copolymeric oligomer.

P9. The primer according to any of embodiments P1-P8 wherein the first reactive oligomer is not a block copolymeric oligomer.

P10. The primer according to any of embodiments P1-P9 wherein greater than 60% of monomer units comprising the first reactive oligomer are derived from (meth)acrylate monomers.

P11. The primer according to any of embodiments P1-P9 wherein greater than 80% of monomer units comprising the first reactive oligomer are derived from (meth)acrylate monomers.

P12. The primer according to any of embodiments P1-P9 wherein greater than 90% of monomer units comprising the first reactive oligomer are derived from (meth)acrylate monomers.

P13. The primer according to any of embodiments P1-P12 wherein the first reactive oligomer has a weight average molecular weight of greater than 3 kDa.

P14. The primer according to any of embodiments P1-P12 wherein the first reactive oligomer has a weight average molecular weight of greater than 30 kDa.

P15. The primer according to any of embodiments P1-P12 wherein the first reactive oligomer has a weight average molecular weight of greater than 100 kDa.

P16. The primer according to any of embodiments P1-P12 wherein the first reactive oligomer has a weight average molecular weight of greater than 200 kDa.

P17. The primer according to any of embodiments P1-P16 wherein the first reactive oligomer has a weight average molecular weight of less than 1,000 kDa.

P18. The primer according to any of embodiments P1-P16 wherein the first reactive oligomer has a weight average molecular weight of less than 600 kDa.

P19. The primer according to any of embodiments P1-P16 wherein the first reactive oligomer has a weight average molecular weight of less than 400 kDa.

P20. The primer according to any of embodiments P1-P19 wherein the first reactive oligomer comprises the first unsaturated free-radically polymerizable groups which are pendent groups in an amount of 10 or more per molecule.

P21. The primer according to any of embodiments P1-P19 wherein the first reactive oligomer comprises the first unsaturated free-radically polymerizable groups which are pendent groups in an amount of 20 or more per molecule.

P22. The primer according to any of embodiments P1-P19 wherein the first reactive oligomer comprises the first unsaturated free-radically polymerizable groups which are pendent groups in an amount of 40 or more per molecule.

P23. The primer according to any of embodiments P1-P22 wherein the first reactive oligomer additionally comprises pendent amide groups.

P24. The primer according to any of embodiments P1-P23 comprising at least 5 weight percent (based on total solids weight including plasticizer if present) of the first reactive oligomer.

P25. The primer according to any of embodiments P1-P23 comprising at least 10 weight percent (based on total solids weight including plasticizer if present) of the first reactive oligomer.

P26. The primer according to any of embodiments P1-P23 comprising at least 15 weight percent (based on total solids weight including plasticizer if present) of the first reactive oligomer.

P27. The primer according to any of embodiments P1-P23 comprising at least 20 weight percent (based on total solids weight including plasticizer if present) of the first reactive oligomer.

P28. The primer according to any of embodiments P1-P23 comprising at least 30 weight percent (based on total solids weight including plasticizer if present) of the first reactive oligomer.

P29. The primer according to any of embodiments P1-P23 comprising at least 40 weight percent (based on total solids weight including plasticizer if present) of the first reactive oligomer.

P30. The primer according to any of embodiments P1-P29 comprising not more than 60 weight percent (based on total solids weight including plasticizer if present) of the first reactive oligomer.

P31. The primer according to any of embodiments P1-P29 comprising not more than 50 weight percent (based on total solids weight including plasticizer if present) of the first reactive oligomer.

P32. The primer according to any of embodiments P1-P26 comprising not more than 20 weight percent (based on total solids weight including plasticizer if present) of the first reactive oligomer.

PA1. The primer according to any of embodiments P1-P32 wherein the oxidizing agent is a peroxide.

PA2. The primer according to any of embodiments P1-P32 wherein the oxidizing agent comprises a hydroperoxide group.

PA3. The primer according to any of embodiments P1-P32 or PA1-PA2 wherein the oxidizing agent is aromatic.

PA4. The primer according to any of embodiments P1-P32 wherein the oxidizing agent is cumene hydroperoxide.

PA5. The primer according to any of embodiments P1-P32 or PA1-PA4 comprising at least 5 weight percent of the oxidizing agent.

PA6. The primer according to any of embodiments P1-P32 or PA1-PA4 comprising at least 10 weight percent of the oxidizing agent.

PA7. The primer according to any of embodiments P1-P32 or PA1-PA4 comprising at least 20 weight percent (based on total solids weight including plasticizer if present) of the oxidizing agent.

PA8. The primer according to any of embodiments P1-P32 or PA1-PA4 comprising at least 30 weight percent (based on total solids weight including plasticizer if present) of the oxidizing agent.

PA9. The primer according to any of embodiments P1-P32 or PA1-PA8 comprising not more than 50 weight percent (based on total solids weight including plasticizer if present) of the oxidizing agent.

PA10. The primer according to any of embodiments P1-P32 or PA1-PA6 comprising not more than 20 weight percent (based on total solids weight including plasticizer if present) of the oxidizing agent.

PB1. The primer according to any of embodiments P1-P32 or PA1-PA10 wherein the reducible transition metal cation is a cation of molybdenum, titanium, vanadium, chromium, manganese, iron, cobalt, nickel, copper or zinc.

PB2. The primer according to any of embodiments P1-P32 or PA1-PA10 wherein the reducible transition metal cation is a copper cation.

PB3. The primer according to any of embodiments P1-P32 or PA1-PA10 wherein the reducible transition metal cation is Cu(II).

PC1. The primer according to any of embodiments P1-P32, PA1-PA10 or PB1-PB3 additionally comprising:
  d) a first crosslinker comprising two or more third unsaturated free-radically polymerizable groups.

PC2. The primer according to embodiment PC1 wherein the first crosslinker comprises three or more third unsaturated free-radically polymerizable groups.

PC3. The primer according to any of embodiments PC1-PC2 wherein the third unsaturated free-radically polymerizable groups are selected from vinyl-containing groups.

PC4. The primer according to any of embodiments PC1-PC2 wherein the third unsaturated free-radically polymerizable groups are selected from (meth)acrylate groups.

PC5. The primer according to any of embodiments PC1-PC2 wherein the third unsaturated free-radically polymerizable groups are selected from acrylate groups.

PC6. The primer according to any of embodiments PC1-PC2 wherein the third unsaturated free-radically polymerizable groups are selected from methacrylate groups.

PC7. The primer according to any of embodiments PC1-PC6 wherein the primer comprises at least 1.0 weight percent (based on total solids weight including plasticizer if present) of the first crosslinker.

PC8. The primer according to any of embodiments PC1-PC6 wherein the primer comprises at least 2.0 weight percent (based on total solids weight including plasticizer if present) of the first crosslinker.

PC9. The primer according to any of embodiments PC1-PC6 wherein the primer comprises at least 5.0 weight percent (based on total solids weight including plasticizer if present) of the first crosslinker.

PC10. The primer according to any of embodiments PC1-PC9 wherein the primer comprises not more than 10 weight percent (based on total solids weight including plasticizer if present) of the first crosslinker.

PC11. The primer according to any of embodiments PC1-PC8 wherein the primer comprises not more than 5.0 weight percent (based on total solids weight including plasticizer if present) of the first crosslinker.

PC12. The primer according to any of embodiments PC1-PC8 wherein the primer comprises not more than 3.0 weight percent (based on total solids weight including plasticizer if present) of the first crosslinker.

PD1. The primer according to any of embodiments P1-P32, PA1-PA10, PB1-PB3 or PC1-PC12 additionally comprising:
  e) a plasticizer.

PD2. The primer according to embodiment PD1 wherein the plasticizer is a low vapor pressure plasticizer.

PD3. The primer according to embodiment PD1 wherein the plasticizer has a vapor pressure of less than $10^{-4}$ mm Hg at 25° C.

PD4. The primer according to embodiment PD1 wherein the plasticizer has a vapor pressure of less than $10^{-5}$ mm Hg at 25° C.

PD5. The primer according to any of embodiments PD1-PD4 wherein the plasticizer is an ester of a C12-C22 fatty acid.

PD6. The primer according to embodiment PD1 wherein the plasticizer is isopropyl myristate.

PD7. The primer according to any of embodiments PD1-PD6 wherein the primer comprises at least 10 weight percent (based on total solids weight including plasticizer) of the plasticizer.

PD8. The primer according to any of embodiments PD1-PD6 wherein the primer comprises at least 30 weight percent (based on total solids weight including plasticizer) of the plasticizer.

PD9. The primer according to any of embodiments PD1-PD6 wherein the primer comprises at least 50 weight percent (based on total solids weight including plasticizer) of the plasticizer.

PD10. The primer according to any of embodiments PD1-PD9 wherein the primer comprises not more than 80 weight percent (based on total solids weight including plasticizer) of the plasticizer.

PD11. The primer according to any of embodiments PD1-PD9 wherein the primer comprises not more than 70 weight percent (based on total solids weight including plasticizer) of the plasticizer.

PD12. The primer according to any of embodiments P1-P32, PA1-PA10, PB1-PB3, PC1-PC12 or PD1-PD11 additionally comprising solid or hollow particles comprising polymer, glass, ceramic, metal or metal oxide materials.

T1. A tape comprising a first curable adhesive film layer which is a layer of the curable adhesive film according to any of embodiments F1-F29, FA1-FA6, FB1-FB12 or FC1-FC6.

T2. The tape according to embodiment T1 additionally comprising a support layer borne on the first curable adhesive film layer.

T3. The tape according to embodiment T1 additionally comprising a support layer directly bound to the first curable adhesive film layer.

T4. The tape according to embodiment T1 additionally comprising a support layer bound to the first curable adhesive film layer through a secondary primer layer.

T5. The tape according to any of embodiments T2-T4 additionally comprising a second curable adhesive film layer which is a layer of the curable adhesive film according to any of embodiments F1-F29, FA1-FA6, FB1-FB12 or FC1-FC6 chosen independently of the first curable adhesive film layer, wherein the second curable adhesive film layer is borne on a face of the support layer opposite the first curable adhesive film layer.

T6. The tape according to embodiment T5 wherein the support layer is directly bound to the second curable adhesive film layer.

T7. The tape according to embodiment T5 wherein the support layer is bound to the second curable adhesive film layer through a second secondary primer layer.

T8. The tape according to any of embodiments T2-T4 additionally comprising a secondary adhesive film layer, wherein the secondary adhesive film layer is borne on a face of the support layer opposite the first curable adhesive film layer.

T9. The tape according to embodiment T8 wherein the support layer is directly bound to the secondary adhesive film layer.

T10. The tape according to embodiment T8 wherein the support layer is bound to the secondary adhesive film layer through a second secondary primer layer.

T11. The tape according to embodiment T1 which comprises a single layer which is the first curable adhesive film layer.

T12. The tape according to embodiment T1 additionally comprising a secondary adhesive film layer, wherein the secondary adhesive film layer is borne on the first curable adhesive film layer.

T13. The tape according to embodiment T1 additionally comprising a secondary adhesive film layer, wherein the secondary adhesive film layer is directly bound to the first curable adhesive film layer.

T14. The tape according to embodiment T1 additionally comprising a surfacing layer, wherein the surfacing layer is borne on the first curable adhesive film layer.

T15. The tape according to embodiment T1 additionally comprising a surfacing layer, wherein the surfacing layer is directly bound to the first curable adhesive film layer.

T16. The tape according to embodiment T1 additionally comprising a surfacing layer, wherein the surfacing layer is bound to the first curable adhesive film layer through a third secondary primer layer.

T17. The tape according to any of embodiments T1-T16 additionally comprising a release liner in direct contact with at least one curable adhesive film layer.

T18. The tape according to any of embodiments T1-T17 wherein at least one curable adhesive film layer comprises at least one outer surface bearing embossed air bleed channels capable of aiding in escape of air during application of the outer surface to a substrate.

AS1. An adhesive system comprising:
  I) a primer according to any of embodiments P1-P32, PA1-PA10, PB1-PB3, PC1-PC12 or PD1-PD12; and
  II) a curable adhesive film according to any of embodiments F1-F29, FA1-FA6, FB1-FB12 or FC1-FC6.

AS2. The adhesive system according to embodiment AS1 wherein I) and II) are packaged together.

AS3. The adhesive system according to embodiment AS1 wherein I) and II) are sold together.

AS4. An adhesive system comprising:
  I) a primer according to any of embodiments P1-P32, PA1-PA10, PB1-PB3, PC1-PC12 or PD1-PD12; and
  III) a tape according to any of embodiments T1-T18.

AS5. The adhesive system according to embodiment AS4 wherein I) and III) are packaged together.

AS6. The adhesive system according to embodiment AS5 wherein I) and III) are sold together.

AS7. The adhesive system according to any of embodiments AS1-AS6 wherein the second unsaturated free-radically polymerizable groups and the first unsaturated free-radically polymerizable groups are the same.

AS8. The adhesive system according to any of embodiments AS1-AS6 wherein the second unsaturated free-radically polymerizable groups and the first unsaturated free-radically polymerizable groups are different.

AS9. The adhesive system according to any of embodiments AS1-AS6 wherein the second reactive oligomer and the first reactive oligomer are the same.

AS10. The adhesive system according to any of embodiments AS1-AS6 wherein the second reactive oligomer and the first reactive oligomer are different.

AS11. The adhesive system according to any of embodiments AS1-AS10 wherein the curable adhesive film additionally comprises:
  h) a second crosslinker comprising two or more fourth unsaturated free-radically polymerizable groups; and
wherein the primer additionally comprises:
  d) a first crosslinker comprising two or more third unsaturated free-radically polymerizable groups;
wherein the fourth unsaturated free-radically polymerizable groups and third unsaturated free-radically polymerizable groups are the same.

AS12. The adhesive system according to any of embodiments AS1-AS10 wherein the curable adhesive film additionally comprises:
  h) a second crosslinker comprising two or more fourth unsaturated free-radically polymerizable groups; and
wherein the primer additionally comprises:
  d) a first crosslinker comprising two or more third unsaturated free-radically polymerizable groups;
wherein the fourth unsaturated free-radically polymerizable groups and third unsaturated free-radically polymerizable groups are different.

AS13. The adhesive system according to any of embodiments AS1-AS10 wherein the curable adhesive film additionally comprises:
  h) a second crosslinker comprising two or more fourth unsaturated free-radically polymerizable groups; and
wherein the primer additionally comprises:
  d) a first crosslinker comprising two or more third unsaturated free-radically polymerizable groups;
wherein the second crosslinker and the first crosslinker are the same.

AS14. The adhesive system according to any of embodiments AS1-AS10 wherein the curable adhesive film additionally comprises:
  h) a second crosslinker comprising two or more fourth unsaturated free-radically polymerizable groups; and
wherein the primer additionally comprises:
  d) a first crosslinker comprising two or more third unsaturated free-radically polymerizable groups;
wherein the second crosslinker and the first crosslinker are different.

CA1. A construction comprising:
  i) a first cured primer layer obtained by cure of a primer according to any of embodiments P1-P32, PA1-PA10, PB1-PB3, PC1-PC12 or PD1-PD12; directly bound to
  ii) a first cured structural adhesive layer obtained by cure of a curable adhesive film according to any of embodiments F1-F29, FA1-FA6, FB1-FB12 or FC1-FC6.

CA2. The construction according to embodiment CA1 additionally comprising:
  iii) a first substrate directly bound to the first cured primer layer.

CA3. The construction according to embodiment CA2 additionally comprising:
  iv) a second cured primer layer obtained by cure of a primer according to any of embodiments P1-P32, PA1-PA10, PB1-PB3, PC1-PC12 or PD1-PD12 chosen independently of the first cured primer layer; wherein the second cured primer layer is directly bound to the first cured structural adhesive layer; and
  v) a second substrate directly bound to the second cured primer layer.

CA4. The construction according to embodiment CA3 wherein the first cured primer layer and the second cured primer layer comprise the same material.

CA5. The construction according to embodiment CA3 wherein the first cured primer layer and the second cured primer layer comprise different materials.

CA6. The construction according to embodiment CA2 additionally comprising:
  v) a second substrate directly bound to the first cured structural adhesive layer.

CA7. The construction according to embodiment CA2 additionally comprising:
  vi) a surfacing layer borne on the first cured structural adhesive layer.

CA8. The construction according to embodiment CA2 additionally comprising:
  vi) a surfacing layer directly bonded to the first cured structural adhesive layer.

CA9. The construction according to embodiment CA2 additionally comprising:
  vii) a secondary adhesive layer borne on the first cured structural adhesive layer.
CA10. The construction according to embodiment CA2 additionally comprising:
  vii) a secondary adhesive layer directly bonded to the first cured structural adhesive layer.
CA11. The construction according to embodiment CA9 or CA10 additionally comprising:
  v) a second substrate borne on the secondary adhesive layer.
CA12. The construction according to embodiment CA9 or CA10 additionally comprising:
  v) a second substrate directly bound to the secondary adhesive layer.
CA13. The construction according to embodiment CA2 additionally comprising:
  viii) a support layer borne on the first cured structural adhesive layer.
CA14. The construction according to embodiment CA2 additionally comprising:
  viii) a support layer directly bonded to the first cured structural adhesive layer.
CA15. The construction according to embodiment CA13 or CA14 additionally comprising:
  ix) a second cured structural adhesive layer obtained by cure of a curable adhesive film according to any of embodiments F1-F29, FA1-FA6, FB1-FB12 or FC1-FC6 chosen independently of the first cured structural adhesive layer; wherein the second cured structural adhesive layer is borne on the support layer.
CA16. The construction according to embodiment CA13 or CA14 additionally comprising:
  ix) a second cured structural adhesive layer obtained by cure of a curable adhesive film according to any of embodiments F1-F29, FA1-FA6, FB1-FB12 or FC1-FC6 chosen independently of the first cured structural adhesive layer; wherein the second cured structural adhesive layer is directly bound to the support layer.
CA17. The construction according to embodiment CA15 or CA16 wherein the first cured structural adhesive layer and second cured structural adhesive layer comprise the same material.
CA18. The construction according to embodiment CA15 or CA16 wherein the first cured structural adhesive layer and second cured structural adhesive layer comprise different material.
CA19. The construction according to any of embodiments CA15-CA18 additionally comprising:
  iv) a second cured primer layer obtained by cure of a primer according to any of embodiments P1-P32, PA1-PA10, PB1-PB3, PC1-PC12 or PD1-PD12 chosen independently of the first cured primer layer; wherein the second cured primer layer is directly bound to the second cured structural adhesive layer; and
  v) a second substrate directly bound to the second cured primer layer.
CA20. The construction according to embodiment CA13 or CA14 additionally comprising:
  vii) a secondary adhesive layer borne on the support layer.
CA21. The construction according to embodiment CA13 or CA14 additionally comprising:
  vii) a secondary adhesive layer directly bound to the support layer.
CA22. The construction according to embodiment CA13 or CA14 additionally comprising:
  vii) a secondary adhesive layer bound to the support layer through a secondary primer layer.
CA23. The construction according to any of embodiments CA20-CA21 additionally comprising:
  v) a second substrate borne on the secondary adhesive layer.
CA24. The construction according to any of embodiments CA20-CA21 additionally comprising:
  v) a second substrate directly bound to the secondary adhesive layer.
CA25. The construction according to any of embodiments CA20-CA21 additionally comprising:
  v) a second substrate bound to the secondary adhesive layer through a secondary primer.
CA26. A construction comprising a bond obtained by cure of a tape according to any of embodiments T1-T18.
B1. An adhesive system comprising:
  I) a primer for adhesion of a curable adhesive free-standing film to a first substrate comprising:
    a) a first film-forming polymer or oligomer;
    b) a first species comprising first unsaturated free-radically polymerizable groups, which may be a) or may be a species other than a);
    c) a transition metal cation; and
    d) an oxidizing agent that is not a), b), or c);
  wherein the primer is a liquid at normal temperature and pressure; and
  II) a curable adhesive free-standing film comprising a blend of:
    e) a second film-forming polymer or oligomer;
    f) a second species comprising second unsaturated free-radically polymerizable groups, which may be e) or may be a species other than e);
    g) a reducing agent that is not e) or f).
B2. The adhesive system according to embodiment B1 wherein first and second first unsaturated free-radically polymerizable groups are independently selected from (meth)acrylate groups.
B3. The adhesive system according any of embodiments B1-B2 wherein the first and second film-forming polymers or oligomers are poly(meth)acrylate oligomers.
B4. The adhesive system according any of embodiments B1-B3 wherein the primer additionally comprises:
  h) a first crosslinker comprising two or more third unsaturated free-radically polymerizable groups.
B5. The adhesive system according any of embodiments B1-B4 wherein the curable free-standing adhesive film additionally comprises:
  j) a second crosslinker comprising two or more fourth unsaturated free-radically polymerizable groups.
B6. The adhesive system according any of embodiments B1-B5 wherein b) is a).
B7. The adhesive system according any of embodiments B1-B5 wherein b) is a species other than a).
B8. The adhesive system according any of embodiments B1-B7 wherein f) is e).
B9. The adhesive system according any of embodiments B1-B7 wherein e) is a species other than f).
BF1. A curable adhesive free-standing film comprising a blend of:
  e) a second film-forming polymer or oligomer;
  f) a second species comprising second unsaturated free-radically polymerizable groups, which may be e) or may be a species other than e);
  g) a reducing agent that is not e) or f) and which does not comprise a transition metal, nitrogen or sulfur.

BF2. The curable adhesive free-standing film according to embodiment BF1 wherein second unsaturated free-radically polymerizable groups are selected from vinyl-containing groups.

BF3. The curable adhesive free-standing film according to embodiment BF1 wherein second unsaturated free-radically polymerizable groups are selected from (meth)acrylate groups.

BF4. The curable adhesive free-standing film according to embodiment BF1 wherein second unsaturated free-radically polymerizable groups are selected from acrylate groups.

BF5. The curable adhesive free-standing film according to embodiment BF1 wherein second unsaturated free-radically polymerizable groups are selected from methacrylate groups.

BF6. The curable adhesive free-standing film according to any of embodiments BF1-BF5 wherein f) is e) and the second unsaturated free-radically polymerizable groups are bound to the second film-forming polymer or oligomer through urethane linkages.

BF7. The curable adhesive free-standing film according to any of embodiments BF1-BF6 wherein the second film-forming polymer or oligomer is a poly(meth)acrylate oligomer.

BF8. The curable adhesive free-standing film according to any of embodiments BF1-BF7 wherein the second film-forming polymer or oligomer is a random copolymeric oligomer.

BF9. The curable adhesive free-standing film according to any of embodiments BF1-BF8 wherein the second film-forming polymer or oligomer is not a block copolymeric oligomer.

BF10. The curable adhesive free-standing film according to any of embodiments BF1-BF9 wherein greater than 60% of monomer units comprising the second film-forming polymer or oligomer are derived from (meth)acrylate monomers.

BF11. The curable adhesive free-standing film according to any of embodiments BF1-BF9 wherein greater than 80% of monomer units comprising the second film-forming polymer or oligomer are derived from (meth)acrylate monomers.

BF12. The curable adhesive free-standing film according to any of embodiments BF1-BF9 wherein greater than 90% of monomer units comprising the second film-forming polymer or oligomer are derived from (meth)acrylate monomers.

BF13. The curable adhesive free-standing film according to any of embodiments BF1-BF12 wherein the second film-forming polymer or oligomer has a weight average molecular weight of greater than 3 kDa.

BF14. The curable adhesive free-standing film according to any of embodiments BF1-BF12 wherein the second film-forming polymer or oligomer has a weight average molecular weight of greater than 30 kDa.

BF15. The curable adhesive free-standing film according to any of embodiments BF1-BF12 wherein the second film-forming polymer or oligomer has a weight average molecular weight of greater than 100 kDa.

BF16. The curable adhesive free-standing film according to any of embodiments BF1-BF12 wherein the second film-forming polymer or oligomer has a weight average molecular weight of greater than 200 kDa.

BF17. The curable adhesive free-standing film according to any of embodiments BF1-BF16 wherein the second film-forming polymer or oligomer has a weight average molecular weight of less than 1,000 kDa.

BF18. The curable adhesive free-standing film according to any of embodiments BF1-BF16 wherein the second film-forming polymer or oligomer has a weight average molecular weight of less than 600 kDa.

BF19. The curable adhesive free-standing film according to any of embodiments BF1-BF16 wherein the second film-forming polymer or oligomer has a weight average molecular weight of less than 400 kDa.

BF20. The curable adhesive free-standing film according to any of embodiments BF1-BF19 wherein f) is e) and the second film-forming polymer or oligomer comprises the second unsaturated free-radically polymerizable groups in an amount of 10 or more per molecule.

BF21. The curable adhesive free-standing film according to any of embodiments BF1-BF19 wherein f) is e) and the second film-forming polymer or oligomer comprises the second unsaturated free-radically polymerizable groups in an amount of 20 or more per molecule.

BF22. The curable adhesive free-standing film according to any of embodiments BF1-BF19 wherein f) is e) and the second film-forming polymer or oligomer comprises the second unsaturated free-radically polymerizable groups in an amount of 40 or more per molecule.

BF23. The curable adhesive free-standing film according to any of embodiments BF1-BF22 wherein the second film-forming polymer or oligomer additionally comprises pendent amide groups.

BF24. The curable adhesive free-standing film according to any of embodiments BF1-BF23 wherein the curable adhesive free-standing film comprises at least 50 weight percent of the second film-forming polymer or oligomer.

BF25. The curable adhesive free-standing film according to any of embodiments BF1-BF23 wherein the curable adhesive free-standing film comprises at least 60 weight percent of the second film-forming polymer or oligomer.

BF26. The curable adhesive free-standing film according to any of embodiments BF1-BF23 wherein the curable adhesive free-standing film comprises at least 65 weight percent of the second film-forming polymer or oligomer.

BF27. The curable adhesive free-standing film according to any of embodiments BF1-BF23 wherein the curable adhesive free-standing film comprises at least 70 weight percent of the second film-forming polymer or oligomer.

BF28. The curable adhesive free-standing film according to any of embodiments BF1-BF27 wherein the curable adhesive free-standing film comprises not more than 90 weight percent of the second film-forming polymer or oligomer.

BF29. The curable adhesive free-standing film according to any of embodiments BF1-BF27 wherein the curable adhesive free-standing film comprises not more than 80 weight percent of the second film-forming polymer or oligomer.

BF30. The curable adhesive free-standing film according to any of embodiments BF1-BF29 wherein f) is e).

BF31. The curable adhesive free-standing film according to any of embodiments BF1-BF29 wherein f) is e) and the second unsaturated free-radically polymerizable groups are pendent groups of the second film-forming polymer or oligomer.

BFA1. The curable adhesive free-standing film according to any of embodiments BF1-BF31 wherein the reducing agent is selected from organic reducing agents.

BFA2. The curable adhesive free-standing film according to any of embodiments BF1-BF31 wherein the reducing agent is selected from the group consisting of ascorbic acid and derivatives thereof.

BFA3. The curable adhesive free-standing film according to any of embodiments BF1-BF31 wherein the reducing agent is selected from the group consisting of ascorbyl esters.

BFA4. The curable adhesive free-standing film according to any of embodiments BF1-BF31 wherein the reducing agent is selected from the group consisting of ascorbyl esters of fatty acids.

BFA5. The curable adhesive free-standing film according to any of embodiments BF1-BF31 wherein the reducing agent is selected from the group consisting of ascorbyl esters of C12-C22 fatty acids.

BFA6. The curable adhesive free-standing film according to any of embodiments BF1-BF31 wherein the reducing agent is ascorbyl palmitate.

BFB1. The curable adhesive free-standing film according to any of embodiments BF1-BF31 or BFA1-BFA6 additionally comprising:
    k) a second crosslinker comprising two or more fourth unsaturated free-radically polymerizable groups.

BFB2. The curable adhesive free-standing film according to embodiment BFB1 wherein the second crosslinker comprises three or more fourth unsaturated free-radically polymerizable groups.

BFB3. The curable adhesive free-standing film according to any of embodiments BFB1-BFB2 wherein the fourth unsaturated free-radically polymerizable groups are selected from vinyl-containing groups.

BFB4. The curable adhesive free-standing film according to any of embodiments BFB1-BFB2 wherein the fourth unsaturated free-radically polymerizable groups are selected from (meth)acrylate groups.

BFB5. The curable adhesive free-standing film according to any of embodiments BFB1-BFB2 wherein the fourth unsaturated free-radically polymerizable groups are selected from acrylate groups.

BFB6. The curable adhesive free-standing film according to any of embodiments BFB1-BFB2 wherein the fourth unsaturated free-radically polymerizable groups are selected from methacrylate groups.

BFB7. The curable adhesive free-standing film according to any of embodiments BFB1-BFB6 wherein the curable adhesive free-standing film comprises at least 5 weight percent of the second crosslinker.

BFB8. The curable adhesive free-standing film according to any of embodiments BFB1-BFB6 wherein the curable adhesive free-standing film comprises at least 10 weight percent of the second crosslinker.

BFB9. The curable adhesive free-standing film according to any of embodiments BFB1-BFB6 wherein the curable adhesive free-standing film comprises at least 15 weight percent of the second crosslinker.

BFB10. The curable adhesive free-standing film according to any of embodiments BFB1-BFB9 wherein the curable adhesive free-standing film comprises not more than 30 weight percent of the second crosslinker.

BFB11. The curable adhesive free-standing film according to any of embodiments BFB1-BFB9 wherein the curable adhesive free-standing film comprises not more than 25 weight percent of the second crosslinker.

BFB12. The curable adhesive free-standing film according to any of embodiments BFB1-BFB9 wherein the curable adhesive free-standing film comprises not more than 20 weight percent of the second crosslinker.

BFC1. The curable adhesive free-standing film according to any of embodiments BF1-BF31, BFA1-BFA6, or BFB1-BFB12 additionally comprising:
    m) a redox accelerator.

BFC2. The curable adhesive free-standing film according to embodiment BFC1 wherein the redox accelerator comprises a quaternary amine.

BFC3. The curable adhesive free-standing film according to any of embodiments BF1-BF31, BFA1-BFA6, BFB1-BFB12, or BFC1-BFC2 which is a pressure sensitive adhesive.

BFC4. The curable adhesive free-standing film according to any of embodiments BF1-BF31, BFA1-BFA6, BFB1-BFB12, or BFC1-BFC3 having a tacky surface.

BFC5. The curable adhesive free-standing film according to any of embodiments BF1-BF31, BFA1-BFA6, BFB1-BFB12, or BFC1-BFC4 additionally comprising solid or hollow particles comprising polymer, glass, ceramic, metal or metal oxide materials.

BFC6. The curable adhesive free-standing film according to any of embodiments BF1-BF31, BFA1-BFA6, BFB1-BFB12, or BFC1-BFC5 comprising an outer surface bearing embossed air bleed channels capable of aiding in escape of air during application of the outer surface to a substrate.

BFC7. The curable adhesive free-standing film according to any of embodiments BF1-BF31, BFA1-BFA6, BFB1-BFB12, or BFC1-BFC6 wherein f) is a species other than e), wherein e) does not comprise unsaturated free-radically polymerizable groups.

BFC8. The curable adhesive free-standing film according to embodiment BFC7 wherein e) is selected from the group consisting of acrylic polymers, rubber polymers, polyester polymers, polyurethane polymers, polyamide polymers, and combinations thereof.

BFC9. The curable adhesive free-standing film according to any of embodiments BF1-BF31, BFA1-BFA6, BFB1-BFB12, or BFC1-BFC8 which does not comprise a transition metal cation.

BFC10. The curable adhesive free-standing film according to any of embodiments BF1-BF31, BFA1-BFA6, BFB1-BFB12, or BFC1-BFC9 which does not comprise an oxidizing agent that is not e) or f).

BFC11. The curable adhesive free-standing film according to any of embodiments BF1-BF31, BFA1-BFA6, BFB1-BFB12, or BFC1-BFC9 which does not comprise a peroxide.

BP1. A primer for adhesion of a curable adhesive film to a first substrate comprising:
    a) a first film-forming polymer or oligomer;
    b) a species comprising first unsaturated free-radically polymerizable groups, which may be a) or may be a species other than a);
    c) a transition metal cation; and
    d) an oxidizing agent that is not a), b), or c);
    wherein the primer is a liquid at normal temperature and pressure.

BP2. The primer according to embodiment BP1 wherein first unsaturated free-radically polymerizable groups are selected from vinyl-containing groups.

BP3. The primer according to embodiment BP1 wherein first unsaturated free-radically polymerizable groups are selected from (meth)acrylate groups.

BP4. The primer according to embodiment BP1 wherein first unsaturated free-radically polymerizable groups are selected from acrylate groups.

BP5. The primer according to embodiment BP1 wherein first unsaturated free-radically polymerizable groups are selected from methacrylate groups.

BP6. The primer according to any of embodiments BP1-BP5 wherein b) is a) and first unsaturated free-radically polymerizable groups are bound to the first film-forming polymer or oligomer through urethane linkages.

BP7. The primer according to any of embodiments BP1-BP6 wherein the first film-forming polymer or oligomer is a poly(meth)acrylate oligomer.

BP8. The primer according to any of embodiments BP1-BP7 wherein the first film-forming polymer or oligomer is a random copolymeric oligomer.

BP9. The primer according to any of embodiments BP1-BP8 wherein the first film-forming polymer or oligomer is not a block copolymeric oligomer.

BP10. The primer according to any of embodiments BP1-BP9 wherein greater than 60% of monomer units comprising the first film-forming polymer or oligomer are derived from (meth)acrylate monomers.

BP11. The primer according to any of embodiments BP1-BP9 wherein greater than 80% of monomer units comprising the first film-forming polymer or oligomer are derived from (meth)acrylate monomers.

BP12. The primer according to any of embodiments BP1-BP9 wherein greater than 90% of monomer units comprising the first film-forming polymer or oligomer are derived from (meth)acrylate monomers.

BP13. The primer according to any of embodiments BP1-BP12 wherein the first film-forming polymer or oligomer has a weight average molecular weight of greater than 3 kDa.

BP14. The primer according to any of embodiments BP1-BP12 wherein the first film-forming polymer or oligomer has a weight average molecular weight of greater than 30 kDa.

BP15. The primer according to any of embodiments BP1-BP12 wherein the first film-forming polymer or oligomer has a weight average molecular weight of greater than 100 kDa.

BP16. The primer according to any of embodiments BP1-BP12 wherein the first film-forming polymer or oligomer has a weight average molecular weight of greater than 200 kDa.

BP17. The primer according to any of embodiments BP1-BP16 wherein the first film-forming polymer or oligomer has a weight average molecular weight of less than 1,000 kDa.

BP18. The primer according to any of embodiments BP1-BP16 wherein the first film-forming polymer or oligomer has a weight average molecular weight of less than 600 kDa.

BP19. The primer according to any of embodiments BP1-BP16 wherein the first film-forming polymer or oligomer has a weight average molecular weight of less than 400 kDa.

BP20. The primer according to any of embodiments BP1-BP19 wherein b) is a) and the first film-forming polymer or oligomer comprises the first unsaturated free-radically polymerizable groups which are pendent groups in an amount of 10 or more per molecule.

BP21. The primer according to any of embodiments BP1-BP19 wherein b) is a) and the first film-forming polymer or oligomer comprises the first unsaturated free-radically polymerizable groups which are pendent groups in an amount of 20 or more per molecule.

BP22. The primer according to any of embodiments BP1-BP19 wherein b) is a) and the first film-forming polymer or oligomer comprises the first unsaturated free-radically polymerizable groups which are pendent groups in an amount of 40 or more per molecule.

BP23. The primer according to any of embodiments BP1-BP22 wherein the first film-forming polymer or oligomer additionally comprises pendent amide groups.

BP24. The primer according to any of embodiments BP1-BP23 comprising at least 5 weight percent (based on total solids weight including excipient if present) of the first film-forming polymer or oligomer.

BP25. The primer according to any of embodiments BP1-BP23 comprising at least 10 weight percent (based on total solids weight including excipient if present) of the first film-forming polymer or oligomer.

BP26. The primer according to any of embodiments BP1-BP23 comprising at least 15 weight percent (based on total solids weight including excipient if present) of the first film-forming polymer or oligomer.

BP27. The primer according to any of embodiments BP1-BP23 comprising at least 20 weight percent (based on total solids weight including excipient if present) of the first film-forming polymer or oligomer.

BP28. The primer according to any of embodiments BP1-BP23 comprising at least 30 weight percent (based on total solids weight including excipient if present) of the first film-forming polymer or oligomer.

BP29. The primer according to any of embodiments BP1-BP23 comprising at least 40 weight percent (based on total solids weight including excipient if present) of the first film-forming polymer or oligomer.

BP30. The primer according to any of embodiments BP1-BP29 comprising not more than 60 weight percent (based on total solids weight including excipient if present) of the first film-forming polymer or oligomer.

BP31. The primer according to any of embodiments BP1-BP29 comprising not more than 50 weight percent (based on total solids weight including excipient if present) of the first film-forming polymer or oligomer.

BP32. The primer according to any of embodiments BP1-BP26 comprising not more than 20 weight percent (based on total solids weight including excipient if present) of the first film-forming polymer or oligomer.

BP33. The primer according to any of embodiments BP1-BP32 wherein b) is a).

BP34. The primer according to any of embodiments BP1-BP32 wherein b) is a) and the first unsaturated free-radically polymerizable groups are pendent groups of the first film-forming polymer or oligomer.

BPA1. The primer according to any of embodiments BP1-BP34 wherein the oxidizing agent is a peroxide.

BPA2. The primer according to any of embodiments BP1-BP34 wherein the oxidizing agent comprises a hydroperoxide group.

BPA3. The primer according to any of embodiments BP1-BP34 or BPA1-BPA2 wherein the oxidizing agent is aromatic.

BPA4. The primer according to any of embodiments BP1-BP34 wherein the oxidizing agent is cumene hydroperoxide.

BPA5. The primer according to any of embodiments BP1-BP34 or BPA1-BPA4 comprising at least 5 weight percent of the oxidizing agent.

BPA6. The primer according to any of embodiments BP1-BP34 or BPA1-BPA4 comprising at least 10 weight percent of the oxidizing agent.

BPA7. The primer according to any of embodiments BP1-BP34 or BPA1-BPA4 comprising at least 20 weight percent (based on total solids weight including excipient if present) of the oxidizing agent.

BPA8. The primer according to any of embodiments BP1-BP34 or BPA1-BPA4 comprising at least 30 weight percent (based on total solids weight including excipient if present) of the oxidizing agent.

BPA9. The primer according to any of embodiments BP1-BP34 or BPA1-BPA8 comprising not more than 50 weight percent (based on total solids weight including excipient if present) of the oxidizing agent.

BPA10. The primer according to any of embodiments BP1-BP34 or BPA1-BPA6 comprising not more than 20 weight percent (based on total solids weight including excipient if present) of the oxidizing agent.

BPB1. The primer according to any of embodiments BP1-BP34 or BPA1-BPA10 wherein the transition metal cation is a cation of molybdenum, titanium, vanadium, chromium, manganese, iron, cobalt, nickel, copper or zinc.

BPB2. The primer according to any of embodiments BP1-BP34 or BPA1-BPA10 wherein the transition metal cation is a copper cation.

BPB3. The primer according to any of embodiments BP1-BP34 or BPA1-BPA10 wherein the transition metal cation is Cu(II).

BPB4. The primer according to any of embodiments BP1-BP34 or BPA1-BPA10 wherein the transition metal cation is an iron cation.

BPC1. The primer according to any of embodiments BP1-BP34, BPA1-BPA10 or BPB1-BPB4 additionally comprising:
  d) a first crosslinker comprising two or more third unsaturated free-radically polymerizable groups.

BPC2. The primer according to embodiment BPC1 wherein the first crosslinker comprises three or more third unsaturated free-radically polymerizable groups.

BPC3. The primer according to any of embodiments BPC1-BPC2 wherein the third unsaturated free-radically polymerizable groups are selected from vinyl-containing groups.

BPC4. The primer according to any of embodiments BPC1-BPC2 wherein the third unsaturated free-radically polymerizable groups are selected from (meth)acrylate groups.

BPC5. The primer according to any of embodiments BPC1-BPC2 wherein the third unsaturated free-radically polymerizable groups are selected from acrylate groups.

BPC6. The primer according to any of embodiments BPC1-BPC2 wherein the third unsaturated free-radically polymerizable groups are selected from methacrylate groups.

BPC7. The primer according to any of embodiments BPC1-BPC6 wherein the primer comprises at least 1.0 weight percent (based on total solids weight including excipient if present) of the first crosslinker.

BPC8. The primer according to any of embodiments BPC1-BPC6 wherein the primer comprises at least 2.0 weight percent (based on total solids weight including excipient if present) of the first crosslinker.

BPC9. The primer according to any of embodiments BPC1-BPC6 wherein the primer comprises at least 5.0 weight percent (based on total solids weight including excipient if present) of the first crosslinker.

BPC10. The primer according to any of embodiments BPC1-BPC9 wherein the primer comprises not more than 10 weight percent (based on total solids weight including excipient if present) of the first crosslinker.

BPC11. The primer according to any of embodiments BPC1-BPC8 wherein the primer comprises not more than 5.0 weight percent (based on total solids weight including excipient if present) of the first crosslinker.

BPC12. The primer according to any of embodiments BPC1-BPC8 wherein the primer comprises not more than 3.0 weight percent (based on total solids weight including excipient if present) of the first crosslinker.

BPD1. The primer according to any of embodiments BP1-BP34, BPA1-BPA10, BPB1-BPB4 or BPC1-BPC12 additionally comprising:
  e) a excipient.

BPD2. The primer according to embodiment BPD1 wherein the excipient is a low vapor pressure excipient.

BPD3. The primer according to embodiment BPD1 wherein the excipient has a vapor pressure of less than $10^{-4}$ mm Hg at 25° C.

BPD4. The primer according to embodiment BPD1 wherein the excipient has a vapor pressure of less than $10^{-5}$ mm Hg at 25° C.

BPD5. The primer according to any of embodiments BPD1-BPD4 wherein the excipient is an ester of a C12-C22 fatty acid.

BPD6. The primer according to embodiment BPD1 wherein the excipient is isopropyl myristate.

BPD7. The primer according to any of embodiments BPD1-BPD6 wherein the primer comprises at least 10 weight percent (based on total solids weight including excipient) of the excipient.

BPD8. The primer according to any of embodiments BPD1-BPD6 wherein the primer comprises at least 30 weight percent (based on total solids weight including excipient) of the excipient.

BPD9. The primer according to any of embodiments BPD1-BPD6 wherein the primer comprises at least 50 weight percent (based on total solids weight including excipient) of the excipient.

BPD10. The primer according to any of embodiments BPD1-BPD9 wherein the primer comprises not more than 80 weight percent (based on total solids weight including excipient) of the excipient.

BPD11. The primer according to any of embodiments BPD1-BPD9 wherein the primer comprises not more than 70 weight percent (based on total solids weight including excipient) of the excipient.

BPD12. The primer according to any of embodiments BP1-BP34, BPA1-BPA10, BPB1-BPB4, BPC1-BPC12 or BPD1-BPD11 additionally comprising solid or hollow particles comprising polymer, glass, ceramic, metal or metal oxide materials.

BPD13. The primer according to any of embodiments BP1-BP34, BPA1-BPA10, BPB1-BPB4, BPC1-BPC12 or BPD1-BPD12 wherein b) is a species other than a), wherein a) does not comprise unsaturated free-radically polymerizable groups.

BPD14. The primer according BPD13 wherein a) is selected from the group consisting of acrylic polymers, rubber polymers, polyester polymers, polyurethane polymers, polyamide polymers, and combinations thereof.

BPD15. The primer according to any of embodiments BP1-BP34, BPA1-BPA10, BPB1-BPB4, BPC1-BPC12 or BPD1-BPD14 which does not comprise a reducing agent that is not a), b), or c).

BT1. A tape comprising a first curable adhesive free-standing film layer which is a layer of the curable adhesive free-standing film according to any of embodiments BF1-BF31, BFA1-BFA6, BFB1-BFB12, BFC1-BFC11.

BT2. The tape according to embodiment BT1 additionally comprising a support layer borne on the first curable adhesive free-standing film layer.

BT3. The tape according to embodiment BT1 additionally comprising a support layer directly bound to the first curable adhesive free-standing film layer.

BT4. The tape according to embodiment BT1 additionally comprising a support layer bound to the first curable adhesive free-standing film layer through a secondary primer layer.

BT5. The tape according to any of embodiments BT2-BT4 additionally comprising a second curable adhesive free-standing film layer which is a layer of the curable adhesive free-standing film according to any of embodiments BF1-BF31, BFA1-BFA6, BFB1-BFB12 or BFC1-BFC11 chosen independently of the first curable adhesive free-standing film layer, wherein the second curable adhesive free-standing film layer is borne on a face of the support layer opposite the first curable adhesive free-standing film layer.

BT6. The tape according to embodiment BT5 wherein the support layer is directly bound to the second curable adhesive free-standing film layer.

BT7. The tape according to embodiment BT5 wherein the support layer is bound to the second curable adhesive free-standing film layer through a second secondary primer layer.

BT8. The tape according to any of embodiments BT2-BT4 additionally comprising a secondary adhesive film layer, wherein the secondary adhesive film layer is borne on a face of the support layer opposite the first curable adhesive free-standing film layer.

BT9. The tape according to embodiment BT8 wherein the support layer is directly bound to the secondary adhesive film layer.

BT10. The tape according to embodiment BT8 wherein the support layer is bound to the secondary adhesive film layer through a second secondary primer layer.

BT11. The tape according to embodiment BT1 which comprises a single layer which is the first curable adhesive free-standing film layer.

BT12. The tape according to embodiment BT1 additionally comprising a secondary adhesive film layer, wherein the secondary adhesive film layer is borne on the first curable adhesive free-standing film layer.

BT13. The tape according to embodiment BT1 additionally comprising a secondary adhesive film layer, wherein the secondary adhesive film layer is directly bound to the first curable adhesive free-standing film layer.

BT14. The tape according to embodiment BT1 additionally comprising a surfacing layer, wherein the surfacing layer is borne on the first curable adhesive free-standing film layer.

BT15. The tape according to embodiment BT1 additionally comprising a surfacing layer, wherein the surfacing layer is directly bound to the first curable adhesive free-standing film layer.

BT16. The tape according to embodiment BT1 additionally comprising a surfacing layer, wherein the surfacing layer is bound to the first curable adhesive free-standing film layer through a third secondary primer layer.

BT17. The tape according to any of embodiments BT1-BT16 additionally comprising a release liner in direct contact with at least one curable adhesive free-standing film layer.

BT18. The tape according to any of embodiments BT1-BT17 wherein at least one curable adhesive free-standing film layer comprises at least one outer surface bearing embossed air bleed channels capable of aiding in escape of air during application of the outer surface to a substrate.

BAS1. An adhesive system comprising:
  I) a primer according to any of embodiments BP1-BP34, BPA1-BPA10, BPB1-BPB4, BPC1-BPC12 or BPD1-BPD15; and
  II) a curable adhesive free-standing film according to any of embodiments BF1-BF31, BFA1-BFA6, BFB1-BFB12 or BFC1-BFC11.

BAS2. The adhesive system according to embodiment BAS1 wherein I) and II) are packaged together.

BAS3. The adhesive system according to embodiment BAS1 wherein I) and II) are sold together.

BAS4. An adhesive system comprising:
  I) a primer according to any of embodiments BP1-BP34, BPA1-BPA10, BPB1-BPB4, BPC1-BPC12 or BPD1-bPD12; and
  III) a tape according to any of embodiments BT1-BT18.

BAS5. The adhesive system according to embodiment BAS4 wherein I) and III) are packaged together.

BAS6. The adhesive system according to embodiment BAS5 wherein I) and III) are sold together.

BAS7. The adhesive system according to any of embodiments BAS1-BAS6 wherein the second unsaturated free-radically polymerizable groups and the first unsaturated free-radically polymerizable groups are the same.

BAS8. The adhesive system according to any of embodiments BAS1-BAS6 wherein the second unsaturated free-radically polymerizable groups and the first unsaturated free-radically polymerizable groups are different.

BAS9. The adhesive system according to any of embodiments BAS1-BAS6 wherein the second film-forming polymer or oligomer and the first film-forming polymer or oligomer are the same.

BAS10. The adhesive system according to any of embodiments BAS1-BAS6 wherein the second film-forming polymer or oligomer and the first film-forming polymer or oligomer are different.

BAS11. The adhesive system according to any of embodiments BAS1-BAS10 wherein the curable adhesive film additionally comprises:
  h) a second crosslinker comprising two or more fourth unsaturated free-radically polymerizable groups; and
wherein the primer additionally comprises:
  d) a first crosslinker comprising two or more third unsaturated free-radically polymerizable groups;
wherein the fourth unsaturated free-radically polymerizable groups and third unsaturated free-radically polymerizable groups are the same.

BAS12. The adhesive system according to any of embodiments BAS1-BAS10 wherein the curable adhesive film additionally comprises:
  h) a second crosslinker comprising two or more fourth unsaturated free-radically polymerizable groups; and
wherein the primer additionally comprises:
  d) a first crosslinker comprising two or more third unsaturated free-radically polymerizable groups;
wherein the fourth unsaturated free-radically polymerizable groups and third unsaturated free-radically polymerizable groups are different.

BAS13. The adhesive system according to any of embodiments BAS1-BAS10 wherein the curable adhesive film additionally comprises:
  h) a second crosslinker comprising two or more fourth unsaturated free-radically polymerizable groups; and
wherein the primer additionally comprises:
  d) a first crosslinker comprising two or more third unsaturated free-radically polymerizable groups;
wherein the second crosslinker and the first crosslinker are the same.

BAS14. The adhesive system according to any of embodiments BAS1-BAS10 wherein the curable adhesive film additionally comprises:
- h) a second crosslinker comprising two or more fourth unsaturated free-radically polymerizable groups; and wherein the primer additionally comprises:
- d) a first crosslinker comprising two or more third unsaturated free-radically polymerizable groups;

wherein the second crosslinker and the first crosslinker are different.

BCA1. A construction comprising:
- i) a first cured primer layer obtained by cure of a primer according to any of embodiments BP1-BP34, BPA1-BPA10, BPB1-BPB4, BPC1-BPC12 or BPD1-BPD15; directly bound to
- ii) a first cured structural adhesive layer obtained by cure of a curable adhesive free-standing film according to any of embodiments BF1-BF31, BFA1-BFA6, BFB1-BFB12 or BFC1-BFC11.

BCA2. The construction according to embodiment BCA1 additionally comprising:
- iii) a first substrate directly bound to the first cured primer layer.

BCA3. The construction according to embodiment BCA2 additionally comprising:
- iv) a second cured primer layer obtained by cure of a primer according to any of embodiments BP1-BP34, BPA1-BPA10, BPB1-BPB4, BPC1-BPC12 or BPD1-BPD15 chosen independently of the first cured primer layer; wherein the second cured primer layer is directly bound to the first cured structural adhesive layer; and
- v) a second substrate directly bound to the second cured primer layer.

BCA4. The construction according to embodiment BCA3 wherein the first cured primer layer and the second cured primer layer comprise the same material.

BCA5. The construction according to embodiment BCA3 wherein the first cured primer layer and the second cured primer layer comprise different materials.

BCA6. The construction according to embodiment BCA2 additionally comprising:
- v) a second substrate directly bound to the first cured structural adhesive layer.

BCA7. The construction according to embodiment BCA2 additionally comprising:
- vi) a surfacing layer borne on the first cured structural adhesive layer.

BCA8. The construction according to embodiment BCA2 additionally comprising:
- vi) a surfacing layer directly bonded to the first cured structural adhesive layer.

BCA9. The construction according to embodiment BCA2 additionally comprising:
- vii) a secondary adhesive layer borne on the first cured structural adhesive layer.

BCA10. The construction according to embodiment BCA2 additionally comprising:
- vii) a secondary adhesive layer directly bonded to the first cured structural adhesive layer.

BCA11. The construction according to embodiment BCA9 or BCA10 additionally comprising:
- v) a second substrate borne on the secondary adhesive layer.

BCA12. The construction according to embodiment BCA9 or BCA10 additionally comprising:
- v) a second substrate directly bound to the secondary adhesive layer.

BCA13. The construction according to embodiment BCA2 additionally comprising:
- viii) a support layer borne on the first cured structural adhesive layer.

BCA14. The construction according to embodiment BCA2 additionally comprising:
- viii) a support layer directly bonded to the first cured structural adhesive layer.

BCA15. The construction according to embodiment BCA13 or BCA14 additionally comprising:
- ix) a second cured structural adhesive layer obtained by cure of a curable adhesive free-standing film according to any of embodiments BF1-BF31, BFA1-BFA6, BFB1-BFB12 or BFC1-BFC11 chosen independently of the first cured structural adhesive layer; wherein the second cured structural adhesive layer is borne on the support layer.

BCA16. The construction according to embodiment BCA13 or BCA14 additionally comprising:
- ix) a second cured structural adhesive layer obtained by cure of a curable adhesive free-standing film according to any of embodiments BF1-BF31, BFA1-BFA6, BFB1-BFB12 or BFC1-BFC11 chosen independently of the first cured structural adhesive layer; wherein the second cured structural adhesive layer is directly bound to the support layer.

BCA17. The construction according to embodiment BCA15 or BCA16 wherein the first cured structural adhesive layer and second cured structural adhesive layer comprise the same material.

BCA18. The construction according to embodiment BCA15 or BCA16 wherein the first cured structural adhesive layer and second cured structural adhesive layer comprise different material.

BCA19. The construction according to any of embodiments BCA15-BCA18 additionally comprising:
- iv) a second cured primer layer obtained by cure of a primer according to any of embodiments BP1-BP34, BPA1-BPA10, BPB1-BPB4, BPC1-BPC12 or BPD1-BPD15 chosen independently of the first cured primer layer; wherein the second cured primer layer is directly bound to the second cured structural adhesive layer; and
- v) a second substrate directly bound to the second cured primer layer.

BCA20. The construction according to embodiment BCA13 or BCA14 additionally comprising:
- vii) a secondary adhesive layer borne on the support layer.

BCA21. The construction according to embodiment BCA13 or BCA14 additionally comprising:
- vii) a secondary adhesive layer directly bound to the support layer.

BCA22. The construction according to embodiment BCA13 or BCA14 additionally comprising:
- vii) a secondary adhesive layer bound to the support layer through a secondary primer layer.

BCA23. The construction according to any of embodiments BCA20-BCA21 additionally comprising:
- v) a second substrate borne on the secondary adhesive layer.

BCA24. The construction according to any of embodiments BCA20-BCA21 additionally comprising:
- v) a second substrate directly bound to the secondary adhesive layer.

BCA25. The construction according to any of embodiments BCA20-BCA21 additionally comprising:
v) a second substrate bound to the secondary adhesive layer through a secondary primer.

BCA26. A construction comprising a bond obtained by cure of a tape according to any of embodiments BT1-BT18.

PP1. A primer for adhesion of a curable adhesive free-standing film to a first substrate comprising a blend of:
a) a first film-forming polymer or oligomer;
b) a species comprising first unsaturated free-radically polymerizable groups, which may be a) or may be a species other than a); and
c) an oxidizing agent that is not a) or b);
wherein the primer comprises no tackifier and
wherein the primer is a liquid at normal temperature and pressure.

PP2. The primer according to embodiment PP1 wherein first unsaturated free-radically polymerizable groups are selected from vinyl-containing groups.

PP3. The primer according to embodiment PP1 wherein first unsaturated free-radically polymerizable groups are selected from (meth)acrylate groups.

PP4. The primer according to embodiment PP1 wherein first unsaturated free-radically polymerizable groups are selected from acrylate groups.

PP5. The primer according to embodiment PP1 wherein first unsaturated free-radically polymerizable groups are selected from methacrylate groups.

PP6. The primer according to any of embodiments PP1-PP5 wherein b) is a) and first unsaturated free-radically polymerizable groups are bound to the first film-forming polymer or oligomer through urethane linkages.

PP7. The primer according to any of embodiments PP1-PP6 wherein the first film-forming polymer or oligomer is a poly(meth)acrylate oligomer.

PP8. The primer according to any of embodiments PP1-PP7 wherein the first film-forming polymer or oligomer is a random copolymeric oligomer.

PP9. The primer according to any of embodiments PP1-PP8 wherein the first film-forming polymer or oligomer is not a block copolymeric oligomer.

PP10. The primer according to any of embodiments PP1-PP9 wherein greater than 60% of monomer units comprising the first film-forming polymer or oligomer are derived from (meth)acrylate monomers.

PP11. The primer according to any of embodiments PP1-PP9 wherein greater than 80% of monomer units comprising the first film-forming polymer or oligomer are derived from (meth)acrylate monomers.

PP12. The primer according to any of embodiments PP1-PP9 wherein greater than 90% of monomer units comprising the first film-forming polymer or oligomer are derived from (meth)acrylate monomers.

PP13. The primer according to any of embodiments PP1-PP12 wherein the first film-forming polymer or oligomer has a weight average molecular weight of greater than 3 kDa.

PP14. The primer according to any of embodiments PP1-PP12 wherein the first film-forming polymer or oligomer has a weight average molecular weight of greater than 30 kDa.

PP15. The primer according to any of embodiments PP1-PP12 wherein the first film-forming polymer or oligomer has a weight average molecular weight of greater than 100 kDa.

PP16. The primer according to any of embodiments PP1-PP12 wherein the first film-forming polymer or oligomer has a weight average molecular weight of greater than 200 kDa.

PP17. The primer according to any of embodiments PP1-PP16 wherein the first film-forming polymer or oligomer has a weight average molecular weight of less than 1,000 kDa.

PP18. The primer according to any of embodiments PP1-PP16 wherein the first film-forming polymer or oligomer has a weight average molecular weight of less than 600 kDa.

PP19. The primer according to any of embodiments PP1-PP16 wherein the first film-forming polymer or oligomer has a weight average molecular weight of less than 400 kDa.

PP20. The primer according to any of embodiments PP1-PP19 wherein b) is a) and the first film-forming polymer or oligomer comprises the first unsaturated free-radically polymerizable groups which are pendent groups in an amount of 10 or more per molecule.

PP21. The primer according to any of embodiments PP1-PP19 wherein b) is a) and the first film-forming polymer or oligomer comprises the first unsaturated free-radically polymerizable groups which are pendent groups in an amount of 20 or more per molecule.

PP22. The primer according to any of embodiments PP1-PP19 wherein b) is a) and the first film-forming polymer or oligomer comprises the first unsaturated free-radically polymerizable groups which are pendent groups in an amount of 40 or more per molecule.

PP23. The primer according to any of embodiments PP1-PP22 wherein the first film-forming polymer or oligomer additionally comprises pendent amide groups.

PP24. The primer according to any of embodiments PP1-PP23 comprising at least 5 weight percent (based on total solids weight including excipient if present) of the first film-forming polymer or oligomer.

PP25. The primer according to any of embodiments PP1-PP23 comprising at least 10 weight percent (based on total solids weight including excipient if present) of the first film-forming polymer or oligomer.

PP26. The primer according to any of embodiments PP1-PP23 comprising at least 15 weight percent (based on total solids weight including excipient if present) of the first film-forming polymer or oligomer.

PP27. The primer according to any of embodiments PP1-PP23 comprising at least 20 weight percent (based on total solids weight including excipient if present) of the first film-forming polymer or oligomer.

PP28. The primer according to any of embodiments PP1-PP23 comprising at least 30 weight percent (based on total solids weight including excipient if present) of the first film-forming polymer or oligomer.

PP29. The primer according to any of embodiments PP1-PP23 comprising at least 40 weight percent (based on total solids weight including excipient if present) of the first film-forming polymer or oligomer.

PP30. The primer according to any of embodiments PP1-PP29 comprising not more than 60 weight percent (based on total solids weight including excipient if present) of the first film-forming polymer or oligomer.

PP31. The primer according to any of embodiments PP1-PP29 comprising not more than 50 weight percent (based on total solids weight including excipient if present) of the first film-forming polymer or oligomer.

PP32. The primer according to any of embodiments PP1-PP26 comprising not more than 20 weight percent (based on total solids weight including excipient if present) of the first film-forming polymer or oligomer.

PP33. The primer according to any of embodiments PP1-PP32 wherein b) is a).

PP34. The primer according to any of embodiments PP1-PP32 wherein b) is a) and the first unsaturated free-radically polymerizable groups are pendent groups of the first film-forming polymer or oligomer.

PPA1. The primer according to any of embodiments PP1-PP34 wherein the oxidizing agent is a peroxide.

PPA2. The primer according to any of embodiments PP1-PP34 wherein the oxidizing agent comprises a hydroperoxide group.

PPA3. The primer according to any of embodiments PP1-PP34 or PPA1-PPA2 wherein the oxidizing agent is aromatic.

PPA4. The primer according to any of embodiments PP1-PP34 wherein the oxidizing agent is cumene hydroperoxide.

PPA5. The primer according to any of embodiments PP1-PP34 or PPA1-PPA4 comprising at least 5 weight percent of the oxidizing agent.

PPA6. The primer according to any of embodiments PP1-PP34 or PPA1-PPA4 comprising at least 10 weight percent of the oxidizing agent.

PPA7. The primer according to any of embodiments PP1-PP34 or PPA1-PPA4 comprising at least 20 weight percent (based on total solids weight including excipient if present) of the oxidizing agent.

PPA8. The primer according to any of embodiments PP1-PP34 or PPA1-PPA4 comprising at least 30 weight percent (based on total solids weight including excipient if present) of the oxidizing agent.

PPA9. The primer according to any of embodiments PP1-PP34 or PPA1-PPA8 comprising not more than 50 weight percent (based on total solids weight including excipient if present) of the oxidizing agent.

PPA10. The primer according to any of embodiments PP1-PP34 or PPA1-PPA6 comprising not more than 20 weight percent (based on total solids weight including excipient if present) of the oxidizing agent.

PPC1. The primer according to any of embodiments PP1-PP34, PPA1-PPA10 or PPB1-PPB4 additionally comprising:
 d) a first crosslinker comprising two or more third unsaturated free-radically polymerizable groups.

PPC2. The primer according to embodiment PPC1 wherein the first crosslinker comprises three or more third unsaturated free-radically polymerizable groups.

PPC3. The primer according to any of embodiments PPC1-PPC2 wherein the third unsaturated free-radically polymerizable groups are selected from vinyl-containing groups.

PPC4. The primer according to any of embodiments PPC1-PPC2 wherein the third unsaturated free-radically polymerizable groups are selected from (meth)acrylate groups.

PPC5. The primer according to any of embodiments PPC1-PPC2 wherein the third unsaturated free-radically polymerizable groups are selected from acrylate groups.

PPC6. The primer according to any of embodiments PPC1-PPC2 wherein the third unsaturated free-radically polymerizable groups are selected from methacrylate groups.

PPC7. The primer according to any of embodiments PPC1-PPC6 wherein the primer comprises at least 1.0 weight percent (based on total solids weight including excipient if present) of the first crosslinker.

PPC8. The primer according to any of embodiments PPC1-PPC6 wherein the primer comprises at least 2.0 weight percent (based on total solids weight including excipient if present) of the first crosslinker.

PPC9. The primer according to any of embodiments PPC1-PPC6 wherein the primer comprises at least 5.0 weight percent (based on total solids weight including excipient if present) of the first crosslinker.

PPC10. The primer according to any of embodiments PPC1-PPC9 wherein the primer comprises not more than 10 weight percent (based on total solids weight including excipient if present) of the first crosslinker.

PPC11. The primer according to any of embodiments PPC1-PPC8 wherein the primer comprises not more than 5.0 weight percent (based on total solids weight including excipient if present) of the first crosslinker.

PPC12. The primer according to any of embodiments PPC1-PPC8 wherein the primer comprises not more than 3.0 weight percent (based on total solids weight including excipient if present) of the first crosslinker.

PPD1. The primer according to any of embodiments PP1-PP34, PPA1-PPA10, or PPC1-PPC12 additionally comprising:
 e) a excipient.

PPD2. The primer according to embodiment PPD1 wherein the excipient is a low vapor pressure excipient.

PPD3. The primer according to embodiment PPD1 wherein the excipient has a vapor pressure of less than $10^{-4}$ mm Hg at 25° C.

PPD4. The primer according to embodiment PPD1 wherein the excipient has a vapor pressure of less than $10^{-5}$ mm Hg at 25° C.

PPD5. The primer according to any of embodiments PPD1-PPD4 wherein the excipient is an ester of a C12-C22 fatty acid.

PPD6. The primer according to embodiment PPD1 wherein the excipient is isopropyl myristate.

PPD7. The primer according to any of embodiments PPD1-PPD6 wherein the primer comprises at least 10 weight percent (based on total solids weight including excipient) of the excipient.

PPD8. The primer according to any of embodiments PPD1-PPD6 wherein the primer comprises at least 30 weight percent (based on total solids weight including excipient) of the excipient.

PPD9. The primer according to any of embodiments PPD1-PPD6 wherein the primer comprises at least 50 weight percent (based on total solids weight including excipient) of the excipient.

PPD10. The primer according to any of embodiments PPD1-PPD9 wherein the primer comprises not more than 80 weight percent (based on total solids weight including excipient) of the excipient.

PPD11. The primer according to any of embodiments PPD1-PPD9 wherein the primer comprises not more than 70 weight percent (based on total solids weight including excipient) of the excipient.

PPD12. The primer according to any of embodiments PP1-PP34, PPA1-PPA10, PPC1-PPC12 or PPD1-PPD11 additionally comprising solid or hollow particles comprising polymer, glass, ceramic, metal or metal oxide materials.

PPD13. The primer according to any of embodiments PP1-PP34, PPA1-PPA10, PPC1-PPC12 or PPD1-PPD12 wherein b) is a species other than a), wherein a) does not comprise unsaturated free-radically polymerizable groups.

PPD14. The primer according PPD13 wherein a) is selected from the group consisting of acrylic polymers, rubber polymers, polyester polymers, polyurethane polymers, polyamide polymers, and combinations thereof.

PPD15. The primer according to any of embodiments PP1-PP34, PPA1-PPA10, PPC1-PPC12 or PPD1-PPD14 which does not comprise a reducing agent that is not a) or b).

PPD16. The primer according to any of embodiments PP1-PP34, PPA1-PPA10, PPC1-PPC12 or PPD1-PPD15 which does not comprise a transition metal cation.

PSP1. An adhesive system comprising:
- I) a curable adhesive free-standing film comprising a blend of:
  - a) a first film-forming polymer or oligomer;
  - b) a first species comprising first unsaturated free-radically polymerizable groups, which may be a) or a species other than a); and
  - c) a first transition metal cation; and
- II) a primer for adhesion of a curable adhesive free-standing film to a first substrate comprising:
  - d) an oxidizing agent; and
- wherein the primer is a liquid at normal temperature and pressure.

PSP2. The adhesive system according to embodiment PSP1 wherein the primer comprises no tackifier.

PSP3. The adhesive system according to embodiment PSP1 or PSP2 wherein the primer comprises no species comprising first unsaturated free-radically polymerizable groups.

PSP4. The adhesive system according to any of embodiments PSP1-PSP3 wherein the oxidizing agent is a peroxide.

PSP5. The adhesive system according to any of embodiments PSP1-PSP3 wherein the oxidizing agent comprises a hydroperoxide group.

PSP6. The adhesive system according to any of embodiments PSP1-PSP3 wherein the oxidizing agent is aromatic.

PSP7. The adhesive system according to any of embodiments PSP1-PSP3 wherein the oxidizing agent is cumene hydroperoxide.

PSP8. The adhesive system according to any of embodiments PSP1-PSP7 wherein the primer comprises at least 5 weight percent of the oxidizing agent.

PSP9. The adhesive system according to any of embodiments PSP1-PSP7 wherein the primer comprises at least 10 weight percent of the oxidizing agent.

PSP10. The adhesive system according to any of embodiments PSP1-PSP7 wherein the primer comprises at least 20 weight percent of the oxidizing agent.

PSP11. The adhesive system according to any of embodiments PSP1-PSP7 wherein the primer comprises at least 30 weight percent of the oxidizing agent.

PSP12. The adhesive system according to any of embodiments PSP1-PSP11 wherein the primer comprises not more than 50 weight percent of the oxidizing agent.

PSP13. The adhesive system according to any of embodiments PSP1-PSP11 wherein the primer comprises not more than 20 weight percent of the oxidizing agent.

PSPF1. The adhesive system according to embodiments PSP1-PSP13 wherein first unsaturated free-radically polymerizable groups are selected from vinyl-containing groups.

PSPF2. The adhesive system according to embodiments PSP1-PSP13 wherein first unsaturated free-radically polymerizable groups are selected from (meth)acrylate groups.

PSPF3. The adhesive system according to embodiments PSP1-PSP13 wherein first unsaturated free-radically polymerizable groups are selected from acrylate groups.

PSPF4. The adhesive system according to embodiments PSP1-PSP13 wherein first unsaturated free-radically polymerizable groups are selected from methacrylate groups.

PSPF5. The adhesive system according to any of embodiments PSP1-PSP13 or PSPF1-PSPF4 wherein f) is e) and the first unsaturated free-radically polymerizable groups are bound to the first film-forming polymer or oligomer through urethane linkages.

PSPF6. The adhesive system according to any of embodiments PSP1-PSP13 or PSPF1-PSPF5 wherein the first film-forming polymer or oligomer is a poly(meth)acrylate oligomer.

PSPF7. The adhesive system according to any of embodiments PSP1-PSP13 or PSPF1-PSPF6 wherein the first film-forming polymer or oligomer is a random copolymeric oligomer.

PSPF8. The adhesive system according to any of embodiments PSP1-PSP13 or PSPF1-PSPF7 wherein the first film-forming polymer or oligomer is not a block copolymeric oligomer.

PSPF9. The adhesive system according to any of embodiments PSP1-PSP13 or PSPF1-PSPF8 wherein greater than 60% of monomer units comprising the first film-forming polymer or oligomer are derived from (meth)acrylate monomers.

PSPF10. The adhesive system according to any of embodiments PSP1-PSP13 or PSPF1-PSPF8 wherein greater than 80% of monomer units comprising the first film-forming polymer or oligomer are derived from (meth)acrylate monomers.

PSPF11. The adhesive system according to any of embodiments PSP1-PSP13 or PSPF1-PSPF8 wherein greater than 90% of monomer units comprising the first film-forming polymer or oligomer are derived from (meth)acrylate monomers.

PSPF12. The adhesive system according to any of embodiments PSP1-PSP13 or PSPF1-PSPF11 wherein the first film-forming polymer or oligomer has a weight average molecular weight of greater than 3 kDa.

PSPF13. The adhesive system according to any of embodiments PSP1-PSP13 or PSPF1-PSPF11 wherein the first film-forming polymer or oligomer has a weight average molecular weight of greater than 30 kDa.

PSPF14. The adhesive system according to any of embodiments PSP1-PSP13 or PSPF1-PSPF11 wherein the first film-forming polymer or oligomer has a weight average molecular weight of greater than 100 kDa.

PSPF15. The adhesive system according to any of embodiments PSP1-PSP13 or PSPF1-PSPF11 wherein the first film-forming polymer or oligomer has a weight average molecular weight of greater than 200 kDa.

PSPF16. The adhesive system according to any of embodiments PSP1-PSP13 or PSPF1-PSPF15 wherein the first film-forming polymer or oligomer has a weight average molecular weight of less than 1,000 kDa.

PSPF17. The adhesive system according to any of embodiments PSP1-PSP13 or PSPF1-PSPF15 wherein the first film-forming polymer or oligomer has a weight average molecular weight of less than 600 kDa.

PSPF18. The adhesive system according to any of embodiments PSP1-PSP13 or PSPF1-PSPF15 wherein the first film-forming polymer or oligomer has a weight average molecular weight of less than 400 kDa.

PSPF19. The adhesive system according to any of embodiments PSP1-PSP13 or PSPF1-PSPF18 wherein b) is a) and the first film-forming polymer or oligomer comprises the first unsaturated free-radically polymerizable groups in an amount of 10 or more per molecule.

PSPF20. The adhesive system according to any of embodiments PSP1-PSP13 or PSPF1-PSPF18 wherein b) is a) and the first film-forming polymer or oligomer comprises the first unsaturated free-radically polymerizable groups in an amount of 20 or more per molecule.

PSPF21. The adhesive system according to any of embodiments PSP1-PSP13 or PSPF1-PSPF18 wherein b) is a) and the first film-forming polymer or oligomer comprises the first unsaturated free-radically polymerizable groups in an amount of 40 or more per molecule.

PSPF22. The adhesive system according to any of embodiments PSP1-PSP13 or PSPF1-PSPF21 wherein the first film-forming polymer or oligomer additionally comprises pendent amide groups.

PSPF23. The adhesive system according to any of embodiments PSP1-PSP13 or PSPF1-PSPF22 wherein the curable adhesive free-standing film comprises at least 50 weight percent of the first film-forming polymer or oligomer.

PSPF24. The adhesive system according to any of embodiments PSP1-PSP13 or PSPF1-PSPF22 wherein the curable adhesive free-standing film comprises at least 60 weight percent of the first film-forming polymer or oligomer.

PSPF25. The adhesive system according to any of embodiments PSP1-PSP13 or PSPF1-PSPF22 wherein the curable adhesive free-standing film comprises at least 65 weight percent of the first film-forming polymer or oligomer.

PSPF26. The adhesive system according to any of embodiments PSP1-PSP13 or PSPF1-PSPF22 wherein the curable adhesive free-standing film comprises at least 70 weight percent of the first film-forming polymer or oligomer.

PSPF27. The adhesive system according to any of embodiments PSP1-PSP13 or PSPF1-PSPF26 wherein the curable adhesive free-standing film comprises not more than 90 weight percent of the first film-forming polymer or oligomer.

PSPF28. The adhesive system according to any of embodiments PSP1-PSP13 or PSPF1-PSPF26 wherein the curable adhesive free-standing film comprises not more than 80 weight percent of the first film-forming polymer or oligomer.

PSPF29. The adhesive system according to any of embodiments PSP1-PSP13 or PSPF1-PSPF28 wherein b) is a).

PSPF30. The adhesive system according to any of embodiments PSP1-PSP13 or PSPF1-PSPF28 wherein b) is a) and the first unsaturated free-radically polymerizable groups are pendent groups of the first film-forming polymer or oligomer.

PSPFA1. The adhesive system according to any of embodiments PSP1-PSP13 or PSPF1-PSPF30 wherein the curable adhesive free-standing film additionally comprises a reducing agent selected from organic reducing agents.

PSPFA2. The adhesive system according to any of embodiments PSP1-PSP13 or PSPF1-PSPF30 wherein the curable adhesive free-standing film additionally comprises a reducing agent selected from the group consisting of ascorbic acid and derivatives thereof.

PSPFA3. The adhesive system according to any of embodiments PSP1-PSP13 or PSPF1-PSPF30 wherein the curable adhesive free-standing film additionally comprises a reducing agent selected from the group consisting of ascorbyl esters.

PSPFA4. The adhesive system according to any of embodiments PSP1-PSP13 or PSPF1-PSPF30 wherein the curable adhesive free-standing film additionally comprises a reducing agent selected from the group consisting of ascorbyl esters of fatty acids.

PSPFA5. The adhesive system according to any of embodiments PSP1-PSP13 or PSPF1-PSPF30 wherein the curable adhesive free-standing film additionally comprises a reducing agent selected from the group consisting of ascorbyl esters of C12-C22 fatty acids.

PSPFA6. The adhesive system according to any of embodiments PSP1-PSP13 or PSPF1-PSPF30 wherein the curable adhesive free-standing film additionally comprises ascorbyl palmitate.

PSPFB1. The adhesive system according to any of embodiments PSP1-PSP13, PSPF1-PSPF30 or PSPFA1-PSPFA6 wherein the curable adhesive free-standing film additionally comprises a first crosslinker comprising two or more fourth unsaturated free-radically polymerizable groups.

PSPFB2. The adhesive system according to embodiment PSPFB1 wherein the first crosslinker comprises three or more fourth unsaturated free-radically polymerizable groups.

PSPFB3. The adhesive system according to any of embodiments PSPFB1-PSPFB2 wherein the fourth unsaturated free-radically polymerizable groups are selected from vinyl-containing groups.

PSPFB4. The adhesive system according to any of embodiments PSPFB1-PSPFB2 wherein the fourth unsaturated free-radically polymerizable groups are selected from (meth)acrylate groups.

PSPFB5. The adhesive system according to any of embodiments PSPFB1-PSPFB2 wherein the fourth unsaturated free-radically polymerizable groups are selected from acrylate groups.

PSPFB6. The adhesive system according to any of embodiments PSPFB1-PSPFB2 wherein the fourth unsaturated free-radically polymerizable groups are selected from methacrylate groups.

PSPFB7. The adhesive system according to any of embodiments PSPFB1-PSPFB6 wherein the curable adhesive free-standing film comprises at least 5 weight percent of the first crosslinker.

PSPFB8. The adhesive system according to any of embodiments PSPFB1-PSPFB6 wherein the curable adhesive free-standing film comprises at least 10 weight percent of the first crosslinker.

PSPFB9. The adhesive system according to any of embodiments PSPFB1-PSPFB6 wherein the curable adhesive free-standing film comprises at least 15 weight percent of the first crosslinker.

PSPFB10. The adhesive system according to any of embodiments PSPFB1-PSPFB9 wherein the curable adhesive free-standing film comprises not more than 30 weight percent of the first crosslinker.

PSPFB11. The adhesive system according to any of embodiments PSPFB1-PSPFB9 wherein the curable adhesive free-standing film comprises not more than 25 weight percent of the first crosslinker.

PSPFB12. The adhesive system according to any of embodiments PSPFB1-PSPFB9 wherein the curable adhesive free-standing film comprises not more than 20 weight percent of the first crosslinker.

PSPFC1. The adhesive system according to any of embodiments PSP1-PSP13, PSPF1-PSPF30, PSPFA1-PSPFA6, or PSPFB1-PSPFB12 wherein the curable adhesive free-standing film additionally comprising a redox accelerator.

PSPFC2. The adhesive system according to embodiment PSPFC1 wherein the redox accelerator comprises a quaternary amine.

PSPFC3. The adhesive system according to any of embodiments PSP1-PSP13, PSPF1-PSPF30, PSPFA1-PSPFA6, PSPFB1-PSPFB12, or PSPFC1-PSPFC2 wherein the curable adhesive free-standing film is a pressure sensitive adhesive.

PSPFC4. The adhesive system according to any of embodiments PSP1-PSP13, PSPF1-PSPF30, PSPFA1-PSPFA6, PSPFB1-PSPFB12, or PSPFC1-PSPFC3 wherein the curable adhesive free-standing film has a tacky surface.

PSPFC5. The adhesive system according to any of embodiments PSP1-PSP13, PSPF1-PSPF30, PSPFA1-PSPFA6, PSPFB1-PSPFB12, or PSPFC1-PSPFC4 wherein the curable adhesive free-standing film additionally comprises solid or hollow particles comprising polymer, glass, ceramic, metal or metal oxide materials.

PSPFC6. The adhesive system according to any of embodiments PSP1-PSP13, PSPF1-PSPF30, PSPFA1-PSPFA6, PSPFB1-PSPFB12, or PSPFC1-PSPFC5 wherein the curable adhesive free-standing film comprises an outer surface bearing embossed air bleed channels capable of aiding in escape of air during application of the outer surface to a substrate.

PSPFC7. The adhesive system according to any of embodiments PSP1-PSP13, PSPF1-PSPF30, PSPFA1-PSPFA6, PSPFB1-PSPFB12, or PSPFC1-PSPFC6 wherein b) is a species other than a), wherein a) does not comprise unsaturated free-radically polymerizable groups.

PSPFC8. The adhesive system according to embodiment PSPFC7 wherein a) is selected from the group consisting of acrylic polymers, rubber polymers, polyester polymers, polyurethane polymers, polyamide polymers, and combinations thereof.

PSPFC9. The adhesive system according to any of embodiments PSP1-PSP13, PSPF1-PSPF30, PSPFA1-PSPFA6, PSPFB1-PSPFB12, or PSPFC1-PSPFC8 wherein the transition metal cation is a cation of molybdenum, titanium, vanadium, chromium, manganese, iron, cobalt, nickel, copper or zinc.

PSPFC10. The adhesive system according to any of embodiments PSP1-PSP13, PSPF1-PSPF30, PSPFA1-PSPFA6, PSPFB1-PSPFB12, or PSPFC1-PSPFC8 wherein the transition metal cation is an iron cation.

PSPFC11. The adhesive system according to any of embodiments PSP1-PSP13, PSPF1-PSPF30, PSPFA1-PSPFA6, PSPFB1-PSPFB12, or PSPFC1-PSPFC8 wherein the transition metal cation is Fe(II).

PSPFC12. The adhesive system according to any of embodiments PSP1-PSP13, PSPF1-PSPF30, PSPFA1-PSPFA6, PSPFB1-PSPFB12, or PSPFC1-PSPFC8 wherein the transition metal cation is Fe(III).

PSPFC13. The adhesive system according to any of embodiments PSP1-PSP13, PSPF1-PSPF30, PSPFA1-PSPFA6, PSPFB1-PSPFB12, or PSPFC1-PSPFC12 wherein I) and II) are packaged together.

PSPFC14. The adhesive system according to any of embodiments PSP1-PSP13, PSPF1-PSPF30, PSPFA1-PSPFA6, PSPFB1-PSPFB12, or PSPFC1-PSPFC12 wherein I) and II) are sold together.

PSPFC15. The adhesive system according to any of embodiments PSP1-PSP13, PSPF1-PSPF30, PSPFA1-PSPFA6, PSPFB1-PSPFB12, or PSPFC1-PSPFC14 wherein I) does not comprise an oxidizing agent that is not a), b), or c).

PSPFC16. The adhesive system according to any of embodiments PSP1-PSP13, PSPF1-PSPF30, PSPFA1-PSPFA6, PSPFB1-PSPFB12, or PSPFC1-PSPFC14 wherein I) does not comprise a peroxide.

PSPFC17. The adhesive system according to any of embodiments PSP1-PSP13, PSPF1-PSPF30, PSPFA1-PSPFA6, PSPFB1-PSPFB12, or PSPFC1-PSPFC16 wherein II) does not comprise a transition metal cation.

PSPFC18. The adhesive system according to any of embodiments PSP1-PSP13, PSPF1-PSPF30, PSPFA1-PSPFA6, PSPFB1-PSPFB12, or PSPFC1-PSPFC17 wherein II) does not comprise a species comprising unsaturated free-radically polymerizable groups.

PSPT1. The adhesive system according to any of embodiments PSP1-PSP13, PSPF1-PSPF30, PSPFA1-PSPFA6, PSPFB1-PSPFB12, or PSPFC1-PSPFC18 wherein the curable adhesive free-standing film is comprises in a tape.

PSPT2. The adhesive system according to embodiment PSPT1 wherein the tape additionally comprises a support layer borne on the curable adhesive free-standing film layer.

PSPT3. The adhesive system according to embodiment PSPT1 wherein the tape additionally comprises a support layer directly bound to the curable adhesive free-standing film layer.

PSPT4. The adhesive system according to embodiment PSPT1 wherein the tape additionally comprises a support layer bound to the curable adhesive free-standing film layer through a secondary primer layer.

PSPCA1. A construction comprising:
i) a cured primer layer obtained by cure of the primer according to any of embodiments PSP1-PSP13, PSPF1-PSPF30, PSPFA1-PSPFA6, PSPFB1-PSPFB12, PSPFC1-PSPFC18, or PSPT1-PSPT4 directly bound to
ii) a cured structural adhesive layer obtained by cure of the curable adhesive free-standing film according to any of embodiments PSP1-PSP13, PSPF1-PSPF30, PSPFA1-PSPFA6, PSPFB1-PSPFB12, PSPFC1-PSPFC18, or PSPT1-PSPT4.

PSPCA2. The construction according to embodiment PSPCA1 additionally comprising:
iii) a first substrate directly bound to the first cured primer layer.

PSPCA3. The construction according to embodiment PSPCA2 additionally comprising:
iv) a second cured primer layer obtained by cure of a primer according to any of embodiments PSP1-PSP13, PSPF1-PSPF30, PSPFA1-PSPFA6, PSPFB1-PSPFB12, PSPFC1-PSPFC18, or PSPT1-PSPT4 chosen independently of the first cured primer layer; wherein the second cured primer layer is directly bound to the first cured structural adhesive layer; and
v) a second substrate directly bound to the second cured primer layer.

PSPCA4. The construction according to embodiment PSPCA3 wherein the first cured primer layer and the second cured primer layer comprise the same material.

PSPCA5. The construction according to embodiment PSPCA3 wherein the first cured primer layer and the second cured primer layer comprise different materials.

PSPCA6. The construction according to embodiment PSPCA2 additionally comprising:
v) a second substrate directly bound to the first cured structural adhesive layer.

PSPCA7. The construction according to embodiment PSPCA2 additionally comprising:
vi) a surfacing layer borne on the first cured structural adhesive layer.

PSPCA8. The construction according to embodiment PSPCA2 additionally comprising:
vi) a surfacing layer directly bonded to the first cured structural adhesive layer.

PSPCA9. The construction according to embodiment PSPCA2 additionally comprising:
vii) a secondary adhesive layer borne on the first cured structural adhesive layer.

PSPCA10. The construction according to embodiment PSPCA2 additionally comprising:
vii) a secondary adhesive layer directly bonded to the first cured structural adhesive layer.

PSPCA11. The construction according to embodiment PSPCA9 or PSPCA10 additionally comprising:
v) a second substrate borne on the secondary adhesive layer.

PSPCA12. The construction according to embodiment PSPCA9 or PSPCA10 additionally comprising:
  v) a second substrate directly bound to the secondary adhesive layer.
PSPCA13. The construction according to embodiment PSPCA2 additionally comprising:
  viii) a support layer borne on the first cured structural adhesive layer.
PSPCA14. The construction according to embodiment PSPCA2 additionally comprising:
  viii) a support layer directly bonded to the first cured structural adhesive layer.
PSPCA15. The construction according to embodiment PSPCA13 or PSPCA14 additionally comprising:
  ix) a second cured structural adhesive layer obtained by cure of a curable adhesive free-standing film according to any of embodiments PSP1-PSP13, PSPF1-PSPF30, PSPFA1-PSPFA6, PSPFB1-PSPFB12, PSPFC1-PSPFC18, or PSPT1-PSPT4 chosen independently of the first cured structural adhesive layer; wherein the second cured structural adhesive layer is borne on the support layer.
PSPCA16. The construction according to embodiment PSPCA13 or PSPCA14 additionally comprising:
  ix) a second cured structural adhesive layer obtained by cure of a curable adhesive free-standing film according to any of embodiments PSP1-PSP13, PSPF1-PSPF30, PSPFA1-PSPFA6, PSPFB1-PSPFB12, PSPFC1-PSPFC18, or PSPT1-PSPT4 chosen independently of the first cured structural adhesive layer; wherein the second cured structural adhesive layer is directly bound to the support layer.
PSPCA17. The construction according to embodiment PSPCA15 or PSPCA16 wherein the first cured structural adhesive layer and second cured structural adhesive layer comprise the same material.
PSPCA18. The construction according to embodiment PSPCA15 or PSPCA16 wherein the first cured structural adhesive layer and second cured structural adhesive layer comprise different material.
PSPCA19. The construction according to any of embodiments PSPCA15-PSPCA18 additionally comprising:
  iv) a second cured primer layer obtained by cure of a primer according to any of embodiments PSP1-PSP13, PSPF1-PSPF30, PSPFA1-PSPFA6, PSPFB1-PSPFB12, PSPFC1-PSPFC18, or PSPT1-PSPT4 chosen independently of the first cured primer layer; wherein the second cured primer layer is directly bound to the second cured structural adhesive layer; and
  v) a second substrate directly bound to the second cured primer layer.
PSPCA20. The construction according to embodiment PSPCA13 or PSPCA14 additionally comprising:
  vii) a secondary adhesive layer borne on the support layer.
PSPCA21. The construction according to embodiment PSPCA13 or PSPCA14 additionally comprising:
  vii) a secondary adhesive layer directly bound to the support layer.
PSPCA22. The construction according to embodiment PSPCA13 or PSPCA14 additionally comprising:
  vii) a secondary adhesive layer bound to the support layer through a secondary primer layer.
PSPCA23. The construction according to any of embodiments PSPCA20-PSPCA21 additionally comprising:
  v) a second substrate borne on the secondary adhesive layer.
PSPCA24. The construction according to any of embodiments PSPCA20-PSPCA21 additionally comprising:
  v) a second substrate directly bound to the secondary adhesive layer.
PSPCA25. The construction according to any of embodiments PSPCA20-PSPCA21 additionally comprising:
  v) a second substrate bound to the secondary adhesive layer through a secondary primer.
FTT1. A curable adhesive free-standing film comprising a blend of:
  a) a first film-forming polymer or oligomer;
  b) a first species comprising first unsaturated free-radically polymerizable groups, which may be a) or a species other than a);
  c) a first transition metal cation; and
  d) a reducing agent that is not a), b), or c);
wherein the curable adhesive free-standing film comprises no oxidizing agent that is not a), b), c), or d).
FTT2. The curable adhesive free-standing film according to embodiment FT1 wherein the reducing agent does not comprise a transition metal, nitrogen or sulfur.
FTT3. The curable adhesive free-standing film according to embodiment FTT1 or FTT2 wherein first unsaturated free-radically polymerizable groups are selected from vinyl-containing groups.
FTT4. The curable adhesive free-standing film according to embodiment FTT1 or FTT2 wherein first unsaturated free-radically polymerizable groups are selected from (meth)acrylate groups.
FTT5. The curable adhesive free-standing film according to embodiment FTT1 or FTT2 wherein first unsaturated free-radically polymerizable groups are selected from acrylate groups.
FTT6. The curable adhesive free-standing film according to embodiment FTT1 or FTT2 wherein first unsaturated free-radically polymerizable groups are selected from methacrylate groups.
FTT7. The curable adhesive free-standing film according to any of embodiments FTT1-FTT6 wherein b) is a) and the first unsaturated free-radically polymerizable groups are bound to the first film-forming polymer or oligomer through urethane linkages.
FTT8. The curable adhesive free-standing film according to any of embodiments FTT1-FTT7 wherein the first film-forming polymer or oligomer is a poly(meth)acrylate oligomer.
FTT9. The curable adhesive free-standing film according to any of embodiments FTT1-FTT8 wherein the first film-forming polymer or oligomer is a random copolymeric oligomer.
FTT10. The curable adhesive free-standing film according to any of embodiments FTT1-FTT9 wherein the first film-forming polymer or oligomer is not a block copolymeric oligomer.
FTT11. The curable adhesive free-standing film according to any of embodiments FTT1-FTT10 wherein greater than 60% of monomer units comprising the first film-forming polymer or oligomer are derived from (meth)acrylate monomers.
FTT12. The curable adhesive free-standing film according to any of embodiments FTT1-FTT10 wherein greater than 80% of monomer units comprising the first film-forming polymer or oligomer are derived from (meth)acrylate monomers.
FTT13. The curable adhesive free-standing film according to any of embodiments FTT1-FTT10 wherein greater than 90% of monomer units comprising the first film-forming polymer or oligomer are derived from (meth)acrylate monomers.

FTT14. The curable adhesive free-standing film according to any of embodiments FTT1-FTT13 wherein the first film-forming polymer or oligomer has a weight average molecular weight of greater than 3 kDa.

FTT15. The curable adhesive free-standing film according to any of embodiments FTT1-FTT13 wherein the first film-forming polymer or oligomer has a weight average molecular weight of greater than 30 kDa.

FTT16. The curable adhesive free-standing film according to any of embodiments FTT1-FTT13 wherein the first film-forming polymer or oligomer has a weight average molecular weight of greater than 100 kDa.

FTT17. The curable adhesive free-standing film according to any of embodiments FTT1-FTT13 wherein the first film-forming polymer or oligomer has a weight average molecular weight of greater than 200 kDa.

FTT18. The curable adhesive free-standing film according to any of embodiments FTT1-FTT17 wherein the first film-forming polymer or oligomer has a weight average molecular weight of less than 1,000 kDa.

FTT19. The curable adhesive free-standing film according to any of embodiments FTT1-FTT17 wherein the first film-forming polymer or oligomer has a weight average molecular weight of less than 600 kDa.

FTT20. The curable adhesive free-standing film according to any of embodiments FTT1-FTT17 wherein the first film-forming polymer or oligomer has a weight average molecular weight of less than 400 kDa.

FTT21. The curable adhesive free-standing film according to any of embodiments FTT1-FTT20 wherein b) is a) and the first film-forming polymer or oligomer comprises the first unsaturated free-radically polymerizable groups in an amount of 10 or more per molecule.

FTT22. The curable adhesive free-standing film according to any of embodiments FTT1-FTT20 wherein b) is a) and the first film-forming polymer or oligomer comprises the first unsaturated free-radically polymerizable groups in an amount of 20 or more per molecule.

FTT23. The curable adhesive free-standing film according to any of embodiments FTT1-FTT20 wherein b) is a) and the first film-forming polymer or oligomer comprises the first unsaturated free-radically polymerizable groups in an amount of 40 or more per molecule.

FTT24. The curable adhesive free-standing film according to any of embodiments FTT1-FTT23 wherein the first film-forming polymer or oligomer additionally comprises pendent amide groups.

FTT25. The curable adhesive free-standing film according to any of embodiments FTT1-FTT24 wherein the curable adhesive free-standing film comprises at least 50 weight percent of the first film-forming polymer or oligomer.

FTT26. The curable adhesive free-standing film according to any of embodiments FTT1-FTT24 wherein the curable adhesive free-standing film comprises at least 60 weight percent of the first film-forming polymer or oligomer.

FTT27. The curable adhesive free-standing film according to any of embodiments FTT1-FTT24 wherein the curable adhesive free-standing film comprises at least 65 weight percent of the first film-forming polymer or oligomer.

FTT28. The curable adhesive free-standing film according to any of embodiments FTT1-FTT24 wherein the curable adhesive free-standing film comprises at least 70 weight percent of the first film-forming polymer or oligomer.

FTT29. The curable adhesive free-standing film according to any of embodiments FTT1-FTT28 wherein the curable adhesive free-standing film comprises not more than 90 weight percent of the first film-forming polymer or oligomer.

FTT30. The curable adhesive free-standing film according to any of embodiments FTT1-FTT28 wherein the curable adhesive free-standing film comprises not more than 80 weight percent of the first film-forming polymer or oligomer.

FTT31. The curable adhesive free-standing film according to any of embodiments FTT1-FTT30 wherein b) is a).

FTT32. The curable adhesive free-standing film according to any of embodiments FTT1-FTT29 wherein b) is a) and the first unsaturated free-radically polymerizable groups are pendent groups of the first film-forming polymer or oligomer.

FTTA1. The curable adhesive free-standing film according to any of embodiments FTT1-FTT32 wherein the reducing agent is selected from organic reducing agents.

FTTA2. The curable adhesive free-standing film according to any of embodiments FTT1-FTT32 wherein the reducing agent is selected from the group consisting of ascorbic acid and derivatives thereof.

FTTA3. The curable adhesive free-standing film according to any of embodiments FTT1-FTT32 wherein the reducing agent is selected from the group consisting of ascorbyl esters.

FTTA4. The curable adhesive free-standing film according to any of embodiments FTT1-FTT32 wherein the reducing agent is selected from the group consisting of ascorbyl esters of fatty acids.

FTTA5. The curable adhesive free-standing film according to any of embodiments FTT1-FTT32 wherein the reducing agent is selected from the group consisting of ascorbyl esters of C12-C22 fatty acids.

FTTA6. The curable adhesive free-standing film according to any of embodiments FTT1-FTT32 wherein the reducing agent is ascorbyl palmitate.

FTTB1. The curable adhesive free-standing film according to any of embodiments FTT1-FTT32 or FTTA1-FTTA6 additionally comprising a first crosslinker comprising two or more third unsaturated free-radically polymerizable groups.

FTTB2. The curable adhesive free-standing film according to embodiment FTTB1 wherein the first crosslinker comprises three or more third unsaturated free-radically polymerizable groups.

FTTB3. The curable adhesive free-standing film according to any of embodiments FTTB1-FTTB2 wherein the third unsaturated free-radically polymerizable groups are selected from vinyl-containing groups.

FTTB4. The curable adhesive free-standing film according to any of embodiments FTTB1-FTTB2 wherein the third unsaturated free-radically polymerizable groups are selected from (meth)acrylate groups.

FTTB5. The curable adhesive free-standing film according to any of embodiments FTTB1-FTTB2 wherein the third unsaturated free-radically polymerizable groups are selected from acrylate groups.

FTTB6. The curable adhesive free-standing film according to any of embodiments FTTB1-FTTB2 wherein the third unsaturated free-radically polymerizable groups are selected from methacrylate groups.

FTTB7. The curable adhesive free-standing film according to any of embodiments FTTB1-FTTB6 wherein the curable adhesive free-standing film comprises at least 5 weight percent of the first crosslinker.

FTTB8. The curable adhesive free-standing film according to any of embodiments FTTB1-FTTB6 wherein the curable adhesive free-standing film comprises at least 10 weight percent of the first crosslinker.

FTTB9. The curable adhesive free-standing film according to any of embodiments FTTB1-FTTB6 wherein the curable adhesive free-standing film comprises at least 15 weight percent of the first crosslinker.

FTTB10. The curable adhesive free-standing film according to any of embodiments FTTB1-FTTB9 wherein the curable adhesive free-standing film comprises not more than 30 weight percent of the first crosslinker.

FTTB11. The curable adhesive free-standing film according to any of embodiments FTTB1-FTTB9 wherein the curable adhesive free-standing film comprises not more than 25 weight percent of the first crosslinker.

FTTB12. The curable adhesive free-standing film according to any of embodiments FTTB1-FTTB9 wherein the curable adhesive free-standing film comprises not more than 20 weight percent of the first crosslinker.

FTTC1. The curable adhesive free-standing film according to any of embodiments FTT1-FTT32, FTTA1-FTTA6, or FTTB1-FTTB12 additionally comprising a redox accelerator.

FTTC2. The curable adhesive free-standing film according to embodiment FTTC1 wherein the redox accelerator comprises a quaternary amine.

FTTC3. The curable adhesive free-standing film according to any of embodiments FTT1-FTT32, FTTA1-FTTA6, FTTB1-FTTB12, or FTTC1-FTTC2 which is a pressure sensitive adhesive.

FTTC4. The curable adhesive free-standing film according to any of embodiments FTT1-FTT32, FTTA1-FTTA6, FTTB1-FTTB12, or FTTC1-FTTC3 having a tacky surface.

FTTC5. The curable adhesive free-standing film according to any of embodiments FTT1-FTT32, FTTA1-FTTA6, FTTB1-FTTB12, or FTTC1-FTTC4 additionally comprising solid or hollow particles comprising polymer, glass, ceramic, metal or metal oxide materials.

FTTC6. The curable adhesive free-standing film according to any of embodiments FTT1-FTT32, FTTA1-FTTA6, FTTB1-FTTB12, or FTTC1-FTTC5 comprising an outer surface bearing embossed air bleed channels capable of aiding in escape of air during application of the outer surface to a substrate.

FTTC7. The curable adhesive free-standing film according to any of embodiments FTT1-FTT32, FTTA1-FTTA6, FTTB1-FTTB12, or FTTC1-FTTC6 wherein b) is a species other than a), wherein a) does not comprise unsaturated free-radically polymerizable groups.

FTTC8. The curable adhesive free-standing film according to embodiment FTTC7 wherein a) is selected from the group consisting of acrylic polymers, rubber polymers, polyester polymers, polyurethane polymers, polyamide polymers, and combinations thereof.

FTTD1. The curable adhesive free-standing film according to any of embodiments FTT1-FTT32, FTTA1-FTTA6, FTTB1-FTTB12, or FTTC1-FTTC8 wherein the first transition metal cation is a cation of molybdenum, titanium, vanadium, chromium, manganese, iron, cobalt, nickel, copper or zinc.

FTTD2. The curable adhesive free-standing film according to any of embodiments FTT1-FTT32, FTTA1-FTTA6, FTTB1-FTTB12, or FTTC1-FTTC8 wherein the first transition metal cation is a copper cation.

FTTD3. The curable adhesive free-standing film according to any of embodiments FTT1-FTT32, FTTA1-FTTA6, FTTB1-FTTB12, or FTTC1-FTTC8 wherein the first transition metal cation is Cu(II).

FTTD4. The curable adhesive free-standing film according to any of embodiments FTT1-FTT32, FTTA1-FTTA6, FTTB1-FTTB12, or FTTC1-FTTC8 wherein the first transition metal cation is an iron cation.

FTTD5. The curable adhesive free-standing film according to any of embodiments FTT1-FTT32, FTTA1-FTTA6, FTTB1-FTTB12, or FTTC1-FTTC8 wherein the first transition metal cation is Fe(II).

FTTD6. The curable adhesive free-standing film according to any of embodiments FTT1-FTT32, FTTA1-FTTA6, FTTB1-FTTB12, or FTTC1-FTTC8 wherein the first transition metal cation is Fe(III).

STT1. An adhesive system comprising:
  I) a first curable adhesive free-standing film which is the curable adhesive free-standing film according to any of FTT1-FTT32, FTTA1-FTTA6, FTTB1-FTTB12, FTTC1-FTTC8 or FTTD1-FTTD6; and
  II) a second curable adhesive free-standing film comprising a blend of:
    e) a second film-forming polymer or oligomer;
    f) a second species comprising second unsaturated free-radically polymerizable groups, which may be e) or may be a species other than e); and
    g) an oxidizing agent that is not e) or f).

STT2. The adhesive system according to embodiment ST1 wherein the second curable adhesive free-standing film additionally comprises:
  h) a second transition metal cation.

STT3. The adhesive system according to embodiment STT1 or STT2 wherein second unsaturated free-radically polymerizable groups are selected from vinyl-containing groups.

STT4. The adhesive system according to embodiment STT1 or STT2 wherein second unsaturated free-radically polymerizable groups are selected from (meth)acrylate groups.

STT5. The adhesive system according to embodiment STT1 or STT2 wherein second unsaturated free-radically polymerizable groups are selected from acrylate groups.

STT6. The adhesive system according to embodiment STT1 or STT2 wherein second unsaturated free-radically polymerizable groups are selected from methacrylate groups.

STT7. The adhesive system according to any of embodiments STT1-STT6 wherein f) is e) and the second unsaturated free-radically polymerizable groups are bound to the second film-forming polymer or oligomer through urethane linkages.

STT8. The adhesive system according to any of embodiments STT1-STT7 wherein the second film-forming polymer or oligomer is a poly(meth)acrylate oligomer.

STT9. The adhesive system according to any of embodiments STT1-STT8 wherein the second film-forming polymer or oligomer is a random copolymeric oligomer.

STT10. The adhesive system according to any of embodiments STT1-STT9 wherein the second film-forming polymer or oligomer is not a block copolymeric oligomer.

STT11. The adhesive system according to any of embodiments STT1-STT10 wherein greater than 60% of monomer units comprising the second film-forming polymer or oligomer are derived from (meth)acrylate monomers.

STT12. The adhesive system according to any of embodiments STT1-STT10 wherein greater than 80% of monomer units comprising the second film-forming polymer or oligomer are derived from (meth)acrylate monomers.

STT13. The adhesive system according to any of embodiments STT1-STT10 wherein greater than 90% of monomer units comprising the second film-forming polymer or oligomer are derived from (meth)acrylate monomers.

STT14. The adhesive system according to any of embodiments STT1-STT13 wherein the second film-forming polymer or oligomer has a weight average molecular weight of greater than 3 kDa.

STT15. The adhesive system according to any of embodiments STT1-STT13 wherein the second film-forming polymer or oligomer has a weight average molecular weight of greater than 30 kDa.

STT16. The adhesive system according to any of embodiments STT1-STT13 wherein the second film-forming polymer or oligomer has a weight average molecular weight of greater than 100 kDa.

STT17. The adhesive system according to any of embodiments STT1-STT13 wherein the second film-forming polymer or oligomer has a weight average molecular weight of greater than 200 kDa.

STT18. The adhesive system according to any of embodiments STT1-STT17 wherein the second film-forming polymer or oligomer has a weight average molecular weight of less than 1,000 kDa.

STT19. The adhesive system according to any of embodiments STT1-STT17 wherein the second film-forming polymer or oligomer has a weight average molecular weight of less than 600 kDa.

STT20. The adhesive system according to any of embodiments STT1-STT17 wherein the second film-forming polymer or oligomer has a weight average molecular weight of less than 400 kDa.

STT21. The adhesive system according to any of embodiments STT1-STT20 wherein f) is e) and the second film-forming polymer or oligomer comprises the second unsaturated free-radically polymerizable groups in an amount of 10 or more per molecule.

STT22. The adhesive system according to any of embodiments STT1-STT20 wherein f) is e) and the second film-forming polymer or oligomer comprises the second unsaturated free-radically polymerizable groups in an amount of 20 or more per molecule.

STT23. The adhesive system according to any of embodiments STT1-STT20 wherein f) is e) and the second film-forming polymer or oligomer comprises the second unsaturated free-radically polymerizable groups in an amount of 40 or more per molecule.

STT24. The adhesive system according to any of embodiments STT1-STT23 wherein the second film-forming polymer or oligomer additionally comprises pendent amide groups.

STT25. The adhesive system according to any of embodiments STT1-STT24 wherein the second curable adhesive free-standing film comprises at least 50 weight percent of the second film-forming polymer or oligomer.

STT26. The adhesive system according to any of embodiments STT1-STT24 wherein the second curable adhesive free-standing film comprises at least 60 weight percent of the second film-forming polymer or oligomer.

STT27. The adhesive system according to any of embodiments STT1-STT24 wherein the second curable adhesive free-standing film comprises at least 65 weight percent of the second film-forming polymer or oligomer.

STT28. The adhesive system according to any of embodiments STT1-STT24 wherein the second curable adhesive free-standing film comprises at least 70 weight percent of the second film-forming polymer or oligomer.

STT29. The adhesive system according to any of embodiments STT1-STT28 wherein the second curable adhesive free-standing film comprises not more than 90 weight percent of the second film-forming polymer or oligomer.

STT30. The adhesive system according to any of embodiments STT1-STT28 wherein the second curable adhesive free-standing film comprises not more than 80 weight percent of the second film-forming polymer or oligomer.

STT31. The adhesive system according to any of embodiments STT1-STT30 wherein f) is e).

STT32. The adhesive system according to any of embodiments STT1-STT29 wherein f) is e) and the second unsaturated free-radically polymerizable groups are pendent groups of the second film-forming polymer or oligomer.

STTA1. The adhesive system according to any of embodiments STT1-STT32 wherein the oxidizing agent is a peroxide.

STTA2. The adhesive system according to embodiment STTA1 wherein the oxidizing agent comprises a hydroperoxide group.

STTA3. The adhesive system according to embodiment STTA1 or STTA2 wherein the oxidizing agent is aromatic.

STTA4. The adhesive system according to embodiment STTA1 wherein the oxidizing agent is cumene hydroperoxide.

STTA5. The adhesive system according to any of embodiments STTA1-STTA4 wherein the second curable adhesive free-standing film comprises at least 5 weight percent of the oxidizing agent.

STTA6. The adhesive system according to any of embodiments STTA1-STTA4 wherein the second curable adhesive free-standing film comprises at least 10 weight percent of the oxidizing agent.

STTA7. The adhesive system according to any of embodiments STTA1-STTA4 wherein the second curable adhesive free-standing film comprises at least 20 weight percent of the oxidizing agent.

STTA8. The adhesive system according to any of embodiments STTA1-STTA4 wherein the second curable adhesive free-standing film comprises at least 30 weight percent of the oxidizing agent.

STTA9. The adhesive system according to any of embodiments STTA1-STTA8 wherein the second curable adhesive free-standing film comprises not more than 50 weight percent of the oxidizing agent.

STTA10. The adhesive system according to any of embodiments STTA1-STTA8 wherein the second curable adhesive free-standing film comprises not more than 20 weight percent of the oxidizing agent.

STTB1. The adhesive system according to any of embodiments STT1-STT32 or STTA1-STTA10 additionally comprising a second crosslinker comprising two or more fourth unsaturated free-radically polymerizable groups.

STTB2. The adhesive system according to embodiment STTB1 wherein the second crosslinker comprises three or more fourth unsaturated free-radically polymerizable groups.

STTB3. The adhesive system according to any of embodiments STTB1-STTB2 wherein the fourth unsaturated free-radically polymerizable groups are selected from vinyl-containing groups.

STTB4. The adhesive system according to any of embodiments STTB1-STTB2 wherein the fourth unsaturated free-radically polymerizable groups are selected from (meth)acrylate groups.

STTB5. The adhesive system according to any of embodiments STTB1-STTB2 wherein the fourth unsaturated free-radically polymerizable groups are selected from acrylate groups.

STTB6. The adhesive system according to any of embodiments STTB1-STTB2 wherein the fourth unsaturated free-radically polymerizable groups are selected from methacrylate groups.

STTB7. The adhesive system according to any of embodiments STTB1-STTB6 wherein the second curable adhesive free-standing film comprises at least 5 weight percent of the second crosslinker.

STTB8. The adhesive system according to any of embodiments STTB1-STTB6 wherein the second curable adhesive free-standing film comprises at least 10 weight percent of the second crosslinker.

STTB9. The adhesive system according to any of embodiments STTB1-STTB6 wherein the second curable adhesive free-standing film comprises at least 15 weight percent of the second crosslinker.

STTB10. The adhesive system according to any of embodiments STTB1-STTB9 wherein the second curable adhesive free-standing film comprises not more than 30 weight percent of the second crosslinker.

STTB11. The adhesive system according to any of embodiments STTB1-STTB9 wherein the second curable adhesive free-standing film comprises not more than 25 weight percent of the second crosslinker.

STTB12. The adhesive system according to any of embodiments STTB1-STTB9 wherein the second curable adhesive free-standing film comprises not more than 20 weight percent of the second crosslinker.

STTC1. The adhesive system according to any of embodiments STT1-STT32, STTA1-STTA10, or STTB1-STTB12 wherein the second curable adhesive free-standing film additionally comprises a excipient.

STTC2. The adhesive system according to embodiment STTC1 wherein the excipient is a low vapor pressure excipient.

STTC3. The adhesive system according to embodiment STTC1 wherein the excipient has a vapor pressure of less than $10^{-4}$ mm Hg at 25° C.

STTC4. The adhesive system according to embodiment STTC1 wherein the excipient has a vapor pressure of less than $10^{-5}$ mm Hg at 25° C.

STTC5. The adhesive system according to any of embodiments STTC1-STTC4 wherein the excipient is an ester of a C12-C22 fatty acid.

STTC6. The adhesive system according to embodiment STTC1 wherein the excipient is isopropyl myristate.

STTC7. The adhesive system according to any of embodiments STTC1-STTC6 wherein the second curable adhesive free-standing film comprises at least 1.0 weight percent (based on total solids weight including excipient) of the excipient.

STTC8. The adhesive system according to any of embodiments STTC1-STTC6 wherein the second curable adhesive free-standing film comprises at least 3.0 weight percent (based on total solids weight including excipient) of the excipient.

STTC9. The adhesive system according to any of embodiments STTC1-STTC6 wherein the second curable adhesive free-standing film comprises at least 5.0 weight percent (based on total solids weight including excipient) of the excipient.

STTC10. The adhesive system according to any of embodiments STTC1-STTC9 wherein the second curable adhesive free-standing film comprises not more than 50 weight percent (based on total solids weight including excipient) of the excipient.

STTC11. The adhesive system according to any of embodiments STTC1-STTC9 wherein the second curable adhesive free-standing film comprises not more than 20 weight percent (based on total solids weight including excipient) of the excipient.

STTD1. The adhesive system according to any of embodiments STT2-STT32, STTA1-STTA10, STTB1-STTB12, or STTC1-STTC11 wherein the second transition metal cation is a cation of molybdenum, titanium, vanadium, chromium, manganese, iron, cobalt, nickel, copper or zinc.

STTD2. The adhesive system according to any of embodiments STT2-STT32, STTA1-STTA10, STTB1-STTB12, or STTC1-STTC11 wherein the second transition metal cation is a copper cation.

STTD3. The adhesive system according to any of embodiments STT2-STT32, STTA1-STTA10, STTB1-STTB12, or STTC1-STTC11 wherein the second transition metal cation is Cu(II).

STTD4. The adhesive system according to any of embodiments STT2-STT32, STTA1-STTA10, STTB1-STTB12, or STTC1-STTC11 wherein the second transition metal cation is an iron cation.

STTD5. The adhesive system according to any of embodiments STT2-STT32, STTA1-STTA10, STTB1-STTB12, or STTC1-STTC11 wherein the second transition metal cation is Fe(II).

STTD6. The adhesive system according to any of embodiments STT2-STT32, STTA1-STTA10, STTB1-STTB12, or STTC1-STTC11 wherein the second transition metal cation is Fe(III).

STTD7. The adhesive system according to any of embodiments STT2-STT32, STTA1-STTA10, STTB1-STTB12, STTC1-STTC11, or STTD1-STTD6 wherein f) is a species other than e), wherein e) does not comprise unsaturated free-radically polymerizable groups.

STTD8. The adhesive system according to embodiment STTD7 wherein e) is selected from the group consisting of acrylic polymers, rubber polymers, polyester polymers, polyurethane polymers, polyamide polymers, and combinations thereof.

STTD9. The adhesive system according to any of embodiments STT2-STT32, STTA1-STTA10, STTB1-STTB12, STTC1-STTC11, or STTD1-STTD8 wherein the second curable adhesive free-standing film comprises an outer surface bearing embossed air bleed channels capable of aiding in escape of air during application of the outer surface to a substrate.

MBTT1. A method of binding two substrates comprising the steps of:
  1) providing a first substrate bearing on a first surface the first curable adhesive free-standing film according to any of embodiments STT1-STT32, STTA1-STTA10, STTB1-STTB12, STTC1-STTC11, or STTD1-STTD9;
  2) providing a second substrate bearing on a second surface the second curable free-standing adhesive film according to any of embodiments STT1-STT32, STTA1-STTA10, STTB1-STTB12, STTC1-STTC11, or STTD1-STTD9; and
  3) bringing together the first and second surfaces of the first and second substrates such that the first and second curable adhesive films are in contact.

MBTT2. The method according to embodiment MBTT1 wherein the first curable adhesive free-standing film is directly bound to the first surface of the first substrate.

MBTT3. The method according to embodiment MBTT1 or MBTT2 wherein the second curable adhesive free-standing film is directly bound to the second surface of the first substrate.

MATT1. A method of binding two substrates comprising the steps of:
1) providing a first substrate comprising a first surface;
2) providing the first curable adhesive free-standing film according to any of embodiments STT1-STT32, STTA1-STTA10, STTB1-STTB12, STTC1-STTC11, or STTD1-STTD9;
3) applying the first curable free-standing adhesive film to the first surface;
4) providing a second substrate comprising a second surface;
5) providing the second curable adhesive free-standing film according to any of embodiments STT1-STT32, STTA1-STTA10, STTB1-STTB12, STTC1-STTC11, or STTD1-STTD9;
6) applying the second curable adhesive free-standing film to the second surface; and
7) bringing together the first and second surfaces of the first and second substrates such that the first and second curable adhesive free-standing films are in contact.

MATT2. The method according to embodiment MATT1 wherein step 3) comprises applying the first curable free-standing adhesive film directly to the first surface of the first substrate so that it is directly bound to the first surface of the first substrate.

MATT3. The method according to embodiment MATT1 or MATT2 wherein step 6) comprises applying the second curable free-standing adhesive film directly to the second surface of the second substrate so that it is directly bound to the second surface of the second substrate.

MATT4. A method of binding two substrates comprising the steps of:
1) providing a first substrate comprising a first surface;
2) providing the first curable adhesive free-standing film according to any of embodiments STT1-STT32, STTA1-STTA10, STTB1-STTB12, STTC1-STTC11, or STTD1-STTD9;
3) applying the first curable free-standing adhesive film to the first surface;
4) providing a second substrate comprising a second surface;
5) providing the second curable adhesive free-standing film according to any of embodiments STT1-STT32, STTA1-STTA10, STTB1-STTB12, STTC1-STTC11, or STTD1-STTD9;
6) applying the second curable adhesive free-standing film to the first curable free-standing adhesive film; and
7) bringing together the second curable free-standing adhesive film with the second surface of the second substrate such that the first and second substrates are bound together.

MATT5. The method according to embodiment MATT4 wherein step 3) comprises applying the first curable free-standing adhesive film directly to the first surface of the first substrate so that it is directly bound to the first surface of the first substrate.

MATT6. The method according to embodiment MATT4 or MATT5 wherein in step 7) the second curable free-standing adhesive is directly bound to the second surface of the second substrate.

MB3T1. A method of binding two substrates comprising the steps of:
1) providing the second curable adhesive free-standing film according to any of embodiments STT1-STT32, STTA1-STTA10, STTB1-STTB12, STTC1-STTC11, or STTD1-STTD9;
2) providing a first substrate bearing on a first surface a first portion of the first curable adhesive free-standing film according to any of embodiments STT1-STT32, STTA1-STTA10, STTB1-STTB12, STTC1-STTC11, or STTD1-STTD9;
3) providing a second substrate bearing on a second surface a second portion of the first curable free-standing adhesive film according to any of embodiments STT1-STT32, STTA1-STTA10, STTB1-STTB12, STTC1-STTC11, or STTD1-STTD9;
where the first and second portions have compositions chosen independently of each other; and
4) bringing together 1), 2), and 3) such that the first portion of the first curable adhesive free-standing film and the second portion of the first curable adhesive free-standing film are in contact with opposite faces of the second curable adhesive free-standing film.

MB3T2. The method according to embodiment MB3T1 wherein the first portion of the first curable adhesive free-standing film is directly bound to the first surface of the first substrate.

MB3T3. The method according to embodiment MB3T1 or MB3T2 wherein the second portion of the first curable adhesive free-standing film is directly bound to the second surface of the second substrate.

MB3T4. A method of binding two substrates comprising the steps of:
1) providing the first curable adhesive free-standing film according to any of embodiments STT1-STT32, STTA1-STTA10, STTB1-STTB12, STTC1-STTC11, or STTD1-STTD9;
2) providing a first substrate bearing on a first surface a first portion of the second curable adhesive free-standing film according to any of embodiments STT1-STT32, STTA1-STTA10, STTB1-STTB12, STTC1-STTC11, or STTD1-STTD9;
3) providing a second substrate bearing on a second surface a second portion of the second curable free-standing adhesive film according to any of embodiments STT1-STT32, STTA1-STTA10, STTB1-STTB12, STTC1-STTC11, or STTD1-STTD9;
wherein the first and second portions have compositions chosen independently of each other; and
4) bringing together 1), 2), and 3) such that the first portion of the second curable adhesive free-standing film and the second portion of the second curable adhesive free-standing film are in contact with opposite faces of the first curable adhesive free-standing film.

MB3T5. The method according to embodiment MB3T4 wherein the first portion of the second curable adhesive free-standing film is directly bound to the first surface of the first substrate.

MB3T6. The method according to embodiment MB3T4 or MB3T5 wherein the second portion of the second curable adhesive free-standing film is directly bound to the second surface of the second substrate.

MB3T7. A method of binding two substrates comprising the steps of:
1) providing a first substrate comprising a first surface;
2) providing a first portion of the first curable adhesive free-standing film according to any of embodiments STT1-STT32, STTA1-STTA10, STTB1-STTB12, STTC1-STTC11, or STTD1-STTD9;

3) applying the first portion of the first curable free-standing adhesive film to the first surface to form a first prepared substrate;
4) providing a second substrate comprising a second surface;
5) providing a second portion of the first curable adhesive free-standing film according to any of embodiments STT1-STT32, STTA1-STTA10, STTB1-STTB12, STTC1-STTC11, or STTD1-STTD9;
wherein the first and second portions have compositions chosen independently of each other;
6) applying the second portion of the first curable adhesive free-standing film to the second surface to form a second prepared substrate;
7) providing the second curable adhesive free-standing film according to any of embodiments STT1-STT32, STTA1-STTA10, STTB1-STTB12, STTC1-STTC11, or STTD1-STTD9; and
8) bringing together the first and second prepared substrates with the second curable adhesive free-standing film such that the first portion of the first curable adhesive free-standing film and the second portion of the first curable adhesive free-standing film are in contact with opposite faces of the second curable adhesive free-standing film.

MB3T8. The method according to embodiment MB3T7 wherein step 3) comprises applying the first portion of the first curable free-standing adhesive film directly to the first surface of the first substrate so that it is directly bound to the first surface of the first substrate.

MB3T9. The method according to embodiment MB3T7 or MB3T8 wherein step 6) comprises applying the second portion of the first curable free-standing adhesive film directly to the second surface of the second substrate so that it is directly bound to the second surface of the second substrate.

MB3T10. A method of binding two substrates comprising the steps of:
1) providing a first substrate comprising a first surface;
2) providing a first portion of the second curable adhesive free-standing film according to any of embodiments STT1-STT32, STTA1-STTA10, STTB1-STTB12, STTC1-STTC11, or STTD1-STTD9;
3) applying the first portion of the second curable free-standing adhesive film to the first surface to form a first prepared substrate;
4) providing a second substrate comprising a second surface;
5) providing a second portion of the second curable adhesive free-standing film according to any of embodiments STT1-STT32, STTA1-STTA10, STTB1-STTB12, STTC1-STTC11, or STTD1-STTD9; wherein the first and second portions have compositions chosen independently of each other;
6) applying the second portion of the second curable adhesive free-standing film to the second surface to form a second prepared substrate;
7) providing the first curable adhesive free-standing film according to any of embodiments STT1-STT32, STTA1-STTA10, STTB1-STTB12, STTC1-STTC11, or STTD1-STTD9; and
8) bringing together the first and second prepared substrates with the first curable adhesive free-standing film such that the first portion of the second curable adhesive free-standing film and the second portion of the second curable adhesive free-standing film are in contact with opposite faces of the first curable adhesive free-standing film.

MB3T11. The method according to embodiment MB3T7 wherein step 3) comprises applying the first portion of the second curable free-standing adhesive film directly to the first surface of the first substrate so that it is directly bound to the first surface of the first substrate.

MB3T12. The method according to embodiment MB3T7 or MB3T8 wherein step 6) comprises applying the second portion of the second curable free-standing adhesive film directly to the second surface of the second substrate so that it is directly bound to the second surface of the second substrate.

ABC1. An adhesive system comprising:
I) a curable adhesive free-standing film comprising an outer surface bearing embossed air bleed channels capable of aiding in escape of air during application of the outer surface to a primed substrate; and
II) a primer for adhesion of the curable adhesive free-standing film to a substrate, wherein the primer comprises components that initiate cure of the curable adhesive free-standing film.

ABC2. The adhesive system according to embodiment ABC1, wherein the curable adhesive free-standing film is the curable adhesive free-standing film according to any of the preceding embodiments.

ABC3. The adhesive system according to embodiment ABC1 or ABC2, wherein the primer is the primer according to any of the preceding embodiments.

ABC4. The adhesive system according to any of embodiments ABC1-ABC3, wherein the curable adhesive free-standing film cures by free-radical cure.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, WI, or may be synthesized by known methods.

Materials

| Designation | Description |
| --- | --- |
| Acrylic Polymer Solution | Solution of acrylic polymer made as described below |
| Polyurethane Polymer Solution | Solution of polyurethane polymer made as described below |
| STEPANPOL PH-56 | Hydroxyl terminated polyester, OH value 57.3 mg KOH/g), available from Stepan Company, Northfield, IL |
| DMPA | Dimethylolpropionic acid, available from Sigma-Aldrich, St. Louis, MO |
| DESMODUR H | Aliphatic diisocyanate, available from Covestro, Pittsburgh, PA |
| DBTA | Dibutyltin diacetate, available from Sigma-Aldrich |
| Toluene | Toluene |
| IPA | Isopropyl alcohol |
| TBAC STOCK | Solution made as described below |
| TBAC | Benzyltributylammonium chloride from Alfa Aesar, Ward Hill, MA |

-continued

| Designation | Description |
| --- | --- |
| HEMA | Hydroxyethyl methacrylate from Dow Chemical Company, Midland, MI |
| EtOAc | Ethyl acetate from VWR International, Radnor, PA |
| Reactive Oligomer A | Solution of reactive oligomer made as described below |
| 2EHA | 2-ethylhexyl acrylate from BASF Corporation, Florham Park, NJ |
| CHA | Cyclohexyl acrylate from TCI America, Portland, OR |
| BA | n-Butyl acrylate from BASF Corporation, Florham Park, NJ |
| Acm | Acrylamide from Zibo Xinye Chemical Company, Zibo, China |
| HPA | Hydroxypropyl acrylate (mixture of isomers) from BASF Corporation, Florham Park, NJ |
| VAZO 52 | 2,2'-azobis(2,4-dimethyl-pentanenitrile) a thermal radical initiator from DuPont, Wilmington, DE |
| TDDM | Tertiary dodecyl mercaptan from Sartomer, Exton, PA, as a chain transfer agent |
| IEM | 2-isocyanatoethyl methacrylate from TCI America, Portland, OR |
| p-AA | 5,6-O-isopropylidene-L-Ascorbic Acid synthesized as described below |
| L-AA | L-ascorbic acid |
| acetone | Acetone |
| 2,2-DMP | 2,2-dimethoxypropane |
| CSA | Camphorsulfonic acid |
| TEA | Triethylamine |
| hexane | Hexane |
| d6-DMSO | Hexadeuterodimethyl sulfoxide |
| AscPalm | L-Ascorbic acid 6-palmitate (99%) from Alfa Aesar, Ward Hill, MA |
| RL1 | Siliconized poly-coated kraft release liner |
| RL2 | Embossed dual side siliconized polyethylene-coated polyester release liner, made as described in Example 1 of European Patent Publication No. 1800865 A1 |
| CHP | Cumene hydroperoxide (80%, tech) from Alfa Aesar, Ward Hill, MA |
| CN991 | Low viscosity aliphatic polyester-based urethane diacrylate oligomer from Sartomer, Exton, PA |
| SR355 | Ditrimethylolpropane tetraacrylate, is a low skin irritation tetrafunctional monomer from Sartomer, Exton, PA |
| IMS | Isopropyl myristate from Sigma-Aldrich, St. Louis, MO, as a low vapor pressure plasticizer |
| CuN | Copper (II) naphthenate in mineral spirits (8% Cu) obtained from Strem Chemicals, Newburyport, MA |

Preparation of Acrylic Polymer Solution (Acrylic PS)

Acrylic Polymer Solution was generally prepared according to the description provided in column 6, lines 26-46 of U.S. Pat. No. 4,074,004, except that the acid content was 10 weight percent (wt %).

Preparation of Polyurethane Polymer Solution (Polyurethane PS)

To a resin reaction vessel equipped with a mechanical stirrer, a condenser, a thermocouple and a nitrogen inlet were added 800 g hydroxyl terminated polyester PH-56 (a hydroxyl value of 57.3 mg KOH/g), 4.4 g DMPA, and 67 g MEK. The solution was then heated up to 70° C. with stirring and added 0.44 g g DBTDA and 74.2 g of DES-MODUR H. Then, the temperature was maintained at 80±2° C. until the reaction was completed. During the reaction, the desired amount of MEK was added into the system to dilute (i.e., reduce the viscosity of) the system. The reaction was completed when no isocyanate groups existed, which was monitored by using FT-IR for the disappearance of the NCO peak at around 2274 cm-1. Finally, the clear viscous solution with a solid content of 40 wt. % was obtained.

Preparation of Stock Solution of TBAC (TBAC STOCK)

Weighed to a glass vial were the following: 0.1 g of TBAC, 0.9 g of HEMA and 8.12 g of EtOAc. The contents were stirred at room temperature until a clear solution was obtained.

Synthesis of Reactive Oligomer A

Reactive Oligomer A was prepared generally according to the following procedure. 12 g of 2EHA, 50 g of CHA, 30 g of BA, 5 g of Acm, 3 g of HPA, 0.1 g of VAZO-52, 0.1 g of TDDM, and 100 g of EtOAc were added to a glass bottle. The contents were mixed and bubbled with nitrogen for 4 minutes before being sealed and placed in a Launder-Ometer rotating water bath for 24 hours at 60° C. In a second step, 0.52 g IEM and 40 g MEK were added to the bottle. The bottle was sealed with polytetrafluoroethylene tape and rolled on an IR-lamp-heated roller designed to reach a temperature of 60° C. for 24 h. The weight average molecular weight of the resulting polymer was approximately 298 kDa as determined by the "Determination of Molecular Weight Distribution" test method described below.

Synthesis of 5,6-O-isopropylidene-L-Ascorbic Acid (p-AA)

This material was prepared according to literature precedence (Bioorg. Med. Chem. 2003, vol. 11, 827). To a suspension of L-AA (20.0 g, 114 mmol) in acetone (200 mL) was added 2,2-DMP (20.4 g, 196 mmol) and CSA (1.32 g, 5.68 mmol). The resultant mixture was allowed to stir overnight at room temperature. To the resultant slurry was added approximately 0.6 g TEA. A portion of hexane was added to the mixture, and the white precipitate was collected via vacuum filtration, washing with additional hexane. The material was dried under vacuum to afford the desired product (21.0 g, 86% yield). $^1$H NMR (d6-DMSO, 500 MHz) was consistent with the desired product.

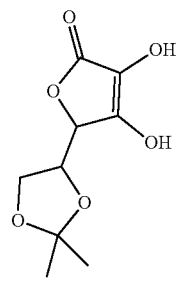

p-AA

Test Methods
Overlap Shear Test

Rectangular aluminum substrates measuring 1 inch by 4 inch by 0.064 inch (2.5 cm by 10 cm by 1.6 mm) were washed with acetone, followed by 50/50 water/IPA solution, and a second wash of acetone followed by air-drying. Upon removal of the cover liner, a 1 inch by 1-inch (2.5 cm by 2.5 cm) portion a first curable adhesive film was applied to the terminal end of a first aluminum substrate. Similarly, a 1 inch by 1-inch (2.5 cm by 2.5 cm) portion of a second curable adhesive film was applied to the terminal end of a second aluminum substrate. The coated release liners of the first curable adhesive film and the second curable adhesive film were removed. The second curable adhesive film applied to the second aluminum substrate was brought in contact with the first curable adhesive film applied to the first aluminum substrate, thereby forming an adhesive layer/adhesive layer interface. The adhesive layer/adhesive layer interface (e.g., bond area) was either clamped between two metal binder clips and dwelled at room temperature for 48 hours (Adhesive System 1), had a 500 g weight placed directly onto the bond area for 15 min, followed by room temperature dwelling 18 to 24 h prior to testing (Adhesive Systems 2 and 3). A dynamic overlap shear test was performed at ambient temperature using an MTS SINTECH Tensile Tester. Test specimens were loaded into the mechanical grips and the crosshead was operated at 0.1 inch (0.25 cm) per minute, loading the specimen to failure. Stress at break was recorded in units of kPa and psi.

Determination of Molecular Weight Distribution

The molecular weight distribution of the compounds was characterized using conventional gel permeation chromatography (GPC). The GPC instrumentation, which was obtained from Waters Corporation (Milford, MA, USA), included a high-pressure liquid chromatography pump (Model 1515HPLC), an auto-sampler (Model 717), a UV detector (Model 2487), and a refractive index detector (Model 2410). The chromatograph was equipped with two 5-micron PLgel MIXED-D columns, available from Varian Inc. (Palo Alto, CA, USA).

Samples of polymeric solutions were prepared by dissolving polymer or dried polymer materials in tetrahydrofuran at a concentration of 0.5 percent (weight/volume) and filtering through a 0.2-micron polytetrafluoroethylene filter that is available from VWR International (West Chester, PA, USA). The resulting samples were injected into the GPC and eluted at a rate of 1 milliliter per minute through the columns maintained at 35° C. The system was calibrated with polystyrene standards using a linear least square fit analysis to establish a calibration curve. The weight average molecular weight (Mw) and the polydispersity index (weight average molecular weight divided by number average molecular weight) were calculated for each sample against this standard calibration curve.

Examples

Curable Adhesive Films 1-3

Curable Adhesive Films 1-3 were prepared by combining the components listed and quantified in Table 1, below. The Reactive Oligomer A and SR355 were mixed in a MAX 20 Speedmixer cup (Flacktek Inc, Landrum, SC) at 3500 rpm for 2 minutes, using a DAC 150.1 FVZ-K Speedmixer (Flacktek Inc). Remaining components were added and the adhesive composition was mixed at 3500 rpm for 3 min. The resulting adhesive composition was applied with a notchbar coater on the liner indicated in Table 1, and described in detail in the Materials section, at a 10 mil (254 micrometers) gap. The coated liner was dried in an oven at 60° C. for 30 minutes to form Curable Adhesive Films 1-3, which were then covered with the liner indicated in Table 1, below.

TABLE 1

Curable Adhesive Films 1-3

| Components | Curable Adhesive Film 1 | Curable Adhesive Film 2 | Curable Adhesive Film 3 |
|---|---|---|---|
| Reactive Oligomer A (g) | 12.1 | 12.1 | 12.1 |
| SR355 (g) | 2.9 | 2.9 | 2.9 |
| AscPalm (g) | 0.25 | 0.5 | 0 |
| p-AA (g) | 0 | 0 | 0.25 |
| CuN (g) | 0 | 0.14 | 0 |
| TBAC STOCK (g) | 0.45 | 0.15 | 0.15 |
| IPA (g) | 2 | 2 | 2 |
| Coated on Liner | RL2 | RL2 | RL2 |
| Cover Liner | RL1 | RL1 | RL1 |

Curable Adhesive Film 4

Curable Adhesive Film 4 was prepared as generally described in Curable Adhesive Films 1-3, above, except that the materials used are listed in Table 2, below.

TABLE 2

Curable Adhesive Film 4

| Components | Curable Adhesive Film 4 |
|---|---|
| Reactive Oligomer A (g) | 12.1 |
| SR355 (g) | 2.9 |
| CuN (g) | 0.14 |
| IMS (g) | 1.6 |
| CHP (g) | 1.6 |
| Coated on Liner | RL2 |
| Cover Liner | RL1 |

Curable Adhesive Film 5

Curable Adhesive Film 5 was prepared by combining 11.14 g of the Polyurethane Polymer Solution and 7.43 g of CN991 in the MAX 20 Speedmixer cup. The composition was mixed at 3000 rpm for 1 minute using the DAC 150.1 FVZ-K Speedmixer. The remaining components were then added to the mixture: 0.35 g of AscPalm, 0.14 g of TBAC STOCK, 0.13 g of BP, and 0.88 g of IPA. The adhesive composition was homogenized at 3000 rpm for 5 min, and applied with a notchbar coater on a RL2 liner at a 30 mil (762 micrometers) gap. The coated liner was dried in a solvent oven at 70° C. for 30 minutes. The adhesive side of Curable Adhesive Film 5 was covered with the RL1 release liner. CURABLE ADHESIVE FILMS 6-7 AND COMPARATIVE CURABLE ADHESIVE FILM A Curable Adhesive Films 6-7 were prepared by combining the amounts listed in Table 3, below, of Acrylic Polymer Solution and CHP in the MAX 20 Speedmixer cup. The composition was homogenized at 3000 rpm for 3 minutes using the DAC 150.1 FVZ-K Speedmixer. The adhesive composition was then applied with a notchbar coater on RL2 liners at a 10 mil (254 micrometers) gap. The coated liners were dried in a solvent oven at 54° C. for 30 minutes. The composition of Comparative Curable Adhesive A did not include the cumene hydroperoxide. The adhesive sides of Curable Adhesive Films 6-7 and Comparative Curable Adhesive Film A were subsequently covered with RL1 release liners.

TABLE 3

Curable Adhesive Films 6-7

| Components | Curable Adhesive Film 6 | Curable Adhesive Film 7 | Com. Curable Adhesive Film A |
|---|---|---|---|
| Acrylic Polymer Solution (g) | 19.17 | 19.61 | 20.02 |
| CHP (g) | 0.82 | 0.43 | 0 |
| Coated on Liner | RL2 | RL2 | RL2 |
| Cover Liner | RL1 | RL1 | RL1 |

Adhesive Systems 1-7 and Comparative Adhesive System A

Adhesive Systems 1-5 and Comparative Adhesive System A were prepared by applying a first curable adhesive film to an aluminum substrate, followed by the application of a second curable adhesive film to the first curable adhesive film, as described above, in the procedure for measuring Overlap Shear. A summary of the curable adhesive films used in Adhesive Systems 1-5 and Comparative Adhesive System A is in Table 4, below.

Curable adhesive film laminates were prepared by applying a curable adhesive film to another curable adhesive film. Adhesive Systems 6 and 7 included a three-layer construction, combining a first curable adhesive film and a curable adhesive laminate, as shown in Table 4, below. In Adhesive Systems 6 and 7, the side of the laminate comprising the Curable Adhesive Film 5 was adhered to the second aluminum substrate, while the opposite side of the laminate contacted the first curable adhesive film, thereby forming the adhesive layer/adhesive layer interface.

TABLE 4

Adhesive Systems 1-7 and Comparative Adhesive System A

| Adhesive System | First Curable Adhesive Film | Second Curable Adhesive Film / Curable Adhesive Laminate |
|---|---|---|
| Comp. Adhesive System A | Curable Adhesive Film 5 | Comparative Curable Adhesive Film A |
| Adhesive System 1 | Curable Adhesive Film 1 | Curable Adhesive Film 4 |
| Adhesive System 2 | Curable Adhesive Film 2 | Curable Adhesive Film 4 |
| Adhesive System 3 | Curable Adhesive Film 3 | Curable Adhesive Film 4 |
| Adhesive System 4 | Curable Adhesive Film 5 | Curable Adhesive Film 6 |
| Adhesive System 5 | Curable Adhesive Film 5 | Curable Adhesive Film 7 |
| Adhesive System 6 | Curable Adhesive Film 5 | Curable Adhesive Film 6 / Curable Adhesive Film 5 |
| Adhesive System 7 | Curable Adhesive Film 5 | Curable Adhesive Film 7 / Curable Adhesive Film 5 |

Overlap shear of Adhesive Systems 1-7 and Comparative Adhesive System A was measured and results are reported in Table 5, below. Results for Adhesive Systems 1-5 and Comparative Adhesive System A are averages of two replicates. Results for Adhesive Systems 6 and 7 are averages of three replicates.

TABLE 5

Overlap Shear of Adhesive Systems 1-7 and Comparative Adhesive System A

| Adhesive System | OLS Average Peak Stress (psi) | OLS Average Peak Stress (kPa) | OLS StdDev (psi) | OLS StdDev (kPa) |
|---|---|---|---|---|
| Comp. Adhesive System A | 1.54 | 10.60 | 0.72 | 4.93 |
| Adhesive System 1 | 74.66 | 514.76 | 19.09 | 131.62 |
| Adhesive System 2 | 81.50 | 561.92 | 20.50 | 141.34 |
| Adhesive System 3 | 71.00 | 489.52 | 7.07 | 48.74 |
| Adhesive System 4 | 34.20 | 235.83 | 6.37 | 43.93 |
| Adhesive System 5 | 26.74 | 184.35 | 4.48 | 30.89 |
| Adhesive System 6 | 31.56 | 217.58 | 2.71 | 18.71 |
| Adhesive System 7 | 21.56 | 148.65 | 6.85 | 47.24 |

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. An adhesive system comprising:
   I) a tape comprising a support layer with two first curable adhesive films borne on or directly bound to opposite faces of the support layer, each first curable adhesive film independently comprising a blend of:
      a) a first film-forming polymer or oligomer;
      b) a first species comprising first unsaturated free-radically polymerizable groups, which may be a) or a species other than a);
      c) a first transition metal cation; and
      d) a reducing agent which is not a), b), or c);
      wherein neither of the first curable adhesive films comprises an oxidizing agent which is not a), b), c), or d); and
   II) a second curable adhesive film comprising a blend of:
      e) a second film-forming polymer or oligomer;
      f) a second species comprising second unsaturated free-radically polymerizable groups, which may be e) or may be a species other than e); and
      g) an oxidizing agent which is not e) or f).

2. The adhesive system according to claim 1 wherein b) is a).

3. The adhesive system according to claim 1 wherein b) is a species other than a), wherein a) does not comprise unsaturated free-radically polymerizable groups.

4. The adhesive system according to claim 3 wherein a) is selected from the group consisting of acrylic polymers, rubber polymers, polyester polymers, polyurethane polymers, polyamide polymers, and combinations thereof.

5. The adhesive system according to claim 1 wherein the reducing agent does not comprise a transition metal, nitrogen or sulfur.

6. The adhesive system according to claim 1 wherein the reducing agent is selected from organic reducing agents.

7. The adhesive system according to claim 1 wherein each first curable adhesive film is a pressure sensitive adhesive.

8. The adhesive system according to claim 1 wherein f) is e).

9. The adhesive system according to claim 1 wherein f) is a species other than e), wherein e) does not comprise unsaturated free-radically polymerizable groups.

10. The adhesive system according to claim 9 wherein e) is selected from the group consisting of acrylic polymers, rubber polymers, polyester polymers, polyurethane polymers, polyamide polymers, and combinations thereof.

11. The adhesive system according to claim 1 wherein the second curable adhesive film is a pressure sensitive adhesive.

12. The adhesive system according to claim 1, wherein the first film-forming polymer or oligomer is a poly(meth)acrylate oligomer.

13. The adhesive system according to claim 1, wherein the support layer is a foam.

14. A method of binding two substrates comprising the steps of:
1) Providing a first substrate bearing on a first surface the tape according to claim 1;
2) Providing a second substrate bearing on a second surface the second curable adhesive film according to claim 1; and
3) Bringing together the first and second surfaces of the first and second substrates such that the tape and the second curable adhesive film are in contact.

15. A method of binding two substrates comprising the steps of:
1) providing the second curable adhesive film according to claim 1;
2) Providing a first substrate bearing on a first surface a first portion of the tape according to claim 1;
3) Providing a second substrate bearing on a second surface a second portion of the tape according to claim 1;
where the first and second portions have compositions chosen independently of each other; and
4) Bringing together 1), 2), and 3) such that the first portion of the tape and the second portion of the tape are in contact with opposite faces of the second curable adhesive film.

16. A method of binding two substrates comprising the steps of:
1) Providing the tape according to claim 1;
2) Providing a first substrate bearing on a first surface a first portion of the second curable adhesive film according to claim 1;
3) Providing a second substrate bearing on a second surface a second portion of the second curable adhesive film according to claim 1;
wherein the first and second portions have compositions chosen independently of each other; and
4) Bringing together 1), 2), and 3) such that the first portion of the second curable adhesive film and the second portion of the second curable adhesive film are in contact with opposite faces of the tape.

17. An adhesive system comprising:
I) a tape comprising a support layer with two first curable adhesive films borne on or directly bound to opposite faces of the support layer, each first curable adhesive film independently comprising a blend of:
a) a first film-forming polymer or oligomer;
b) a first species comprising first unsaturated free-radically polymerizable groups, which may be a) or a species other than a); and
c) a first transition metal cation;
wherein the first curable adhesive film comprises no oxidizing agent which is not a), b), or c); and
II) a second curable adhesive film comprising a blend of:
e) a second film-forming polymer or oligomer;
f) a second species comprising second unsaturated free-radically polymerizable groups, which may be e) or may be a species other than e); and
g) an oxidizing agent which is not e) or f).

18. The adhesive system according to claim 17, wherein the second curable adhesive film additionally comprises:
h) a second transition metal cation.

19. The adhesive system according to claim 17, wherein both of the first curable adhesive films and the second curable adhesive film are pressure-sensitive adhesives.

20. The adhesive system according to claim 17, wherein the support layer is a foam.

* * * * *